US006358586B1

(12) United States Patent
Fujita et al.

(10) Patent No.: US 6,358,586 B1
(45) Date of Patent: Mar. 19, 2002

(54) PACKAGING STRAP COIL AND METHOD FOR PRODUCING THE SAME, PACKAGING STRAP COIL UNIT AND PACKAGING MACHINE EQUIPPED WITH STRAP COIL REEL

(75) Inventors: Kuniaki Fujita, Fukui; Kazuyuki Oba, Toyama; Yukou Usuda, Osaka; Satoru Tajika, Ishikawa; Tetsuya Marutani, Ishikawa; Izuru Kawamoto, Ishikawa, all of (JP)

(73) Assignee: Sekisui Jushi Kabushiki Kaisha, Osaka (JP)

( * ) Notice: Subject to any disclaimer, the term of this patent is extended or adjusted under 35 U.S.C. 154(b) by 0 days.

(21) Appl. No.: 09/361,855

(22) Filed: Jul. 27, 1999

(30) Foreign Application Priority Data

| Aug. 7, 1998 | (JP) | 10-223802 |
| Dec. 22, 1998 | (JP) | 10-364713 |
| Mar. 26, 1999 | (JP) | 11-084519 |
| Jun. 30, 1999 | (JP) | 11-184539 |
| Jun. 30, 1999 | (JP) | 11-184540 |

(51) Int. Cl.[7] .......................... B65H 18/00; B65H 81/00
(52) U.S. Cl. ............... 428/36.9; 428/36.91; 428/37; 206/389; 242/160.1; 242/166; 156/169; 156/173
(58) Field of Search ............... 428/36.9, 36.91, 428/35.8, 35.9, 37; 206/389, 391; 242/160.1, 160.2, 166; 156/173, 169

(56) References Cited

U.S. PATENT DOCUMENTS

| 2,527,842 A | 10/1950 | Mullaney ............... 206/52 |
| 2,753,992 A | 7/1956 | Manchester ............ 206/59 |
| 2,797,804 A | 7/1957 | Pomeroy et al. ....... 206/59 |

(List continued on next page.)

FOREIGN PATENT DOCUMENTS

| DE | 1586512 | 8/1970 |
| DE | 15 86 512 B | 8/1970 |
| DE | 37 00 149 A1 | 7/1988 |
| DE | G 90 00 418.3 | 7/1990 |
| DE | 93 15 668.5 | 1/1994 |
| EP | 0 443 506 A1 | 8/1991 |
| FR | 2435296 | 4/1980 |
| GB | 1037295 | 7/1966 |
| GB | 1554619 | 10/1979 |
| JP | 63-185627 | 8/1988 |
| JP | 01167012 | 6/1989 |
| JP | 5-270743 | 10/1993 |

OTHER PUBLICATIONS

Patent Abstracts of Japan: "Joining of Packing Band End in Automatic Packer" Publication No. 01167012, Publication Date: Jun. 30, 1989, Application No. 63137003, Inventor: Oshima Yasufumi.
Patent Abstract of Japan, 63 185627 (Aichi Seiko KK) Aug. 1, 1988; Translation XP–002144048.

*Primary Examiner*—Rena L. Dye
(74) *Attorney, Agent, or Firm*—Rader Fishman & Grauer

(57) ABSTRACT

The present invention relates to: a packaging strap coil and its production method, wherein the innermost strap end is securely fixed to prevent un-winding thereof and the strap can be smoothly drawn out to the innermost end for strap-packaging of an item; a packaging strap coil unit which prevents deformation of the strap coil; and a packaging machine. The strap coil 11 comprises a number of layers of a resin packaging strap 11a wound helically and carelessly around a hollow 11b defining the axis of the strap coil 11. The strap 11a is made of a thermoplastic resin at least on its external surface. In the strap coil 11, a plurality of perforations 11d are pierced in the vicinity of an innermost end of the strap 11a through to a plurality of laminated layers. Each perforation 11d provides a melt-bonded area 11e along its periphery to bond the laminated layers of the strap 11a together.

8 Claims, 36 Drawing Sheets

U.S. PATENT DOCUMENTS

| | | | |
|---|---|---|---|
| 2,862,442 A | 12/1958 | Jones | 100/27 |
| 2,874,831 A | 2/1959 | Flanagan | 206/59 |
| 3,044,614 A | 7/1962 | Hanscom | 206/59 |
| 3,590,991 A | 7/1971 | Sloan | 206/59 |
| 3,645,386 A | 2/1972 | Takaichi et al. | 206/59 |
| 3,788,933 A | 1/1974 | Nakazawa | 156/513 |
| 3,952,961 A | 4/1976 | Antepenko | 242/54 |
| 3,952,963 A | 4/1976 | Ueno et al. | 242/68.5 |
| 4,097,983 A | 7/1978 | Cole | 29/521 |
| 4,177,897 A | 12/1979 | Cole | 206/389 |
| 4,235,335 A | 11/1980 | Cosentino | 206/389 |
| 4,332,324 A * | 6/1982 | Howard et al. | 206/389 |
| 4,533,046 A | 8/1985 | Kuhnert et al. | 206/389 |
| 5,133,171 A | 7/1992 | Chase et al. | 53/409 |
| 5,310,056 A * | 5/1994 | Ball | 206/390 |
| 5,465,922 A | 11/1995 | Vander Groef | 242/573 |
| 5,558,223 A * | 9/1996 | Stefanescu | 206/389 |

* cited by examiner

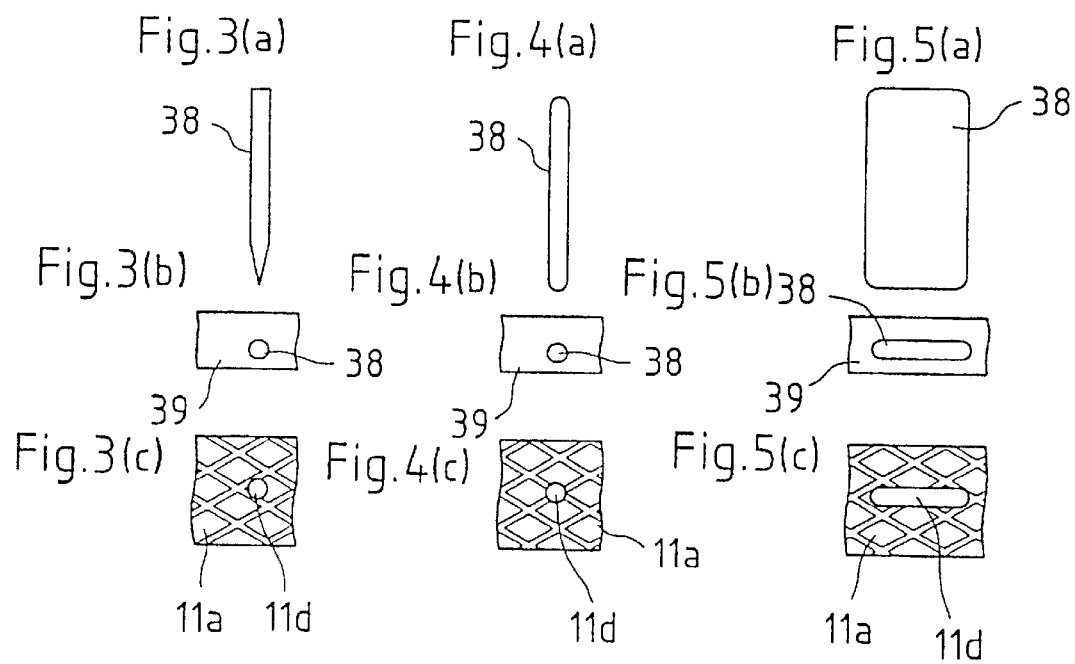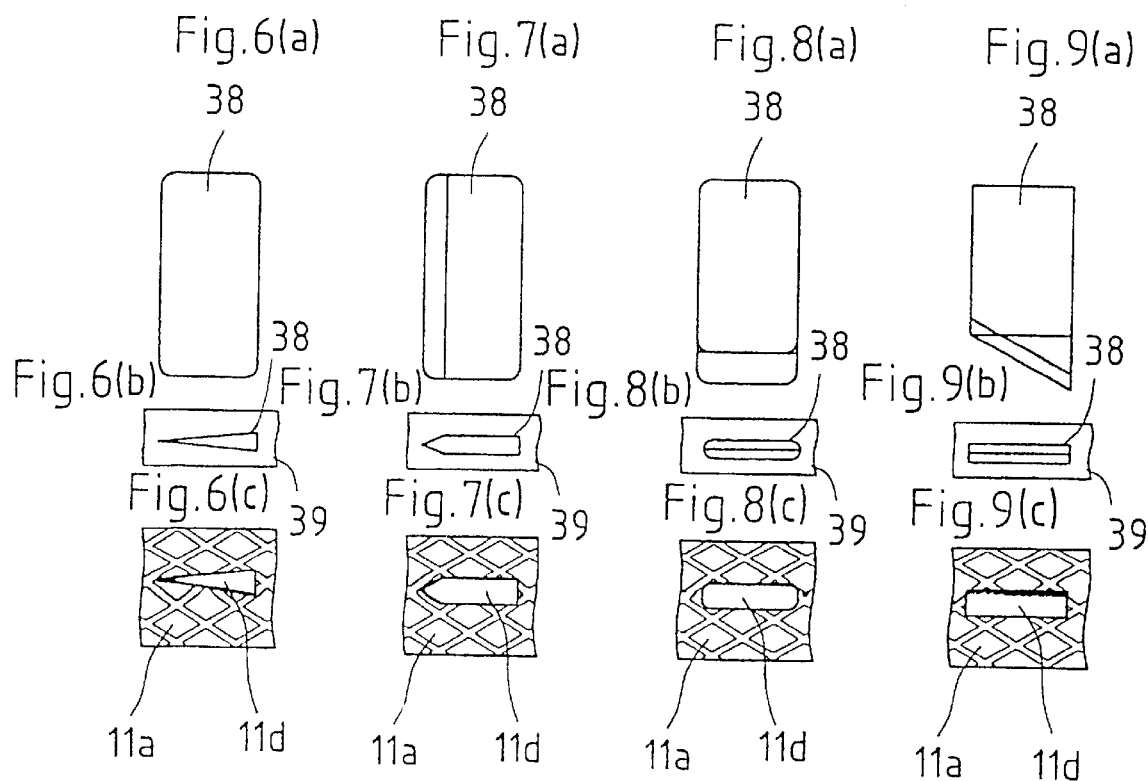

Fig.12

| | Core | Bonding Test | Vibration Test | Transportation Test (Number of unwound strap coils) | | Drum-set Test (Number of unwound strap coils) | | | | | Machine-Packageability Test (Incidence of troubles) | | | | |
|---|---|---|---|---|---|---|---|---|---|---|---|---|---|---|---|
| | | | | | GRADE | A | B | C | TOTAL | GRADE | A | B | C | TOTAL | GRADE |
| Example 1 | coreless | perforation (melt-bonding) | △ | 2/5 | × | 2/2 | 2/2 | 2/2 | 6/6 | × | 0/2 | 0/2 | 0/2 | 0/6 | ○ |
| Example 2 | coreless | perforation (melt-bonding) | ○ | 0/5 | ○ | 0/2 | 1/2 | 0/2 | 1/6 | △ | 0/2 | 0/2 | 0/2 | 0/6 | ○ |
| Example 3 | coreless | perforation (melt-bonding) | ○ | 0/5 | ○ | 0/2 | 0/2 | 0/2 | 0/6 | ○ | 0/2 | 0/2 | 0/2 | 0/6 | ○ |
| Example 4 | coreless | perforation (melt-bonding) | ○ | 0/5 | ○ | 0/2 | 0/2 | 0/2 | 0/6 | ○ | 0/2 | 0/2 | 0/2 | 0/6 | ○ |
| Example 5 | coreless | perforation (melt-bonding) | ○ | 0/5 | ○ | 0/2 | 0/2 | 0/2 | 0/6 | ○ | 0/2 | 0/2 | 0/2 | 0/6 | ○ |
| Example 6 | coreless | perforation (melt-bonding) | ○ | 0/5 | ○ | 0/2 | 0/2 | 0/2 | 0/6 | ○ | 0/2 | 0/2 | 0/2 | 0/6 | ○ |
| Example 7 | paper core | stapler | ○ | 0/5 | ○ | 0/2 | 0/2 | 0/2 | 0/6 | ○ | 0/2 | 0/2 | 0/2 | 0/6 | ○ |
| Comp.Ex.1 | paper core | — | × | 5/5 | × | 2/2 | 2/2 | 2/2 | 6/6 | × | 2/2 | 2/2 | 2/2 | 6/6 | × 注1 |
| Comp.Ex.2 | coreless | annealing | × | 5/5 | × | 2/2 | 2/2 | 2/2 | 6/6 | × | 2/2 | 2/2 | 2/2 | 6/6 | × 注1 |
| Comp.Ex.3 | coreless | annealing | △ | 3/5 | × | 2/2 | 2/2 | 2/2 | 6/6 | × | 1/2 | 1/2 | 1/2 | 3/6 | △ 注2 |
| Comp.Ex.4 | coreless | tape | ○ | 0/5 | ○ | 0/2 | 0/2 | 0/2 | 0/6 | ○ | 2/2 | 2/2 | 2/2 | 6/6 | × 注3 |

*1 Unable to carry out the test (Due to bent)
*2 Tape blocking
*3 Tape blocking

Fig.13
| BONDING PATTERN | PEELING STRENGTH (kgf) |
|---|---|
| a) 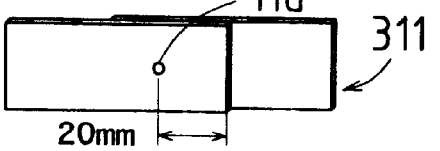 | 1.03kgf |
| b) 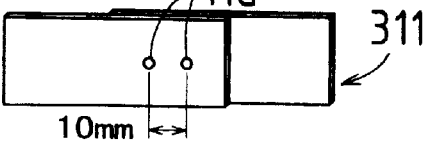 | 1.35kgf |
| c)  | 1.55kgf |
| d) 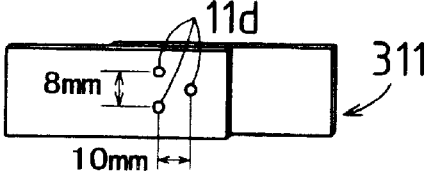 | 2.38kgf |
| e) 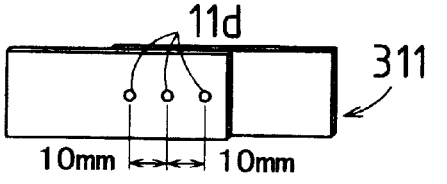 | 1.53kgf |
| f) 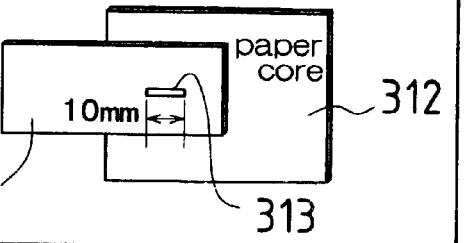 | 5.80kgf |

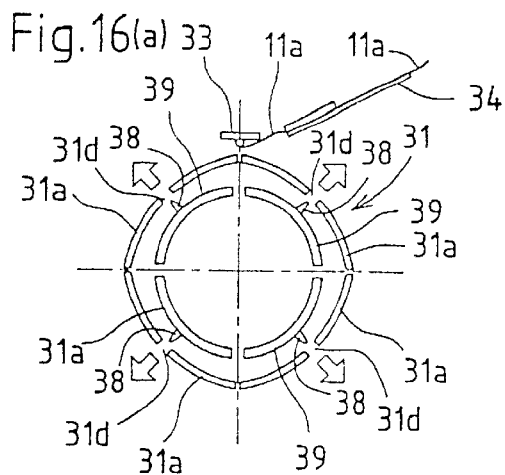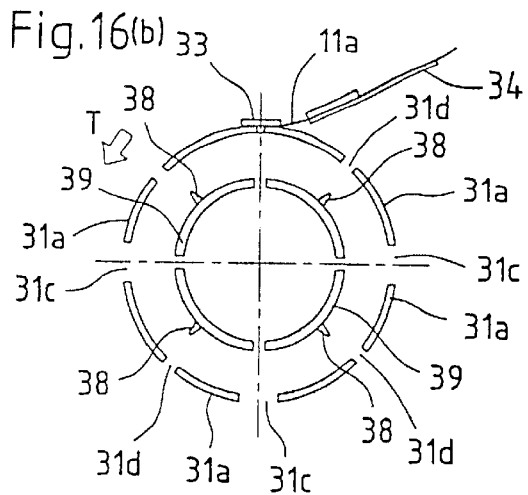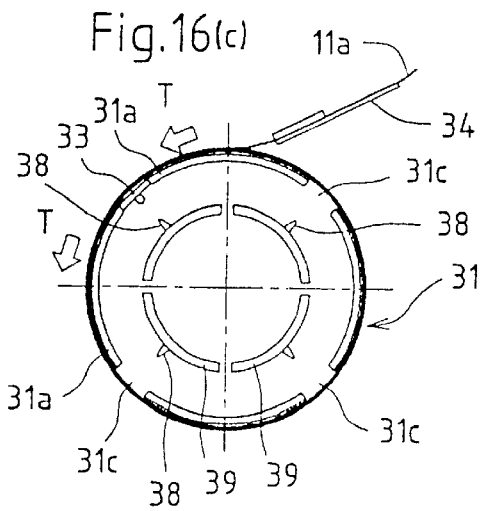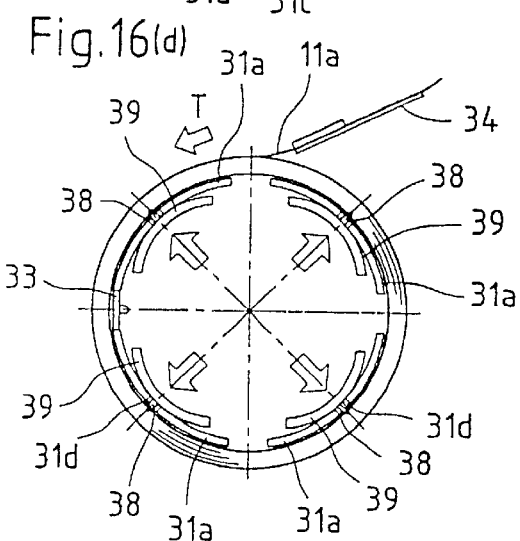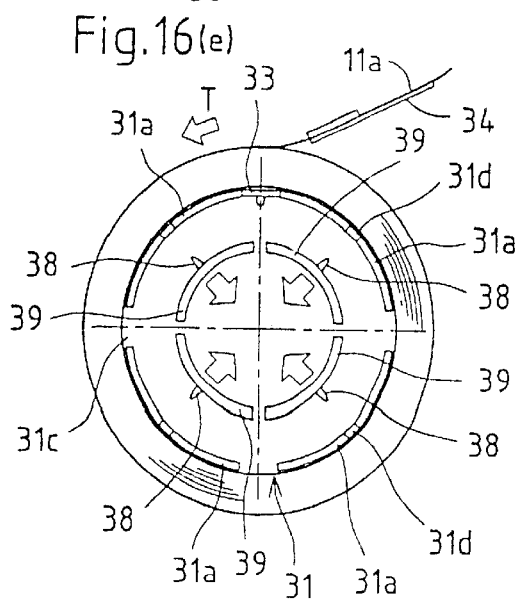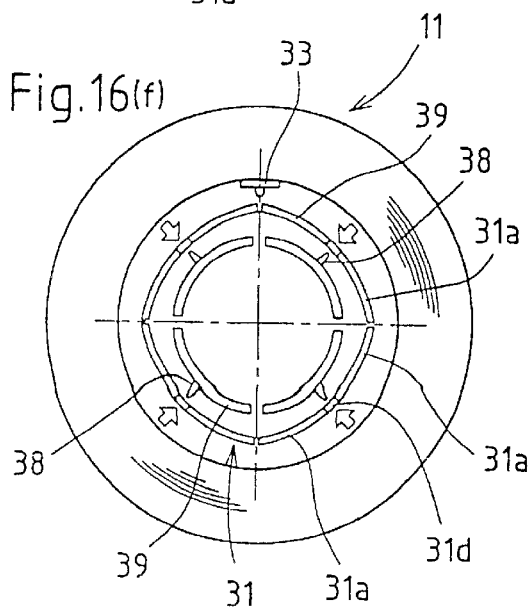

FIG. 36A
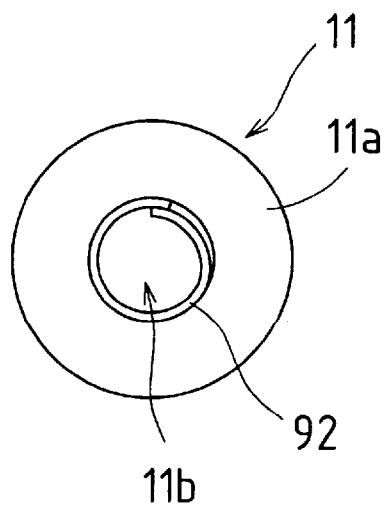
FIG 36B
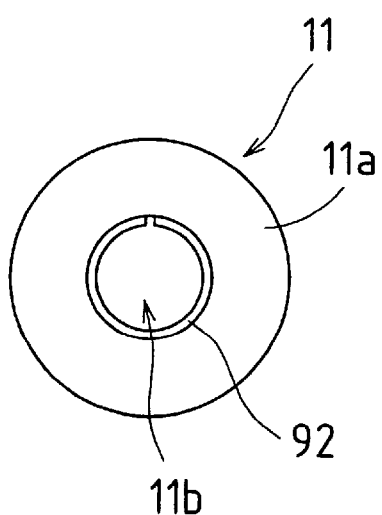
Fig.37
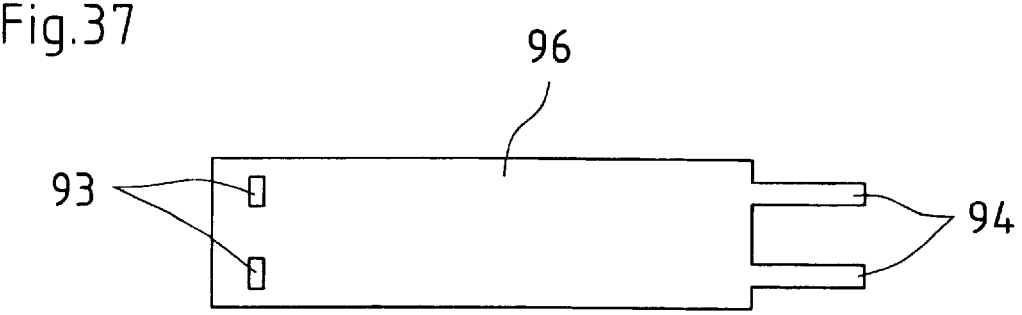
Fig.38
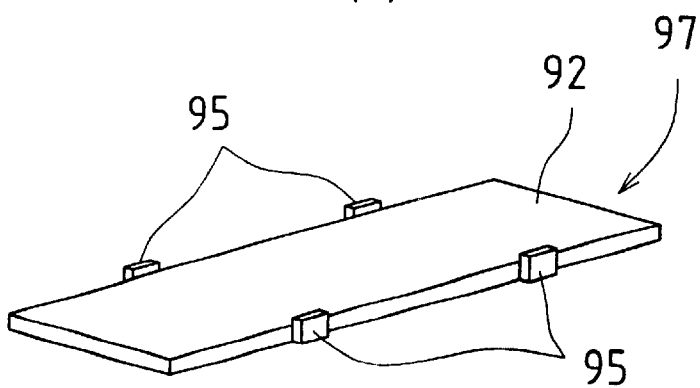
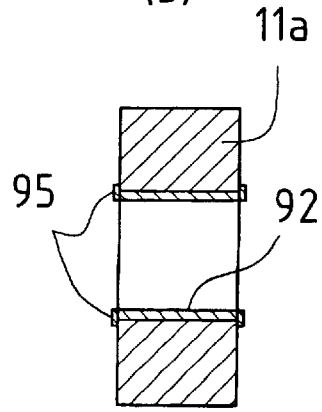

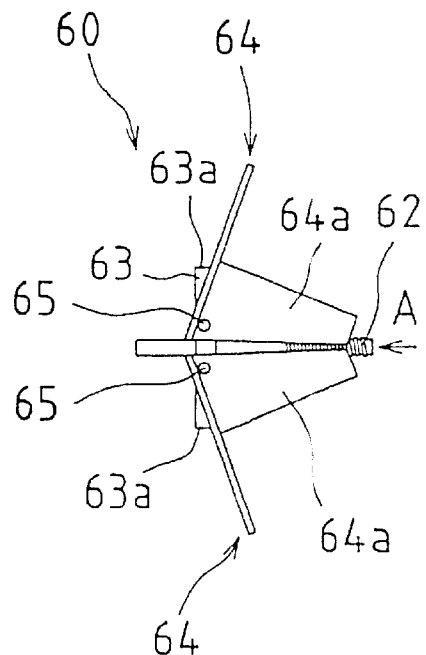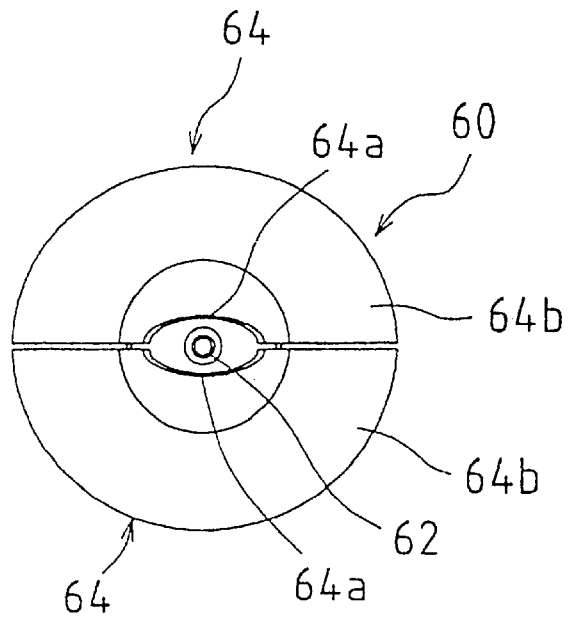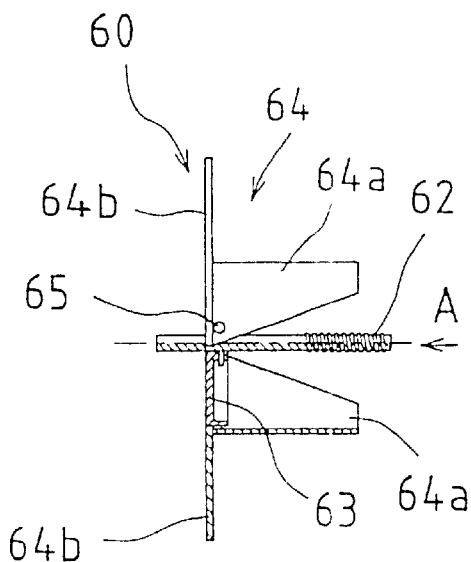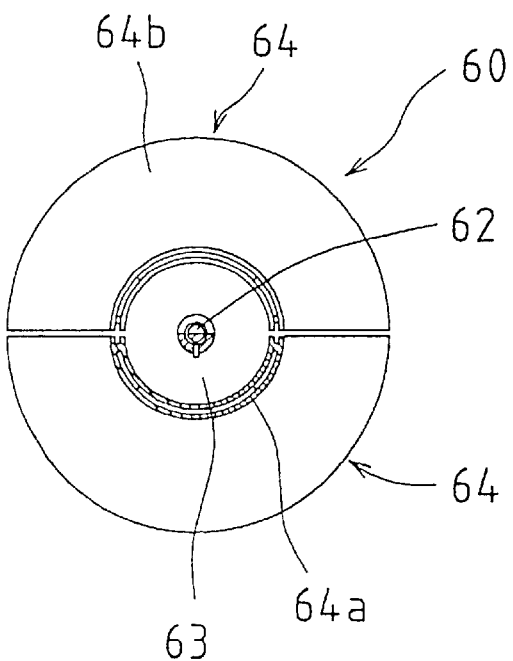

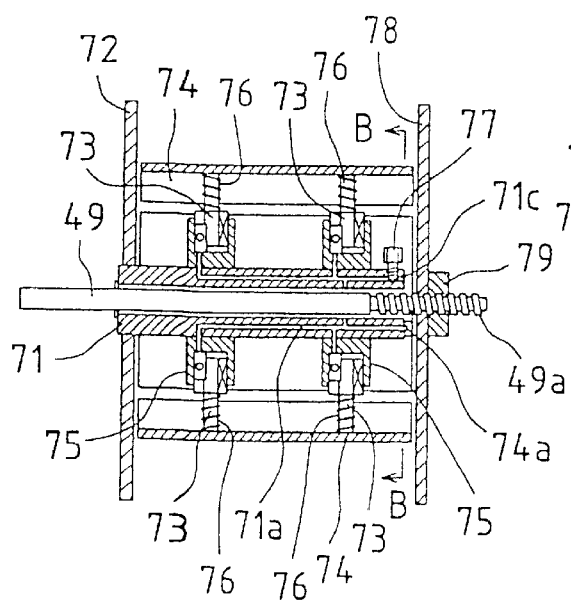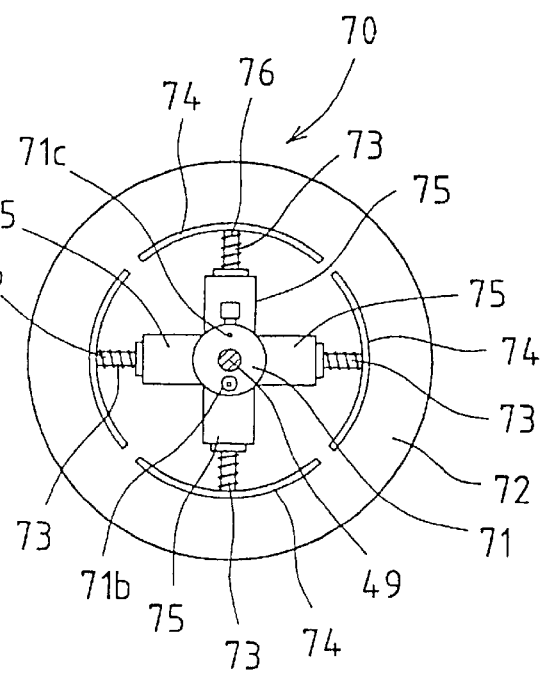

Prior Art

PACKAGING STRAP COIL AND METHOD FOR PRODUCING THE SAME, PACKAGING STRAP COIL UNIT AND PACKAGING MACHINE EQUIPPED WITH STRAP COIL REEL

BACKGROUND OF THE INVENTION

The present invention relates to a packaging strap coil which is made up of a helically wound thermoplastic resin packaging strap and used in strapping various items, and a method for producing the same. The present invention also relates to a packaging strap coil unit comprising the strap coil, and further relates to a packaging machine equipped with a strap coil reel for loading the strap coil on an automatic packaging machine.

A tape-like thermoplastic resin packaging strap is employed for strapping a corrugated cardboard box or the like. The resin strap is usually manufactured by extrusion-moulding an olefinic thermoplastic resin (i.e. polypropylene, polyethylene terephthalate) into a required flat tape shape, in which case drawing and stretching of the resin is carried out at a rate exceeding the extrusion rate. The stretched resin strap is helically wound up on a tubular paper core to form a strap coil.

The strap coil is loaded on an automatic packaging machine, together with the tubular paper core. A strap therein is successively drawn out to strap a corrugated cardboard box or like item. When the strap coil runs out of the strap, it consists of the tubular paper core. The paper core has been marred by the strap and may not be reused as the core of the packaging strap coil. If the paper core is stained with a synthetic resin-based adhesive, it even fails to make a material for recycled paper. The tubular paper core, which is no longer available as a paper core or a material for recycled paper, is only to be discarded. Disposal of the paper core, however, still requires transportation and waste treating expenses.

In view of the above problems, Japanese Patent Application Laid-open No. 315690/1995 (JP-A-7-315690) discloses a coreless packaging strap coil and a manufacturing method thereof, wherein a packaging strap is helically wound in the absence of a paper or like core. As shown in FIGS. 57 and 58, the coreless strap coil 205 has a cylindrical hollow 206 at its axis. The innermost end of the strap 204 is melt-bonded at a melt-bonded area 241 with another strap layer overlaid on the top side thereof.

To produce this strap coil, a strap 204 is wound on a winding roller 201 comprising a pair of separable right/left roller components 203, 213. Firstly, the start of the strap 204 is wound in one turn along the middle of the axial length of the winding roller 201 where the right/left roller components 203, 213 are joined. Then, the strap 204 provides another layer thereon. The laminated strap layers are melted and bonded to each other by applying a heated iron, thereby forming a melt-bonded area 241. Once the innermost end of the strap 204 is fixed, a predetermined length of the strap 204 is wound on the entire surface of the winding roller 201 to form a strap coil. Finally, the right/left roller components 203, 213 of the winding roller 201 are disjoined and removed from the strap coil. Thus obtained is a coreless packaging strap coil 205.

In this packaging strap coil, the fined innermost end of the strap is not drawn out into the hollow at the axis. Therefore, the strap coil remains firm and solid even during transportation.

When this strap coil is loaded on an automatic packaging machine, the strap is drawn out from the outermost end and used for strapping a corrugated cardboard box or like items.

As mentioned above, a heated iron is used to heat a predetermined area on the laminated portion of the strap wound on the winding roller, so that the laminated strap portion is melted and bonded together. However, as the iron fails to give a stable heating temperature, the bonding strength of the laminated strap layers may vary from batch to batch. Provided the innermost end of the strap is bonded too strongly, namely, provided the melt-bonded area possesses too high a peeling strength, the bonded area may not peel readily when used in the packaging machine. In some cases, the strap may be partially torn off at the rigidly bonded area. Actually, when a strap coil is loaded on the automatic packaging machine, the strap is drawn out along with the rotation of the feed rollers. If the laminated layers of the strap are bonded too strongly, the feed rollers may fail to peel off the strap layers, and worse, destroy themselves, depending on the rotation power.

The strap coil of the prior art manifests more defects. As a strap coil is prepared by laminating a strap in a spiral form, it is somewhat extended in the axial direction. Although the innermost end of the strap is bonded with a layer or layers laminated thereon, the rest of the innermost rows of the strap coil which axially neighbour the bonded strap end are left unbonded with respect to the layers laminated thereon.

Such a strap coil may unwind or collapse at the non-bonded area.

For transportation or storage, the prior art strap coils are laid horizontally and stacked on top of each other as shown in FIG. 55, with the axis oriented vertically. Usually, a pair of strap coils 101 are vertically stored in a package (shown by imaginary line). Each strap coil 101 has uneven side surfaces by nature, where the edge of the strap 101a sticks out in some layers. When a plurality of strap coils 101 are laid axiswise vertically on top of each other, as shown in FIG. 55, the edge of the strap 101a projecting from the side surfaces of the strap coil 101 can be bent or deformed. The strap coil 101 which includes a strap bent or deformed on the edge is less likely to ensure smooth supply of the strap 101a in the automatic packaging machine.

To protect the side surfaces of a strap coil, the strap coil 101 is conventionally transported or stored in the form of a strap coil unit shown in FIG. 56, which includes a pair of disc pads 102 applied on each side surface of the strap coil 101. Each disc pad 102 is made of cardboard and formed with a central hole 102a which corresponds to the cylindrical hollow 101a at the axis of the strap coil 101. A pair of pads 102 are integrally joined on the side surfaces of the strap coil 101 by a plurality of straps 103. Each strap 103 ties the strap coil 101 and the pads 102 together, passing axially through the hollow of the strap coil 101 and the holes of the pads 102 and then axially crossing the outer cylindrical surface of the strap coil 101.

Since the cardboard pads 102 cover both side surfaces of the strap coil 101, the edge of the strap 101a, even if it may unevenly project or sink, is protected from deformation or damage.

Nonetheless, the preparation of such packaging strap coil units is not a simple task, because the process requires positioning the pads 102 on both side surfaces of the strap coil 101 and thereafter tying them together by a plurality of straps 103.

As for an automatic packaging machine equipped with a strap coil reel and operated for packaging an item automatically, the strap coil reel usually accommodates a strap coil comprising a strap wound around a tubular paper core. The strap coil reel includes a core element which is inserted into the paper tube and supports the same. As the core element, there may be adopted a cylindrical structure which comprises a cylinder whose diameter is slightly smaller than the inner diameter of the paper tube, a three-parallel-rod structure in which three parallel rods support the inner cylindrical surface of the paper tube at three circumferentially evenly spaced positions, or a flat-plate structure which comprises a pair of parallel plates. When the core element of the strap coil reel holds a tubular paper core, the strap coil reel is rotated by the inertia force generated while the strap is drawn out from the strap coil by the feed rollers.

Unfortunately, in inserting the core element into the hollow of the coreless strap coil, friction with the core element may induce the strap coil to unwind or disintegrate on the inner cylindrical surface thereof. Besides, this core element is not applicable to a coreless strap coil which has a deformed oval section and thus an oval hollow, which is often observed during and after transportation of the strap coil. If the core element of the strap coil reel cannot be inserted into a deformed hollow, it is impossible to load a deformed strap coil on the strap coil reel.

In fact, if the core element comprises three parallel rods or a pair of flat plates, it can enter a hollow of a strap coil having a slightly deformed oval section. Nevertheless, under such circumstances, the inner cylindrical surface of the strap coil surrounding the deformed hollow cannot receive a circumferentially equally dispersed force. As a result, when the strap coil gets thinner, the hollow of the strap coil may be further deformed into a triangular section or a square section, as loaded on the core element of three-parallel-rod structure or flat-plate structure, respectively. After all, the strap coil reel cannot draw out a strap from the strap coil smoothly.

Moreover, the strap coil reel fails to draw out the strap to the ultimate end for other reasons. Since the rotation of the strap coil reel depends on the inertia force generated in drawing out the strap, the strap constituting the strap coil may bite into the core element and get entangled or disintegrated, when the strap coil becomes thinner. Furthermore, where the strap coil reel is installed on the outside of the automatic packaging machine, there are some possibilities of hurting an operator. When the melt-bonded end in the coreless strap coil is peeled off from the bonded layer, it may violently spring back along with the rotation of the strap coil reel, possibly at an operator.

SUMMARY OF THE INVENTION

In order to solve the above problems, the present invention provides a packaging strap coil and a method for producing the same, wherein the innermost end of the strap is firmly fixed to prevent unwinding or disintegration of the strap coil, and further, the strap is smoothly drawn out to the ultimate end when employed for strapping an item.

Another object of the present invention is to provide a packaging strap coil unit, wherein it effectively prevents deformation and bent at the edge of the strap which constitutes the side surfaces of a packaging strap coil comprising a helically wound strap. Besides, this strap coil unit is manufactured in a simple manner.

A further object of the present invention is to provide a packaging machine equipped with a strap coil reel, wherein the coreless strap coil, even if deformed, can be loaded on the strap coil reel without sacrificing its firmly coiled state. With this strap coil reel, a strap can be drawn out safely and stably to the ultimate end.

In view of the above-mentioned objects, the present invention provides a packaging strap coil comprising a number of layers of a packaging strap wound helically and carelessly around a hollow defining an axis of the strap coil, the strap being made of a thermoplastic resin at least on an external surface thereof, wherein a plurality of perforations are pierced in the vicinity of an innermost strap end through to a plurality of strap layers laminated thereon, and wherein the laminated strap layers are bonded to each other at a melt-bonded area formed along the periphery of each perforation. In this packaging strap coil, it is desirable to provide a plurality of perforations pierced in the vicinity of an outermost strap end through to a plurality of strap layers laminated thereunder.

It should be understood that a thermoplastic resin packaging strap employed in the present invention comprises at least a thermoplastic resin. This means that the strap may comprise a thermoplastic resin alone. But, on the other hand, the strap may be made of a fibre, paper, etc. whose surface is coated with a thermoplastic resin.

Moreover, in the packaging strap coil, it is preferable to prescribe the perforation as to the circumferential length, configuration and position thereof as well as the number of laminated strap layers through which the perforation should extend. These parameters are determined in view of the material, thickness and width of the packaging strap. Thereby, the laminated strap layers exhibit a balanced bonding strength and peeling strength.

As described above, the strap coil of the above structure is characterised in that the laminated layers in the vicinity of the innermost strap end are bonded together at the melt-bonded area. The melt-bonded area provides a stable bonding strength and serves as the core of the strap coil. As a result, the strap coil does not unwind or collapse on the inner cylindrical surface. Besides, the strap can be stably laminated on the bonded layers to form a solid strap coil.

When the perforations are provided in the vicinity of an outermost strap end through to a plurality of underlying strap layers, the strap will not unwind from the outermost end. This arrangement thus saves the trouble of fixing the outermost strap end by taping or thermal melt-bonding.

The perforations are judiciously designed to hold the balance between the bonding strength and the peeling strength at the bonded layers of the strap. Therefore, on the one hand, the laminated portion of the strap is mutually bonded with a stable bonding strength at the melt-bonded area formed along the periphery of the perforation. On the other hand, in use of the strap coil, the bonded strap layers peel off properly at the melt-bonded area, instead of being forcibly torn away.

In this connection, the present invention provides a production method of the above strap coil which comprises the steps of:

winding an innermost strap end on a winding roller and laminating a plurality of layers on the innermost strap end;

piercing the laminated strap layers with a perforator heated to a predetermined temperature, thereby to form a perforation and melt its periphery;

withdrawing the perforator from the laminated strap layers to melt-bond the periphery of the perforation;

winding a required length of the strap helically on the winding roller to form a strap coil; and removing the winding roller from the strap coil.

In the production method, the winding roller may expand or contract diametrically. The diameter of the winding roller is expanded while the strap is wound thereon to form a strap coil. Thereafter, the winding roller is diametrically contracted and removed from the strap coil.

Incidentally, the perforator may be in the form of a needle or a plate.

Further, the present invention provides another method for producing a packaging strap coil comprising the steps of:
  winding an innermost strap end on a winding roller and laminating a plurality of layers on the innermost strap end;
  irradiating a laser beam on the laminated strap layers, thereby to form a perforation and melt-bond its periphery;
  winding a required length of the strap helically on the winding roller to form a strap coil; and
  removing the winding roller from the strap coil.

In this production method, too, the winding roller may expand or contract diametrically. The diameter of the winding roller is expanded while the strap is wound thereon to form a strap coil. Thereafter, the winding roller is diametrically contracted and removed from the strap coil.

In any of the above production methods, it is important to prescribe the circumferential length, configuration and position of the perforation as well as the number of laminated layers of the strap through which the perforation should extend. These parameters are determined in view of the material, thickness and width of the packaging strap. Thereby, the laminated strap layers exhibit a balanced bonding strength and peeling strength.

In these production methods, a needle-shaped perforator provides a perforation of circular section, and a plate-shaped perforator provides a perforation of rectangular section or other section corresponding to the section of the perforator. Alternatively, laser beam irradiation can provide a perforation of smaller diameter by removing the components in the irradiation area. In another aspect, compared to the use of needle-shaped or plate-shaped perforators, the laser beam application requires less expendable components.

From another point of view, the present invention provides a strap coil which comprises a number of layers of a packaging strap wound helically and carelessly around a hollow defining an axis of the strap coil, the strap being made of a thermoplastic resin at least on an external surface thereof, wherein a portion of the strap which constitutes an inner cylindrical surface surrounding the hollow is peelably bonded by an adhesive to another portion of the strap.

In this strap coil, the adhesive-bonding can be effected in various manners. For example, a portion of the strap helically wound in the vicinity of the hollow may be peelably bonded by an adhesive to another portion of the strap laminated on a top side thereof.

Otherwise, a plurality of layers of the strap laminated along each axial end of the hollow maybe bonded mutually peelably by an adhesive. Alternatively, a plurality of adjacent rows of the helically wound strap may be bonded mutually peelably by an adhesive which is applied on the inner cylindrical surface surrounding the hollow.

The adhesives for the above embodiments may be solvent-type or hot-melt-type.

Still another method for producing a packaging strap coil comprises the steps of:
  winding an innermost strap end helically on a winding roller to form an innermost strap layer;
  applying an adhesive on a top side of the strap wound on the winding roller;
  winding a required length of the strap helically on the adhesive-applied portion of the strap to form a strap coil; and
  removing the winding roller from the strap coil.

In the above production method, the adhesive may be coated by pressing a coating roller of an applicator against the innermost strap layer wound on the winding roller. Instead, the adhesive may be continuously injected between the innermost strap layer wound on the winding roller and a strap which is being laminated thereon, with the use of an applicator which moves along the latter.

Yet another method for producing a packaging strap coil comprises the steps of:
  winding an innermost strap end on a winding roller, with applying an adhesive on a plurality of layers of the strap laminated along each axial end of the winding roller;
  winding a required length of the strap to form a strap coil; and
  removing the winding roller from the strap coil.

Herein, the adhesive can be sprayed on the layers of the strap laminated along each axial end of the winding roller.

Now, the description turns to a packaging strap coil unit of the present invention. The packaging strap coil unit comprises:
  a packaging strap coil comprising a packaging strap wound helically and carelessly around a hollow defining the axis of the strap coil, the strap being made of a thermoplastic resin at least on an external surface thereof, and
  a pair of disc-shaped pads, concentrically positioned and peelably bonded by an adhesive on each side surface of the strap coil.

In this strap coil unit, each pad may include, in the centre thereof, a plurality of central flaps which are folded into the hollow defining the axis of the strap coil. Desirably, each pad may include, on the outer circumference thereof, a plurality of external flaps which are folded on the outer cylindrical surface of the strap coil.

Another packaging strap coil unit of the present invention comprises: a packaging strap coil comprising a packaging strap wound helically and carelessly around a hollow defining the axis of the strap coil, the strap being made of a thermoplastic resin at least on an external surface thereof; and a shape retention plate for substantially covering the inner cylindrical surface surrounding the hollow. When the shape retention plate is rolled and inserted into the hollow of the strap coil, it is capable of supporting the inner cylindrical surface of the strap coil with a resilient force in an unrolling direction. Preferably, the shape retention plate has a mutually connectable portion at each lengthwise end portion. Further, the shape retention plate may comprise a pair of slits formed in the vicinity of and oriented parallel to one widthwise side, and a pair of extensions projecting from the other widthwise side. When the shape retention plate is rolled and inserted into the hollow, the extensions are fitted in the slits. In addition, the shape retention plate may comprise a plurality of edge pieces provided on each lengthwise side thereof for holding a widthwise edge of the strap coil.

Finally, the description is directed to a packaging machine. The packaging machine of the present invention is equipped with a strap coil reel which accommodates a packaging strap coil comprising a packaging strap wound helically and corelessly around a hollow defining an axis of the strap coil, the strap being made of a thermoplastic resin at least on an external surface thereof. While the packaging machine automatically straps an item, the strap is drawn out along with the rotation of the strap coil. The strap coil reel comprises a core element which can contract diametrically in at least one end thereof so as to be inserted into the hollow of the strap coil, and which can diametrically expand inside the hollow into a circular-section cylindrical shape so as to be pressed against a portion of the strap which constitutes an inner cylindrical surface surrounding the hollow.

For a desirable packaging machine equipped with the strap coil reel, the core element is composed of a plurality of core plates which constitute a cylindrical circumference of the expanded core element, each core plate being displaceable in the radial directions. In this strap coil reel, the core plates may be displaced by a link mechanism or by air pressure.

Furthermore, in the strap coil reel mounted on a desirable packaging machine, the core element may be composed of a plurality of core pieces which together constitute a truncated cone when confronted with each other. The core element of this arrangement can contract diametrically when an extreme end of each core piece comes closer to the other, whereas the core element can expand diametrically when an extreme end of each core piece separates farther away from the other.

The packaging machine of the present invention is advantageously equipped with the strap coil reel as described above. Since the strap coil reel properly tensions the packaging strap, the strap is prevented from biting into the strap coil. Therefore, the strap coil loaded therein is neither deformed in section nor unwound at the inner cylindrical surface. Besides, by designing the core element to contract/expand diametrically (i.e. the diameter of the core element can be reduced and increased), the strap coil reel can be loaded with a deformed eccentric strap coil, while effectively preventing unwinding thereof on the inner cylindrical surface. To be specific, when the core element is diametrically contracted, it can be inserted with respect to the deformed hollow of the strap coil. Thereafter, the core element is diametrically expanded and pressed against the inner cylindrical surface of the strap coil.

BRIEF DESCRIPTION OF THE DRAWINGS

FIG. 3(a) is a side view of a perforator for forming a perforation in the packaging strap coil of the invention;

FIG. 3(b) is a plan view thereof; and

FIG. 3(c) is a plan view of the perforation formed by the perforator.

FIG. 4(a) is a side view of another perforator for forming a perforation in the packaging strap coil of the invention;

FIG. 4(b) is a plan view thereof; and

FIG. 4(c) is a plan view of the perforation formed by the perforator.

FIG. 5(a) is a side view of still another perforator for forming a perforation in the packaging strap coil of the invention;

FIG. 5(b) is a plan view thereof; and

FIG. 5(c) is a plan view of the perforation formed by the perforator.

FIG. 6(a) is a side view of yet another perforator for forming a perforation in the packaging strap coil of the invention;

FIG. 6(b) is a plan view thereof; and

FIG. 6(c) is a plan view of the perforation formed by the perforator.

FIG. 7(a) is a side view of a further perforator for forming a perforation in the packaging strap coil of the invention;

FIG. 7(b) is a plan view thereof; and

FIG. 7(c) is a plan view of the perforation formed by the perforator.

FIG. 8(a) is a side view of a still further perforator for forming a perforation in the packaging strap coil of the invention;

FIG. 8(b) is a plan view thereof; and

FIG. 8(c) is a plan view of the perforation formed by the perforator.

FIG. 9(a) is a side view of a yet further perforator for forming a perforation in the packaging strap coil of the invention;

FIG. 9(b) is a plan view thereof; and

FIG. 9(c) is a plan view of the perforation formed by the perforator.

FIG. 11(a) is a development showing the inner cylindrical surface surrounding a hollow in a conventional paper-core strap coil, with the tubular paper core removed; and FIGS. 11(b)–(e) are developments each showing the inner cylindrical surface surrounding a hollow in a conventional coreless strap coil.

FIG. 12 is a table showing the test results regarding to the embodiments of the present invention and a conventional technology described in FIG. 10 and the comparative embodiments described in FIG. 11.

FIG. 13 shows various bonding patterns at the end of a thermoplastic resin strap as well as the peeling strength measured at the bonded areas, each pattern being different in the number and position of the perforation(s), etc.

FIGS. 16(a)–(f) schematically describe a series of production steps of the strap coil 11 in one embodiment of the present invention.

FIGS. 13(a)–(g) schematically describe a series of production steps of the strap coil 11 in still another embodiment of the present invention.

FIG. 23(*b*) illustrates an operation thereof.

FIGS. 36(*a*) and (*b*) are front views of another strap coil unit of the present invention, wherein the embodiment of FIG. 36(*a*) employs a shape retention plate longer than the inner circumference of the strap coil, and the embodiment of FIG. 36(*b*) employs a shape retention plate shorter than the inner circumference of the strap coil.

FIG. 37 is a front view of a shape retention plate employed in the strap coil unit.

FIG. 38(*a*) is a perspective view of another shape retention plate employed in the strap coil unit; and FIG. 38(*b*) is a section thereof in use.

FIG. 42(*b*) is a side view thereof taken in the direction of the arrow A in FIG. 42(*a*).

FIG. 43(*b*) is a side view thereof taken in the direction of the arrow A in FIG. 43(*a*).

FIG. 44(*b*) is a front view thereof taken in the direction of the arrow A in FIG. 44(*a*).

FIG. 48(*a*) is a side view of the strap coil reel for accommodating the strap coil unit, with the strap coil and the cover removed; and FIG. 48(*b*) is a front view thereof taken in the direction of the arrow A in FIG. 48(*a*).

FIG. 49(*a*) is a side view of the strap coil reel, partially broken away for showing its operation, with the strap coil and the cover removed; and FIG. 49(*b*) is a front view taken in the direction of the arrow A in FIG. 49(*a*).

FIG. 50(*b*) is a front view thereof taken in the direction of the arrow A in FIG. 50(*a*).

FIG. 52(*a*) is a section of still another strap coil reel for accommodating the strap coil unit of the present invention; and FIG. 52(*b*) is a front view thereof.

FIGS. 54(*c*) and (*d*) are a section and a front view, respectively, showing a succeeding step; FIGS. 54(*e*) and (*f*) are a section and a front view, respectively, showing a further succeeding step; and FIGS. 54(*g*) and (*h*) are a section and a front view, respectively, showing a still further succeeding step.

DETAILED DESCRIPTION OF THE PREFERRED EMBODIMENTS

The preferred embodiments of the present invention are hereinafter described with reference to the drawings.

1. Packing Strap Coil and its Production Method

Figure 1:
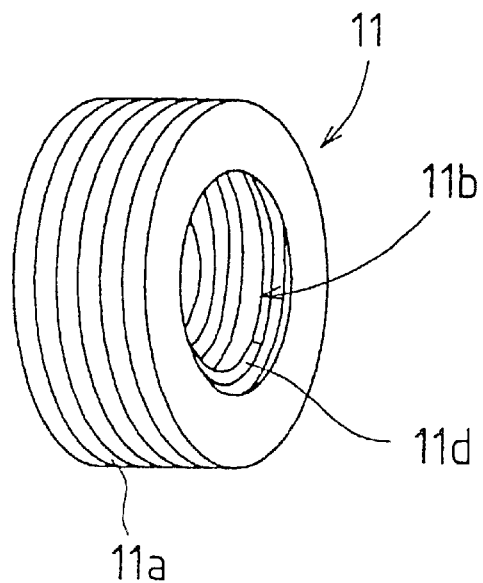
FIG. 1 is a perspective view of the appearance of a packaging strap coil of the present invention.

FIG. 1 is a perspective view of the appearance of a packaging strap coil of the present invention.

The strap coil 11 comprises a plurality of layers of a packaging strap 11*a* helically wound around a hollow 11*b* which defines the axis thereof. The strap 11*a* is made of thermoplastic olefinic resins including polypropylenes, polyamides and polyethylene terephthalate which have been drawn out about five to ten times in the longitudinal direction to remarkably enhance their tensile strength.

The strap 11*a* has a width of about 10 to 20 mm and a thickness of about 0.3 to 1 mm. The strap 11*a* can be made of any thermoplastic resin which improves its tensile strength by drawing/stretching. A strap 11*a* of about 1,000 to 2,500 m long is wound helically to give a strap coil 11 having an axial length of about 100 to 250 mm, an inner diameter of about 200 to 410 mm (as the diameter of the hollow 11b defining the axis thereof), an outer diameter of about 300 to 650 mm and a weight of about 10 to 25 kg.

The innermost end of the strap 11a locates at the middle of the axial length of the hollow 11b.

Figure 2A:
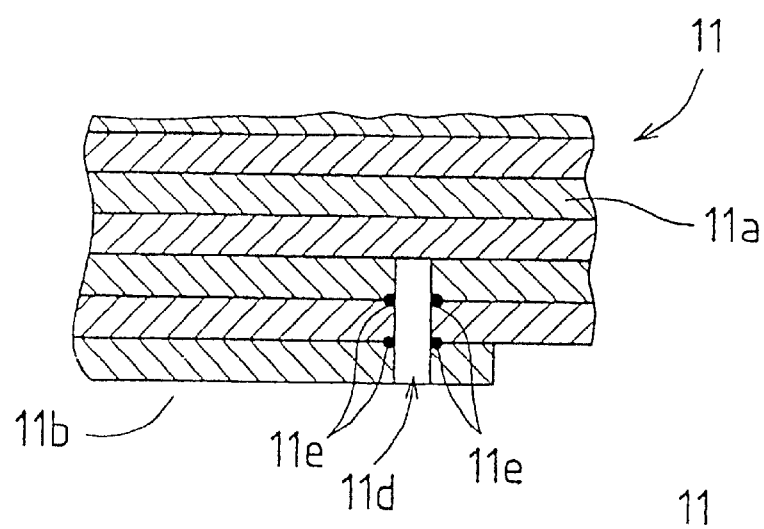
FIG. 2(a) is a section of the main part of the above packaging strap coil.

FIG. 2(a) is a section of the strap 11a, showing a portion in the neighbourhood of the hollow 11b in the strap coil 11. A perforation 11d is pierced in the innermost end of the strap 11a surrounding the hollow 11b, through to a plurality of layers of the strap 11a laminated on the top side of the innermost end. The thus laminated layers of the strap 11a are bonded together at a melt-bonded area 11e formed along the periphery of the perforation strap 11d.

The perforation 11d and the melt-bonded area 11e are formed by piercing the laminated layers of the strap 11a with a heated perforator from the hollow 11b side or from the top side of the laminated portion of the strap 11a, or by irradiating a laser beam.

Figure 2B:
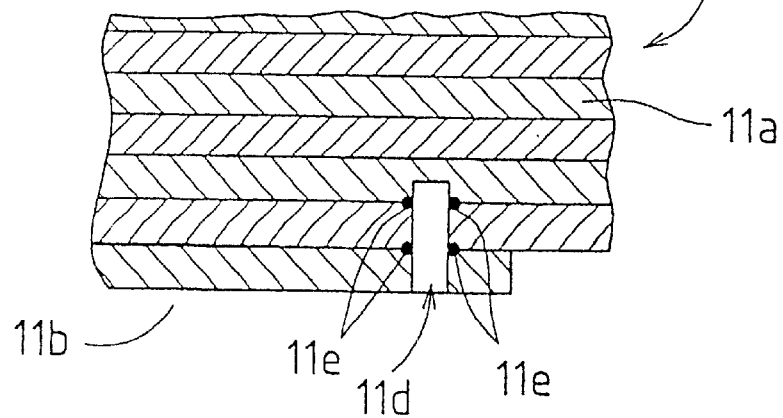
FIG. 2(b) is a section of the main part of another packaging strap coil.

Practically, the only requirement for the perforation 11d is to pierce through the innermost end of the strap 11a and at least one laminated layer of the strap 1a so as to bond the laminated layers together at the melt-bonded area 11e. Therefore, as shown in FIG. 2(a), the perforation 11d may pierce through the entire thickness of two layers laminated on the innermost end of the strap 11a. Alternatively, as shown in FIG. 2(b), the perforation 11b may terminate in the middle of the second layer laminated on the innermost end of the strap 11a.

In The perforation strap 11d is provided with the use of a perforator 38. A circular-section pin-type perforator 38 having a sharp point (FIG. 3(a)) is held perpendicularly on a holder 39 (FIG. 3(b)) and heated above the melting point of the strap 11a. This perforator 38 is inserted from the inside of the hollow 11b into the widthwise centre of the innermost end of the strap 11a, thereby forming a perforation 11d in the widthwise centre of the strap 11a (FIG. 3(c)).

On application of the heated perforator 38 into the innermost end of the strap 11a and the layer(s) laminated thereon, the periphery of the perforator 38 melts to provide a melt-bonded area lie for bonding the laminated layers of the strap 11a. Where the innermost end and the overlapping layer(s) of the strap 11a are bonded by the melt-bonded area 11e formed along the periphery of the perforation 11d the annular melt-bonded area 11e effectively serves as a core for winding the strap 11a in the form of a coil. Due to the bonding, the innermost end of the strap 11a is neither drawn out nor unwound.

As the perforator 38, there may be also used a circular-section pin-type perforator having a hemispheric (round) point (FIG. 4(a)) which is held perpendicularly on a holder 39 (FIG. 4(b)). This perforator 38 is likewise heated above the melting point of the strap 11a and inserted from the inside of the hollow 11b into the widthwise centre of the innermost end of the strap 11a, thereby forming a perforation 11d in the widthwise centre of the strap 11a (FIG. 4(c)).

The section of the perforators 38 is not limited to the circular section as mentioned above. FIGS. 5 to 9 illustrate flat plate-type perforators 38 which provide slot-like perforations. The flat plate-type perforator 38 of FIGS. 5(a) and (b) has an oblong section and comprises rounded sides in the thickness direction. This perforator 38 is applied into the widthwise centre of the inner most end of the strap 11a, with the thickness direction of the perforator 38 being aligned with the width direction of the strap 11a. As shown in FIG. 5(c), the thus formed perforation 11d extends along the longitudinal direction of the strap 11a and has an oblong section with two rounded ends.

The flat plate-type perforator 38 of FIGS. 6(a) and (b) has a triangular section and a thickness gradually diminishing from one side to the other. This perforator 38 gives a triangular-section perforation 11d along the length of the strap 11a (FIG. 6(c)). The flat plate-type perforator 38 of FIGS. 7(a) and (b) has a section comprising one square end and an opposite triangular end. The resulting perforation strap 11d extends along the length of the strap 11a, one end being shaped in a triangle (FIG. 7(c)).

The flat plate-type perforator 38 of FIGS. 8(a) and (b) comprises rounded sides in the thickness direction as well as an edged piercing head. This perforator 38 can easily form an oblong-section perforation 11d with rounded ends along the length of the strap 11a (FIG. 8(c)). The flat plate-type perforator 38 of FIGS. 9(a) and (b) has a rectangular section and comprises an edged piercing head sloping from one side to the other. The resulting perforation 11d has a rectangular section extending along the length of the strap 11a (FIG. 9(c)).

The perforator 38 for forming the perforation 11d is made of a material of high thermal conductivity (e.g. pre-shaped plated copper). Due to its high thermal conductivity, the whole part of the perforator 38 heats up quickly and uniformly to a prescribed temperature. As a result, it efficiently forms the perforation 11d and the melt-bonded area 11e in a short time.

Figure 10A:
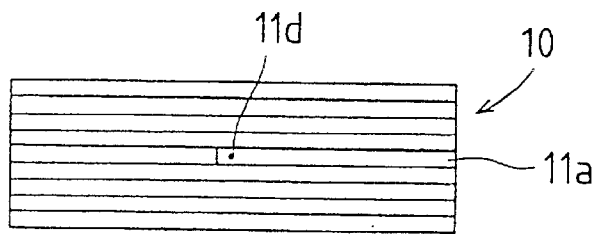
FIG. 10(a) is a development showing the inner cylindrical surface surrounding the hollow 11b in a packaging strap coil.

FIG. 10(a) is a development showing the inner cylindrical surface of the strap coil 11 surrounding the hollow 11b. The innermost end of the strap 11a locates at the middle of the axial length of the hollow 11b. At the innermost strap end, a single perforation 11d is formed in the widthwise centre of the strap 11a, whereby the innermost end of the strap 11a and the layers laminated thereon are mutually bonded at the melt-bonded area 11e. On the other hand, in the strap coil 11 of the present invention, a plurality of perforations 11d are provided in the inner cylindrical surface of the strap coil 11 surrounding the hollow 11b, together with the melt-bonded areas 11e formed along the periphery thereof. This structure avoids unwinding or disintegration of the strap 11a helically wound around the hollow 11b.

Figure 10B:
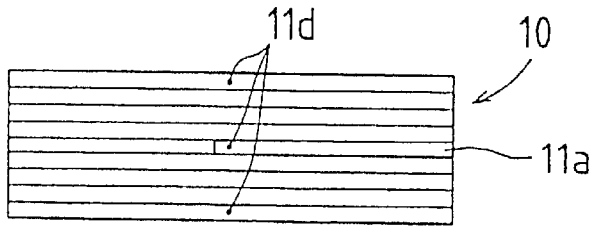
FIGS. 10(b)–(g) are developments each showing the inner cylindrical surface surrounding the hollow 11b in the packaging strap coil 11 of the present invention.

By way of illustration, the strap coil 11 of FIG. 10(b) includes three perforations 11d, one formed in the innermost strap end and the others in the edgewise rows along the axial ends of the hollow 11b. Each perforation 11d is aligned with the others in the axial direction of the hollow 11b. The melt-bonded areas 11e are provided along the periphery of the perforations 11d.

Figure 10C:
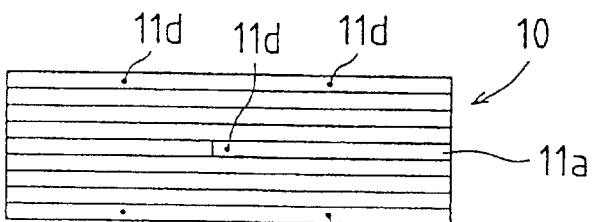

The strap coil 11 of FIG. 10(c)includes five perforations 11d, one formed in the innermost strap end and the others formed in pairs in the edgewise rows along the axial ends of the hollow 11b. The perforations 11d in the edgewise rows are circumferenrially dislocated from the perforation 11d in the innermost strap end.

Figure 10D:
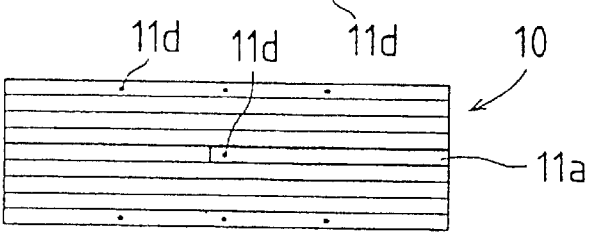

The melt-bonded areas 11e are likewise provided along the periphery of the perforations 11d. Additionally, FIG. 10(d) shows a combination of the structures of FIGS. 10(b) and (c).

Figure 10E:
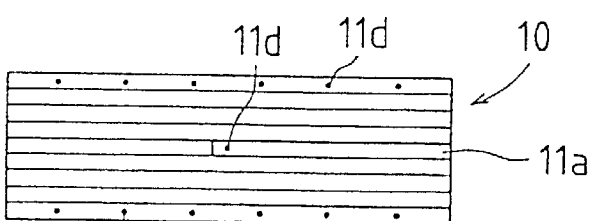
Figure 10F:
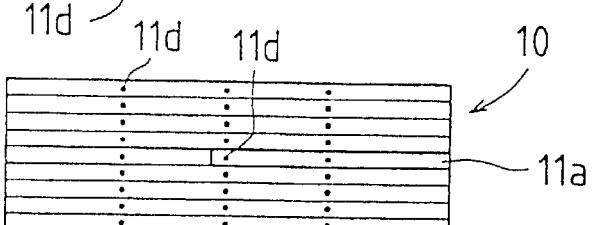

Further, the strap coil 11 of FIG. 10(e) includes a plurality of perforations 11d which are circumferentially equally spaced in the edgewise rows along the axial ends of the hollow 11b. The strap coil 11 of FIG. 10(f) provides a plurality of (e.g. three) perforations 11d in every axially adjacent row of the strap 11a around the hollow 11b, each being aligned with the others in the axial direction of the hollow 11b.

Figure 10G:
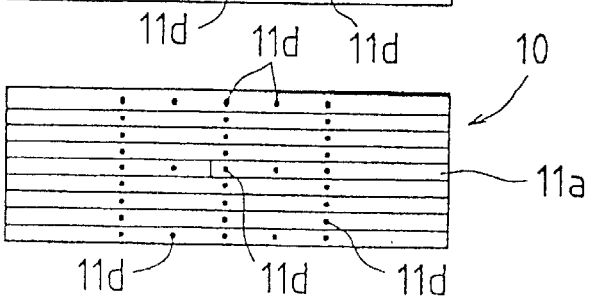
Figure 11A:
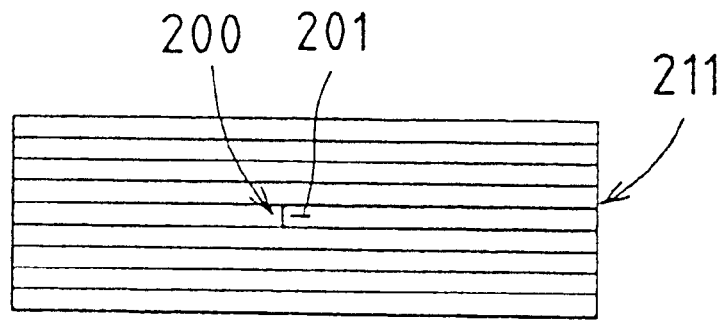
FIGS. 11(a)–(e) relate to comparative embodiments.
Figure 11B:
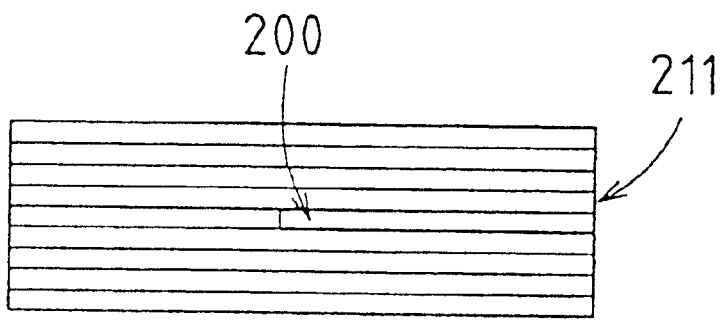
Figure 11C:
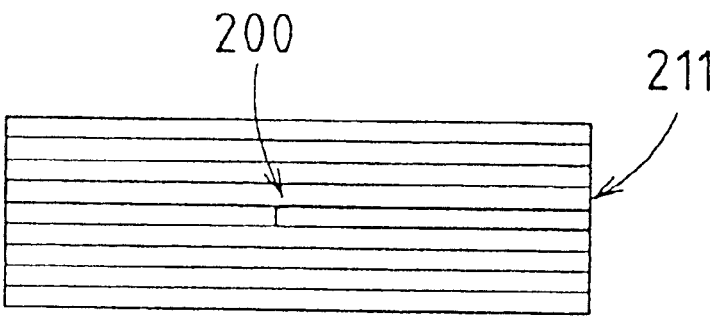
Figure 11D:
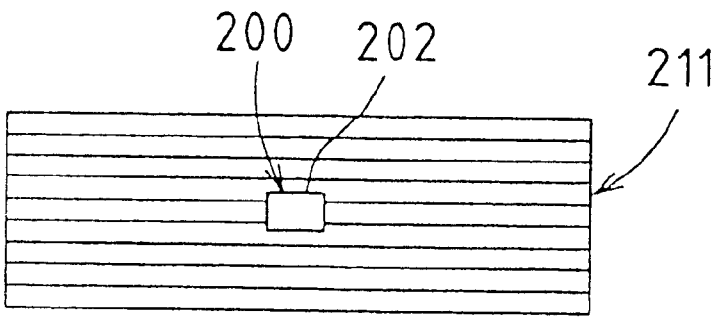
Figure 11E:
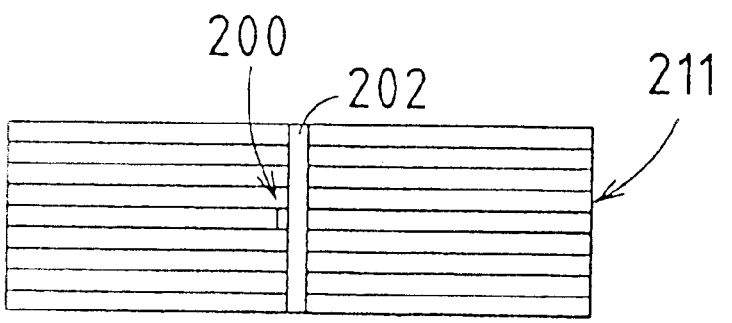

Furthermore, the strap coil 11 of FIG. 10(g) interposes perforations 11d between the axially aligned perforations 11*d* of FIG. 10(*f*), in the central row and edgewise rows in the axial direction of the hollow 11*b*.

In order to achieve a desired peeling strength (melt-bonding strength) and a widthwise tensile strength at the melt-bonded area 11*e* where bonding is effected between the laminated layers of the strap 11*a*, the perforations 11*d* are prescribed in terms of the configuration, dimension, number, position, etc., depending on the material, thickness, width, etc. of the strap 11*a*. The strap coils 11 of FIGS. 10(*a*)–(*g*) based or different patterns of the perforation(s) 11*d* and the melt-bonded area(s) 11*e* were tested for vibration resistance, transportation resistance, loadability on a conventional strap coil reel in an automatic packaging machine (drum-set test), and packageability in an automatic packaging machine as loaded on the strap coil reel (machine-packageability test). The test results were compiled in FIG. 12, wherein Examples 1–7 correspond to the strap coil 11 of FIGS. 10(*a*)–(*g*), respectively. The comparative examples were conducted using packaging strap coils 211 of FIGS. 11(*a*)–(*e*), each showing the development of the inner cylindrical surface surrounding the hollow 11*b*.

The strap coils illustrated in FIGS. 10 and 11 were made of a polypropylene strap.

In Comparative Examples, it should be understood that the innermost strap ends 200 of all strap coils 211 were positioned at the middle of its axial length, where the strap ends 200 were left unsecured or secured in various manners. In Comparative Example 1 (FIG. 11(*a*)), the innermost strap end 200 was fixed on a tubular paper core (not shown) by means of a stapler 201 (staple width 10 mm). On the other hand, Comparative Examples 2 to 5 employed coreless strap coils 211. In Comparative Example 2 (FIG. 11(*b*)), the innermost strap end 200 was left unsecured. In Comparative Example 3 (FIG. 11(*c*)), the innermost strap end 200 was left unsecured, but annealed, before wound into a strap coil, for 10 minutes at 80° C. to prevent its contraction and deformation. In Comparative Example 4 (FIG. 11(*d*)), the innermost strap end 200 was secured with the adjacent rows of the strap coil 211 by a kraft tape 202. In Comparative Example 5 (FIG. 12(*e*)), the innermost strap end 200 was secured with the all widthwise rows of the strap coil 211 by a craft tape 202.

[Test Procedures]
Vibration Test

Each sample strap coil was horizontally laid on a 250-mm-diameter cylindrical mount placed on a vibration plate. The vibration plate was vertically vibrated 100 times/min. in the range of 15 mm. The grading was based on the following criteria. The samples graded ○ did not unwind or collapse on the inner cylindrical surface after 1 hour of vibration; the samples graded Δ had the inner cylindrical surface unwound after 30 minutes to 1 hour of vibration; and the samples graded × had the inner cylindrical surface unwound within 30 minutes of vibration.

Transportation Test

Each sample was packed in a corrugated cardboard box (length×width×depth: 465×465×210 (mm) ) and transported by a lorry over a distance of 500 km. Each Example employed five samples in this test. The results in FIG. 12 indicate the number of samples whose inner surface had unwounded or collapsed during transportation.

Drum-Set Test

The drum-set test examined the handling property of the strap coil during a loading operation on a drum of an automatic packaging machine. The automatic packaging machines used were: NAIGAI F11 (hereinafter referred to "Machine A"), NICHIRO SX-500 ("Machine B") and STRAPACK RQ-8 ("Machine C"). Each Example employed two samples in this test. The results in FIG. 12 indicate the number of samples whose inner surface had unwounded or collapsed before completion of the loading.

Machine-packageabiltiy Test

The machine-packageability test examined the incidence of troubles during normal packaging operation, such as tape-blocking in the pre-feed rollers or the like. Each example employed two samples in Machines A, B and C, respectively. The results in FIG. 12 represent the number of samples which caused any such trouble.

As apparent from FIG. 12, the strap coils 11 of the present invention as illustrated in FIGS. 10(*b*)–(*g*) gave remarkable results. None of them had the inner cylindrical surface unwound. Besides, when used in an automatic packaging machine, they caused no trouble line blocking.

In addition, the peeling strength of the thermoplastic strap end was measured using the test pieces 311 as shown in FIGS. 13(*a*)–(*f*) made of a polypropylene strap. The test pieces 311 had their strap ends secured in different manners, for example, by varying the number and position of the perforation(s). The polypropylene strap as used in the above-mentioned tests such as the vibration test was wound around a 200-mm-diameter core, wherein the strap end was melt-bonded by the perforation(s) 11*d* at 20 mm inside from the innermost edge of the strap, according to the patterns shown in FIGS. 13(*a*)–(*e*). For comparison, the strap end of the test piece 311 shown in FIG. 13(*f*) was fixed on a paper core 312 by means of a stapler 313. The test pieces 311 were stretched downwards at a rate of 50 min/min. until the bonded area peeled off. The thus measured values are shown in the right column of FIG. 13.

From the viewpoint of the appearance, the perforation 11*d* preferably has a small circular section, which does not stand out in the strap 11*a*. Hence, the finished strap coil looks almost like conventional coreless strap coils.

In the circular-section perforations 11*d* as shown in FIGS. 3 and 4, the peeling strength at the melt-bonded area 11*e* depends on the circumferential length of the perforation 11*d*, which is prescribed in accordance with the material and thickness of the strap n 11*a*. Therefore, a required peeling strength can be achieved simply by calculating the diameter of the perforation 11*d* from the prescribed circumferential length thereof and then forming a perforation 11*d* of such diameter, which gives the required melt-bonded area 11*e* along its periphery.

Figure 14:
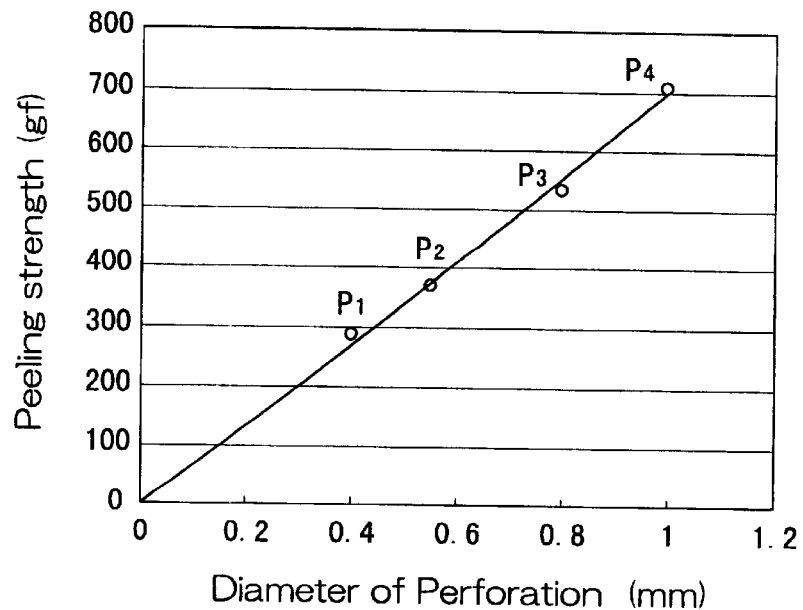
FIG. 14 is a graph showing the relationship between the diameter of the perforation and the peeling strength at the melt-bonded area in the packaging strap coil 11 of the present invention.

FIG. 14 is a graph showing the relationship between the diameter of the perforation 11*d* and the peeling strength at the melt-bonded area 11*e*. The strap coil used herein was prepared by helically winding a polypropylene strap 11*a* having a thickness of 0.65 mm and a width of 15.5 mm. In this strap coil, the circular-section perforation 11*d* and the melt-bonded area 11*e* were formed by piercing a pin-type perforator 38 of FIGS. 3(*a*) and (*b*) which was preheated above the melting temperature of the strap 11*a*. The peeling strength at the melt-bonded area 11*e* was measured at a stretching rate of 200 mm/min.

As shown in FIG. 14, a 0.4-mm-diameter perforation 11*d* showed a peeling strength $P_1$ of about 300 gf at the melt-bonded area 11*e*. A 0.6-mm-diameter perforation 11*d* showed a peeling strength $P_2$ of about 380 gf. In these cases, the bonded layers of the strap 11*a* were smoothly peeled off and not torn in the longitudinal direction. Further, the peeling strength at the melt-bonded area 11*e* can be increased by enlarging the diameter of the perforation strap 11*d*. A 0.8-mm-diameter perforation 11*d* showed a peeling strength $P_3$ of about 550 gf, and a 1.0-mm-diameter perforation 11d showed a peeling strength $P_4$ of about 700 gf. In these cases, however, the bonded layers could not be peeled off from each other, and one of the layers was torn away in the longitudinal direction.

In a thermoplastic resin strap 11a (for example, made of polypropylene), a thinner strap 11a is more vulnerable to the longitudinal tear. Therefore, in proportion to the decrease of the thickness of the strap 11a, the diameter of the perforation 11d should be diminished to reduce the peeling strength at the melt-bonded area 11e. Thereby, the bonded layers of a thinner strap can be safely peeled off from each other at the melt-bonded area 11e without being torn away in the longitudinal direction. According to FIG. 14, a 0.65-mm-thick polypropylene strap 11a keeps a peeling strength of 400 gf or less at the melt-bonded area 11e, when the diameter of the perforation 11d is 0.6 mm or less. To ensure the same peeling strength, a 0.5-mm-thick PET (polyethylene terephthalate) strap 11a should have a perforation 11d with a diameter of 1.2 mm or less.

As hereinbefore described, by reducing the diameter of the perforation 11d, the melt-bonded area 11e formed along its periphery becomes smaller and exhibits a lower peeling strength. In such circumstances, a desired peeling strength can be obtained by forming a plurality of perforations 11d, which, as a whole, provide the peeling strength at the melt-bonded area 11e.

Although the above description has been focused on the circular-section perforation 11d, the perforations 11d shown in FIGS. 5 to 9 can also achieve a desired peeling strength at the melt-bonded area 11e and widthwise tensile strength of the strap 11a, at which the bonded layers of the strap 11a are safely peeled off but not torn away. According to the same principles, the circumferential length, configuration, number, position, etc. of the perforation 11d are designed in view of the material, thickness and the width of the strap 11a.

The perforations 11d of FIGS. 5 to 9 have a section elongated in one direction, as described above. In order to prevent the strap 11a from being torn away, the longitudinal direction of the perforation 11d should be aligned with the longitudinal direction of the strap 11a.

Figure 15:
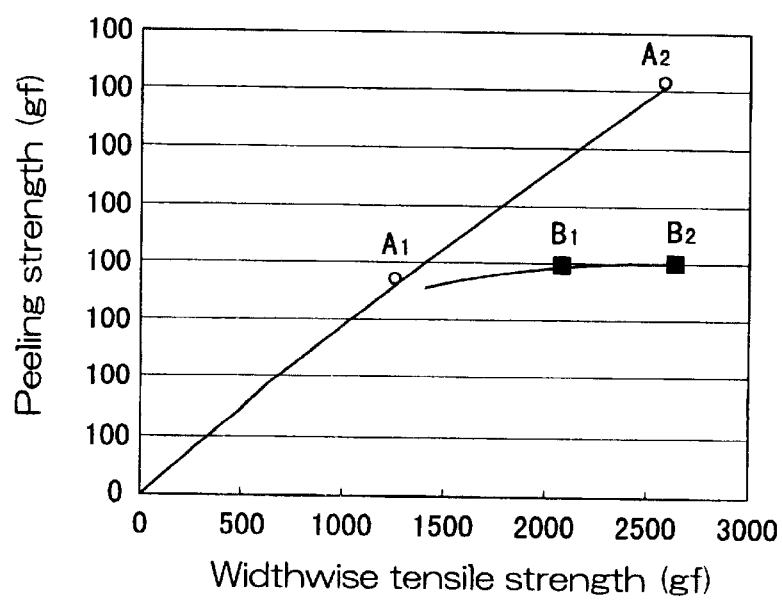
FIG. 15 is a graph showing the relationship between the widthwise tensile strength of the packaging strap 11a and the peeling strength at the melt-bonded area in the packaging strap coil 11 of the present invention.

FIG. 15 is a graph showing the relationship between the widthwise tensile strength of the strap 11a and the peeling strength at the melt-bonded area 11e, with respect to the perforations 11d of circular section and those of rectangular section. The values of the circular-section perforations 11d are indicated by $A_1$ (diameter: 0.55 mm) and $A_2$ (diameter: 1.00 mm). The values of the rectangular-section perforations 11d are indicated by $B_1$ (0.55×5 mm) and $B_2$ (0.55×8 mm). The rectangular-section perforations 11d have their longitudinal sides aligned with the longitudinal direction of the strap 11a.

As for the circular-section perforations 11d, expansion of the diameter results in increasing the peeling strength at the melt-bonded area 11e as well as the widthwise tensile strength of the strap 11a. In contrast, as for the rectangular-section perforations strap 11d, elongation of the longitudinal sides hardly affects the peeling strength at the melt-bonded area 11e (the value substantially remains at about 400 gf). On the other hand, the widthwise tensile strength of the strap 11a increases in proportion to the increase of the longitudinal length.

Incidentally, it is desirable for a 0.65-mm-thick: polypropylene strap 11a to have a peeling strength at the melt-bonded area 11e of 400 gf or less and a widthwise tensile strength of the strap 11a of about 2,000 gf. In case of the rectangular-section perforation 11d, these values are suitably achieved by adjusting the length of its longitudinal sides. Proper combination of the peeling strength and the widthwise tensile strength not only ensures safe peeling and tear prevention between the bonded layers of the strap 11a, but also prohibits unwanted unwinding of the strap coil 11. Besides, in the rectangular-section perforation 11d, the widthwise tensile strength of the strap 11a can be increased by extending its longitudinal length, instead of adding more perforations.

Additionally, the strap coil 11 of the present invention may include a perforation 11d in the outer cylindrical surface thereof. The perforation 11d is pierced in the neighbourhood of the outermost end through to the underlying layers of the strap 11a, thereby bonding these layers at the melt-bonded area 11e formed along its periphery. This arrangement prevents the outermost strap end from being drawn out unnecessarily. Hence, a conventional strap end securing process such as taping or separate thermofusing is no longer required.

FIGS. 16(a)–(f) is a series of schematic views showing production steps of the strap coil 11. These steeps are carried out, for example, by using a winding roller 31 shown in FIG. 16(a). The winding roller 31 has a hollow cylindrical shape composed of four equivalent cylinder frames 31a obtained by circumferentially quartering a cylinder of suitable axial length. Each cylinder frame 31a is spaced along a single circumference with a circumferential gap 31c to constitute a cylinder of circular section. The four cylinder frames 31a arranged along a single circumference can contract the diameter of the circular-section cylinder, when allowed to slide toward the axis of the cylinder. On the other hand, the contracted cylinder is diametrically expanded by sliding the cylinder frames 31a outwardly. An aperture 31d is formed beforehand in the middle of each cylinder frame 31a.

The winding roller 31 accommodates four holders 39, each of which faces the cylinder frame 31a and holds a circular-section perforator 38 in place. Similar to the cylinder frames 31a, the four holders 39 have a curved configuration and spaced along a single circumference with a circumferential gap to constitute a cylinder of circular section. The holders 39 are also slidable in the radial directions. The perforator 38 is mounted on the outer surface of each holder 39 in such a manner that it can project radially through the aperture 31d formed in the cylinder frame 31a. Although not shown in the figure, a heater is provided inside each holder 39 for the purpose of heating the perforator 38, and the outer surface of the holder 39 is covered by a heat insulating material.

In order to wind the strap 11a on the winding roller 31, a fixture 33 is attached to the start of the strap 11a (i.e. innermost end of the strap coil 11) guided by a strap guide 34. Then, as shown in FIG. 16(b) the cylinder frames 31a are allowed to slide outwardly along a single circumference to form a circular-section cylinder. Inside the winding roller 31, the holders 39 maintain a properly spaced relationship with respect to the cylinder frames 31a, thereby keeping the perforators 38 away from the cylinder frames 31a. The fixture 33 attached at the start of the strap 11a is fitted into the gap 31c created between a pair of neighbouring cylinder frames 31a, and thus secures the start of the strap 11a in the middle of the axial length of the winding roller 31. With these provisions being made, the winding roller 31 may start to rotate in the direction of the arrow T in FIG. 16(b) and wind the strap 11a thereon.

After the strap 11a has made a plurality of layers around the middle of the axial length of the winding roller 31 (FIG. 16(c)), the winding roller 31 is stopped at such a position that the apertures 31d in the cylinder frames 31a locate face to face with the perforators 38 projecting from the holders 39.

In the next step shown in FIG. 16(d), the holders 39 which hold heated perforators 38 are allowed to slide in the radial direction towards the cylinder frames 31a. The perforators 38 are preheated above the melting point of a thermoplastic resin constituting the strap 11a. For example, for a polypropylene strap 11a, the perforators 38 are heated to about 200° C., which is higher than the melting point of polypropylene. Together with the outward displacement of the holders 39, the perforators 38 advance through the apertures 31d of the cylinder frames 31a and stick into the plural laminated layers of the strap 11a wound on the winding roller 31. In consequence, four circumferentially equally spaced perforations 11d (see FIG. 2) are formed simultaneously in the laminated layers of the strap 11a, leaving the periphery thereof in the melted state.

Next, as shown in FIG. 16(e), the holders 39 are allowed to slide away from the cylinder frames 31a, with retracting the perforators 38 from the apertures 31d. Following the withdrawal of the perforators 38, the melted areas along the periphery of the perforations 11d solidify to form melt-bonded areas 11e (see FIG. 2), which bond the laminated layers of the strap 11a. Thereafter, the winding roller 31 is rotated until a predetermined length of the strap 11a is wound thereon. While the winding of the strap 11a proceeds, the strap 11a is axially reciprocated along the winding roller 31, so that the strap 11a is helically wound on the cylindrical surface of the winding roller 31 in a prescribed axial length thereof.

After a predetermined length of the strap 11a is wound on the winding roller 31, the diameter of the winding roller 31 is reduced by sliding the cylinder frames 31a toward the axis thereof (FIG. 16(f)). The diametrically contracted winding roller 31 is removed from the axis of the helically wound strap 11a. Thus obtained is a coreless strap coil 11 whose axis is defined by a hollow 11b.

In forming the perforations 11d in the laminated layers of the strap 11a, the configuration, number, position, etc. of the perforators 38 are suitably adjusted so as to hold a balance between the peeling strength (or widthwise tensile strength of the strap 11a) and the bonding strength at the melt-bonded area 11e. Hence, use can be also made of one or more perforators 38 of FIGS. 5 to 9.

As an alternative embodiment, the holders 39 holding the perforators 38 may be rotated in synchronisation with the winding roller 31, thereby eliminating the step of aligning the cylinder frames 31a with the holders 39. This arrangement enhances the operation efficiency, because the perforations strap 11d are formed while the winding roller 31 is in rotation.

The perforator 38 for forming the perforation 11d may be applied either at the bottom side of the innermost strap 11a as described in FIGS. 16(a)–(f) (i.e. from the axis side of the winding roller 31), or at the top side of the laminated layers of the strap 11a as described in FIGS. 17(a)–(g).

Figure 17A:
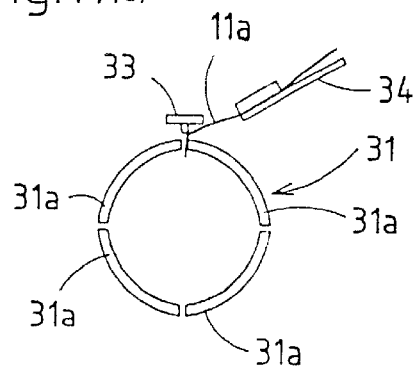
FIGS. 17(a)–(g) schematically describe a series of production steps of the strap coil 11 in another embodiment of the present invention.
Figure 17B:
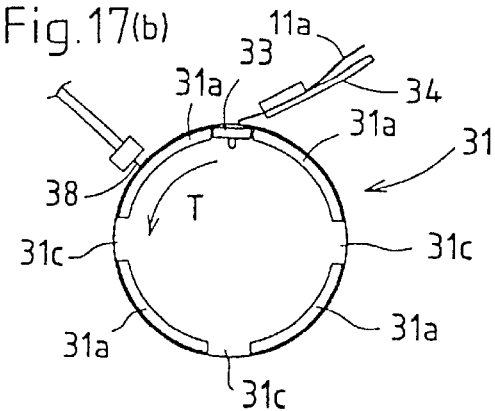

The production steps shown in FIGS. 17(a)–(g) are carried out by using a winding roller 31 which comprises four cylinder frames 31a, as shown in FIG. 17(a). The cylinder frames 31a can slide outwardly along a single circumference to constitute the winding roller 31 of circular section (FIG. 17(b)). In the diametrically expanded winding roller 31, the start of the strap 11a guided by the strap guide 34 is fixed in the middle of the axial length of the winding roller 31 by fitting the fixture 33 attached to the start of the strap into the gap 31c between the neighbouring cylinder frames 31a.

The perforator 38, held in the vicinity of the winding roller 31 by a suitable holder, is able to advance and recede in the radial directions of the winding roller 31. After the start of the strap 11a is fixed on the outer cylindrical surface of the winding roller 31, the winding roller 31 is allowed to rotate in the direction of the arrow T until the strap 11a makes a plurality of layers around the middle of the axial length of the winding roller 31. Then, the winding roller 31 is stopped at the position shown in FIG. 17(b) The perforator 38, which is heated by a heater to a predetermined temperature, is allowed to approach the winding roller 31 from the external side thereof and to pierce in the laminated layers through to the start of the strap 11a. In consequence, a perforation 11d is formed in the laminated layers of the strap 11a, leaving the periphery thereof in the melted state.

Figure 17C:
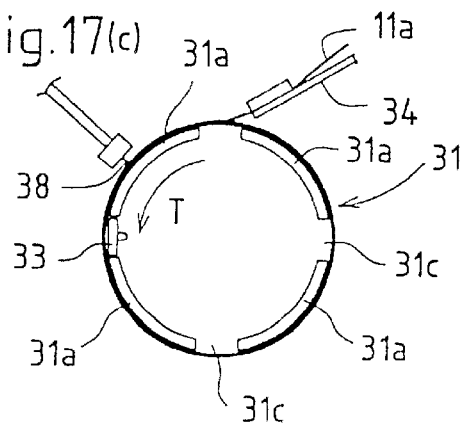

Then, the perforator 38 is allowed to recede from the winding roller 31 and pulled out of the laminated layers of the strap 11a, whereby the melted area around he perforation 11d solidifies into a melt-bonded area 11e Following the formation of the first perforation 11d the winding roller 31 effects a quarter of rotation (i.e. rotation of 90°) in the direction of the arrow T (FIG. 17(c)), and stops again. At this position, the preheated perforator 38 is allowed to approach the winding roller 31 and pierce another perforation strap 11d into the laminated layer of the strap 11a, and then the perforator 38 is allowed to recede in the opposite direction and pulled out of the strap 11a.

Figure 17D:
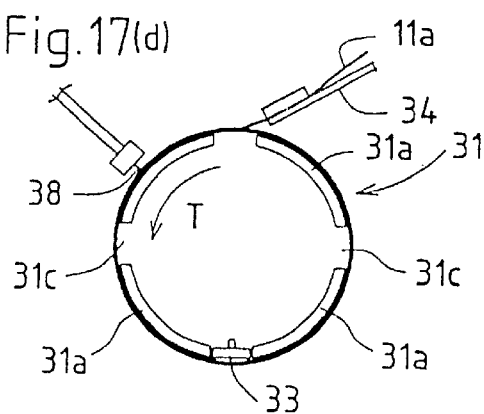
Figure 17E:
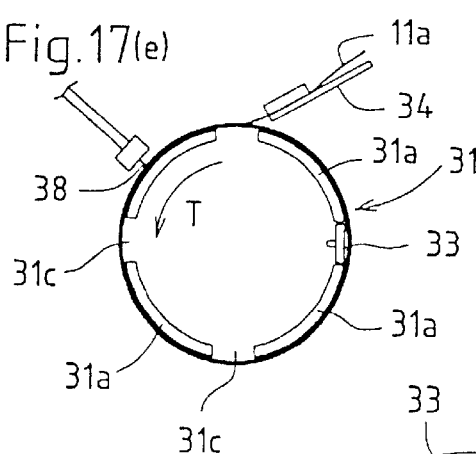

The formation of the perforation 11d is repeated, as shown in FIGS. 17(d) and (e), according to the bonding cycle which comprises rotating the winding roller 31 by 90 degrees (i.e. a quarter of rotation), piercing the perforator 38 into the laminated layers of the strap 11a to form a perforation 11d (see FIG. 2), and withdrawing the perforator 38 from the strap 11a to solidify a melt-bonded area 11e (see FIG. 2). In the end, there are provided a total of four circumferentially equally spaced perforations 11d and melt-bonded areas 11e.

Figure 17F:
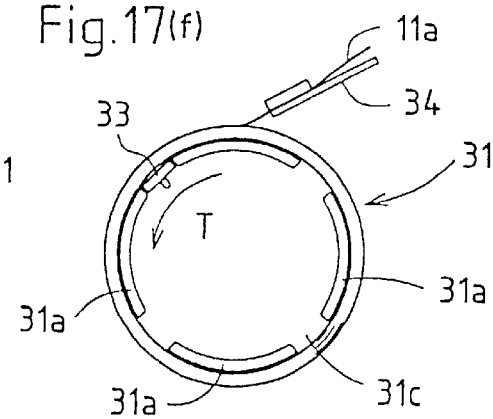
Figure 17G:
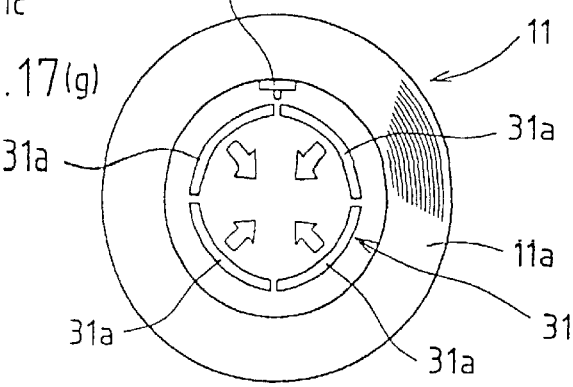

Following the formation of four perforations 11d and melt-bonded areas 11e, the winding roller 31 is continuously rotated to wind a predetermined length of the strap 11a into a coil (FIG. 17(f) When the winding roller 31 ceases to rotate, the winding roller 31 is diametrically contracted by sliding the cylinder frames 31a toward the axis of the winding roller 31 (FIG. 17(g)). The contracted winding roller 31 is removed from the axis of the helically wound strap 11a. Thus obtained is a coreless strap coil 11 whose axis is defined by a hollow 11b.

Instead of the heated perforator 38, a laser beam may be applied for the formation of the perforation 11d and the melt-bonded area 11e, as illustrated in FIGS. 18(a)–(g). This embodiment likewise utilises the winding roller 31 comprising four cylinder frames 31a (FIG. 18(a)). Each cylinder frame 31a is operated to slide in the radial directions by an air cylinder 36 accommodated in the winding roller 31. While the winding roller 31 is diametrically contracted by sliding the cylinder frames 31a toward the axis of the winding roller 31, the fixture 33 is attached to the start of the strap 11a guided by the strap guide 34.

Figure 18A:
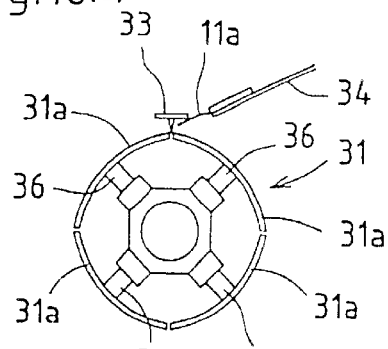
Figure 18B:
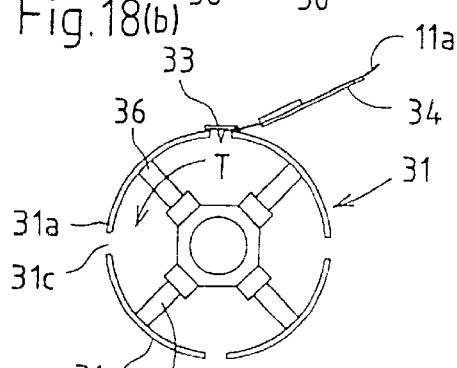

Thereafter, as shown in FIG. 18(b), the cylinder frames 31a are outwardly displaced along a single circumference by the air cylinder 36 to constitute a circular-section winding roller 31 having an expanded diameter. The fixture 33 is fitted into the gap 31c created between the neighbouring cylinder frames 31a to fix the start of the strap 11a in the middle of the axial length of the winding roller 31.

Figure 18C:
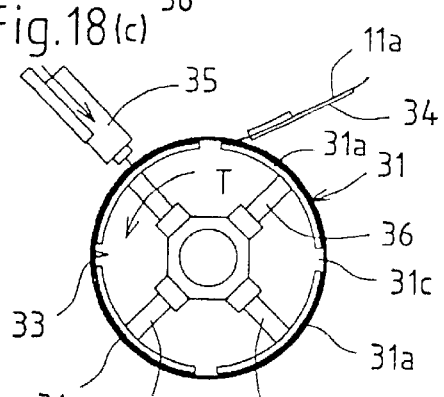

Referring to FIG. 18(c), a laser oscillator unit 35 is disposed in the vicinity of the winding roller 31, with orienting the direction of its laser beam irradiation along the radial direction of the winding roller 31. Further, the laser oscillator unit 35 is able to advance and recede with respect to the winding roller 31. With securely holding the start of the strap 11a on the outer cylindrical surface of the winding roller 31, the winding roller 31 is allowed to rotate in the direction of the arrow T until the strap 11a makes about three turns around the middle of the axial length thereof. After the winding roller 31 ceases to rotate, the laser oscillator unit 35 is allowed to approach the winding roller 31 and to irradiate a laser beam on the laminated layers through to the innermost end of the strap 11a. The laser beam melts a portion of the laminated layers and the innermost end of the strap 11a and provides a perforation 11d and a melt-bonded area 11e. The laminated layers are thus bonded together at the melt-bonded area 11e (see FIG. 2) along the periphery of the perforation 11d (see FIG. 2).

Figure 18D:
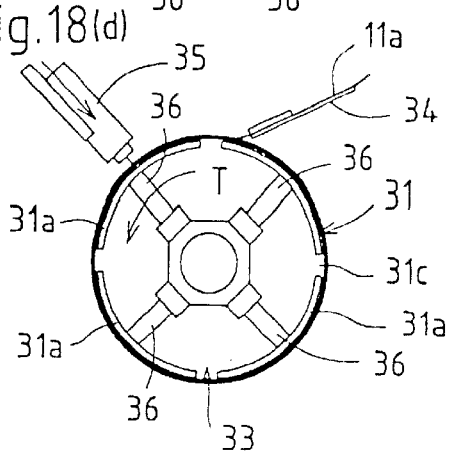

After the formation of the first perforation 11d, the winding roller 31 effects a quarter of rotation (i.e. rotation of 90°) in the direction of the arrow T (FIG. 18(d)), and stops again. At this position, the laser oscillator unit 35 irradiates a laser beam on the laminated layers of the strap 11a to form another perforation 11d and a melt-bonded area 11e along its periphery.

The formation of the perforation 11d is repeated according to the bonding cycle which comprises rotating the winding roller 31 by 90 degrees (i.e. a quarter of rotation) and irradiating a laser beam by the laser oscillator unit 35, thereby to form a perforation 11d and a melt-bonded area 11e along its periphery through the laminated layers of the strap 11a. In the end, there are provided a total of four circumferentially equally spaced perforations 11d and melt-bonded areas 11e.

Figure 18E:
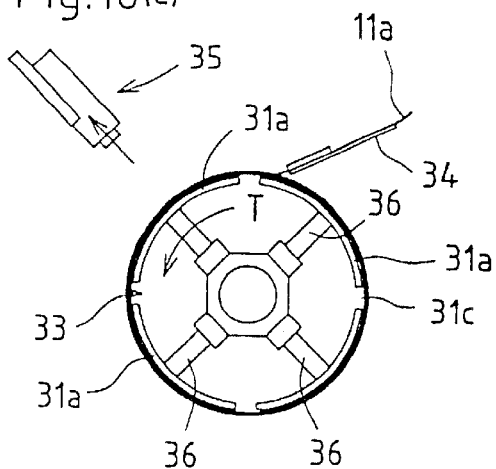
Figure 18F:
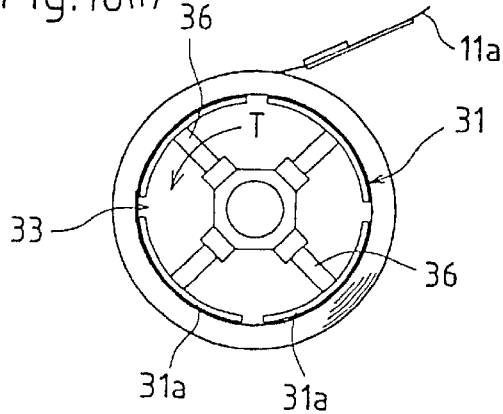
Figure 18G:
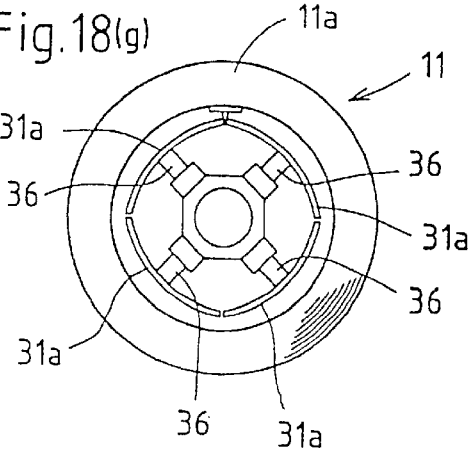

Thereafter, the laser oscillator unit 35 is allowed to recede from the winding roller 31 (FIG. 18(e)), and the winding roller 31 is rotated continuously to wind a predetermined length the strap 11a into a coil (FIG. 18(f)). After the winding roller 31 ceases to rotate, the winding roller 31 is diametrically contracted by sliding the cylinder frames 31a toward its axis (FIG. 18(g)). The contracted winding roller 31 is removed from the axis of the helically wound strap 11a. Thus obtained is a coreless strap coil 11 whose axis is defined by a hollow 11b.

As has been described, a laser beam irradiated from the laser oscillator unit 35 can form a smaller perforation 11d in a more stable and efficient manner. In addition, the laser oscillator unit 35 is composed of less expendable parts and thus easy to maintain.

As the laser oscillator unit 35, there may be used a $CO_2$ laser oscillator unit which employs $CO_2$ gas as the laser medium. The $CO_2$ laser oscillator unit irradiates a laser beam of 27 W output power at a wavelength of 10.5–10.7 $\mu$m as operated by a current of 6A. The irradiation time of the laser beam is in the range of about 0.1 to 5 seconds, preferably about 0.5 second, at which time the laser irradiation hardly affects the winding rate of the strap 11a.

In addition to the $CO_2$ laser oscillator unit, the examples of the laser oscillator unit 35 include a helium-neon laser oscillator unit, a semiconductor laser oscillator unit and the like.

Figure 19:
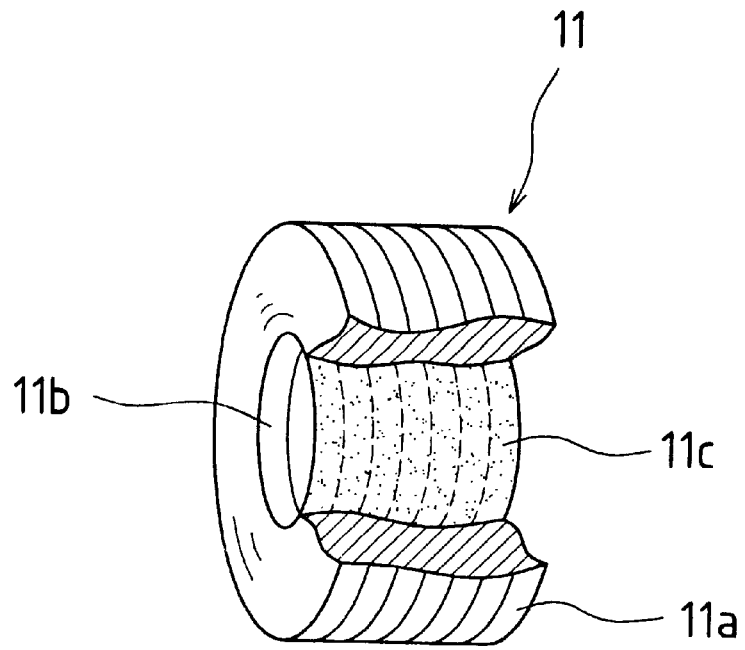
FIG. 19 is a partly broken-away perspective view of the appearance of another packaging strap coil of the present invention.

FIG. 19 is a partially cutout perspective view showing another embodiment of the packaging strap coil of the present invention. In the innermost cylindrical surface of this strap coil 11, the strap 11a is helically wound around the hollow 11b from one axial end to the other axial end. Another layer of the strap 11a is thereafter helically laminated on the top side of the innermost strap layer. In this way, the strap 11a is wound helically and continuously to form the strap coil 11.

Figure 20:
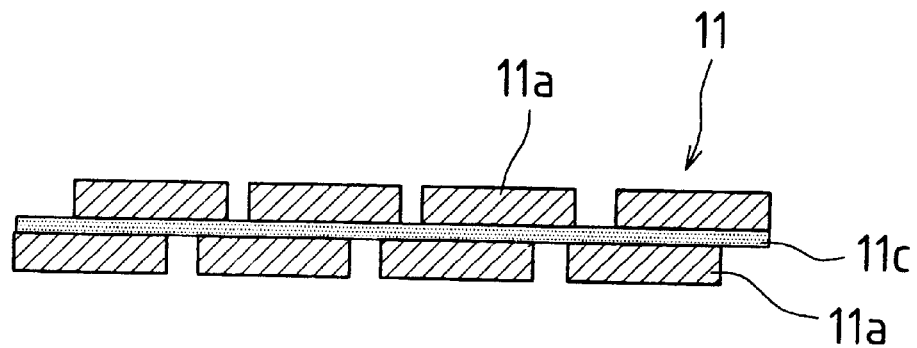
FIG. 20 is a section of the main part of the strap coil.

In the strap coil 11 of FIG. 19, an adhesive 11c is applied, along the entire axial length of the strap coil 11, on the top side of the innermost rows of the strap 11a which constitute the inner cylindrical surface of the strap coil 11 surrounding the hollow 11b. FIG. 20 shows a partial section of the strap coil 11 coated with the adhesive 11c. The adhesive 11c provides an adhesive layer on the top side of the innermost rows of the strap 11a which is helically wound around the hollow 11b to constitute the inner cylindrical surface of the strap coil 11, and similarly on the top side of a couple of strap layers laminated thereon. The adhesive 11c is pressure-sensitive and bonds the laminated layers of the strap 11a with an appropriate adhesive strength.

Owing to the adhesive 11c which exhibits an appropriate adhesive strength, the innermost helical rows of the strap 11a which constitute the inner cylindrical surface surrounding the hollow 11b are bonded to the strap layers laminated on the top side thereof. Hence, the start of the strap 11a (i.e. innermost end of the strap coil 11) does not unwind into the hollow 11b. Moreover, the innermost helical rows of the strap 11a are adhesive-bonded in its entirety to several layers laminated on the top side thereof. As a result, the strap coil 11 will not unwound around the hollow 11b.

When used in a packaging machine for automatically strapping a corrugated cardboard box or like items, the adhesive-bonded strap coil 11 is loaded on a strap coil reel mounted on the automatic packaging machine. In operation, the outermost strap end on the outer cylindrical surface of the strap coil 11 is drawn out by the feed rollers of the automatic packaging machine. Since the top side of the innermost strap layer surrounding the hollow 11b is adhesive-bonded to the laminated layers with a uniform adhesive strength, the adhesive-bonded portion is safely peeled off and not torn away while the strap 11a is drawn out.

As mentioned above, the innermost end of the strap 11a, which locates on the inner cylindrical surface surrounding the hollow 11b which defines the axis of the strap coil 11, should not peel off so easily from the strap layers laminated on the top side thereof. But, on the other hand, it should peel off from the bonded portion with a proper tensile strength. So far as this requirement is satisfied, the species of the adhesive 11c is not strictly limited. Desirable adhesives among the solvent-type and non-solvent-type include, for example, hot-melt-type adhesives and liquid-solidified-type adhesives.

The solvent-type adhesives include rubber-based adhesives such as natural rubber, a styrene-butadiene rubber, a polyisobutylene rubber and an isoprene rubber, acrylic adhesives such as copolymers comprising 2-ethylhexyl acrylate as a principal monomer, and silicon-based adhesives comprising a rubber-like siloxane or a resinous siloxane as a main constituent. As the solvent for rubber-based adhesives, there may be used volatile oils for rubbers, trichloroethylene, toluene, n-hexane, methyl ethyl ketone and the like.

The non-solvent hot-melt-type adhesives preferably comprise a block polymer having a high melting point and melt fluidity, such as the copolymers of stylene-isoprene-stylene, stylene-butadiene-stylene, stylene-ethylene-butylene-stylene, ethylene-vinyl acetate and the like. Additionally, polyethylene wax and paraffin nay be employed. Preferably, the melting point of the hot-melt-type adhesives is lower than that of the strap 11a, particularly not higher than 100° C. In this respect, a strap 11a made of polypropylene (PP) prefers a low-molecular-weight polyethylene, EVA, paraffin and the like. A strap 11a made of polyethylene terephthalate (PET) advantageously utilises a low-molecular-weight polyethylene, EVA, PP and the like.

As non-solvent-type adhesives, use may be further made of liquid-solidified-type polyester-based adhesives or acrylic adhesives.

Instead of the adhesives 11c of solvent-type, hot-melt-type and non-solvent-type, the hot-melt resin may be independently employed as the adhesive 11c. By way of example, a hot-melt resin which is the same as or similar to the material of the strap 11a (e.g. polypropylenes) is employed in a state heated above its melting point. When injected between the strap layers, the melted resin bonds these layers in a peelable manner.

Figure 21:
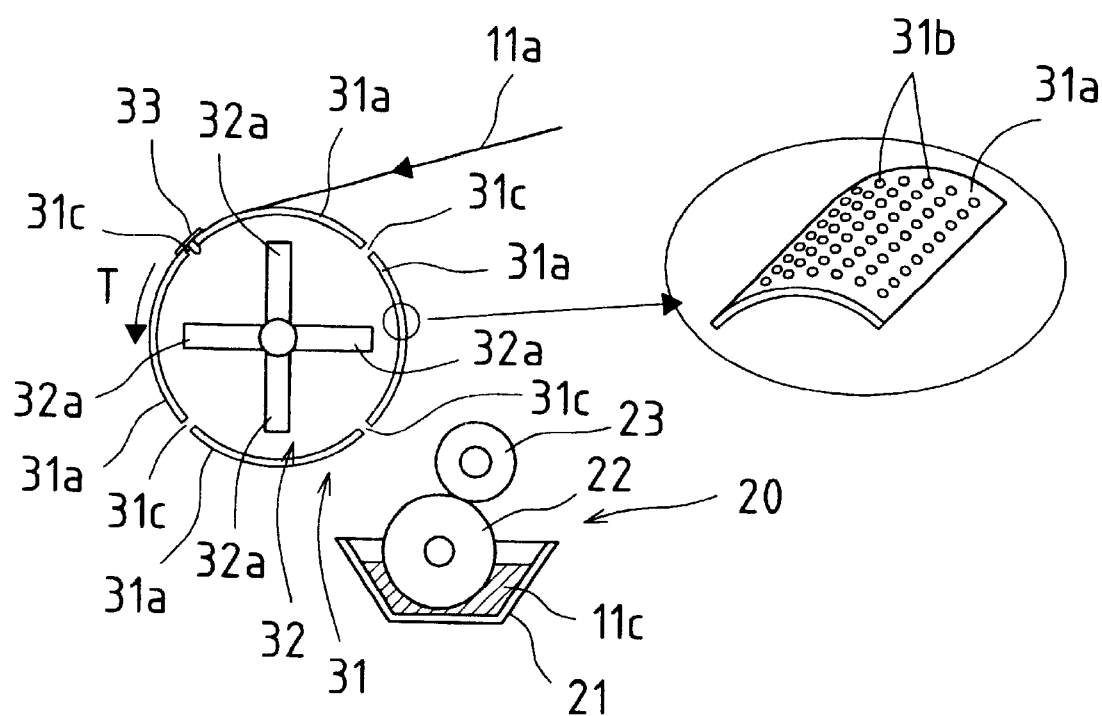
FIG. 21 is a schematic conceptual view of an apparatus for producing the strap coil.

The adhesive-coated strap coil 11 is produced with the use of a winding roller 31 and an applicator 20 shown in FIG. 21. The applicator 20 comprises a pan 21 filled with the adhesive 11c, a feed roller 22 disposed therein and a coating roller 23 arranged in contact with the top of the feed roller 22. The adhesive 11c in the pan 21 is carried on the surface of the feed roller 22 rotating in a given direction and eventually supplied on the surface of the coating roller 23.

The winding roller 31 for winding the strap 11a is rotatably disposed in the vicinity of the applicator 20. The winding roller 31 has a hollow cylindrical shape composed of four equivalent cylinder frames 31a obtained by circumferentially quartering a cylinder of suitable axial length. Each cylinder frame 31a is spaced along a single circumference with a circumferential gap 31c to constitute a cylinder of circular section. The four cylinder frames 31a arranged along a single circumference can contract the diameter of the circular-section cylinder, when allowed to slide toward the axis of the cylinder. Each cylinder frame 31a includes a number of pores 31b.

An air nozzle assembly 32 is securely disposed within the winding roller 31. The air nozzle assembly 32 comprises four nozzles 32a extending radially from the axis of the winding roller 31. Air is ejected from the tips of the nozzles 32a toward the cylindrical surface of the winding roller 31.

The applicator 20 disposed in the vicinity of the winding roller 31 is horizontally slidable in the approaching/receding directions with respect to the winding roller 31. When the applicator 20 approaches the winding roller 31, the coating roller 23 is pressed against the outer cylindrical surface of the winding roller 31, substantially along the entire axial length thereof.

Figure 22A:
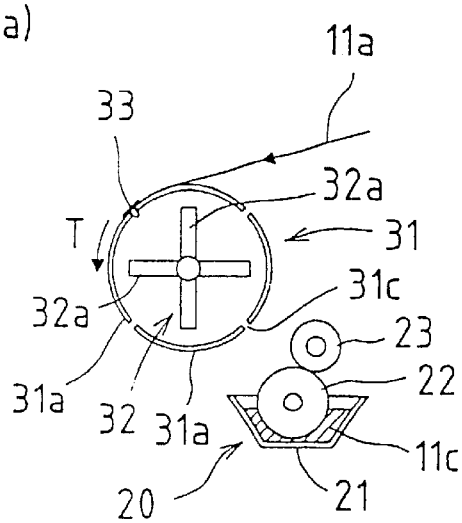
FIGS. 22(*a*)–(*e*) schematically describe a series of production steps of a strap coil with the use of the apparatus.

In order to wind the strap 11a on the winding roller 31, the cylinder frames 31a are firstly allowed to slide outwardly along a single circumference to form a cylinder of circular section. As shown in FIGS. 21 and 22(a), the start of the strap 11a (i.e. innermost end of the strap coil 11) is fixed on the winding roller 31 by the fixture 33 which is fitted into the gap 31c between a pair of neighbouring cylinder frames 31a. In the meantime, the applicator 20 remains detached from the winding roller 31. Under this condition, the winding roller 31 is rotated in the direction of the arrow T shown in FIGS. 21 and 22(a) to wind up the strap 11a.

While the winding of the strap 11a proceeds, the strap 11a is axially reciprocated along the winding roller 31, so that the strap 11a is helically laminated on the entire cylindrical surface of the winding roller 31.

After the strap 11a is helically wound on the entire surface of the winding roller 31 to form the innermost layer of the strap coil 11, the rotation of the winding roller 31 is stopped temporarily. In the meantime, the applicator 20 is allowed to approach the winding roller 31, until the coating roller 23 is pressed against the strap 11a wound on the winding roller 31 (FIG. 22(b)). Once the contact relationship is established, the rotation of the winding roller 31 is resumed to wind the strap 11a helically on the winding roller 31.

During the second winding stage, wherein the coating roller 23 is held against the top side of the innermost strap layer wound on the entire cylindrical surface of the winding roller 31, the winding roller 31 causes the rotation of the coating roller 23, which further causes the rotation of the feed roller 22. Accordingly, the adhesive 11c contained in the pan 21 is first carried by the surface of the feed roller 22 onto the surface of the coating roller 23. At the same time, the coating roller 23, which is pressed against the top side of the strap 11a wound on the winding roller 31, coats the adhesive 11c thereon. In the end, the adhesive 11c is coated on the strap 11a wound on the outer cylindrical surface of the winding roller 31, substantially along the entire axial length thereof in a desired circumferential length.

The winding roller 31 rotates to make a few more layers under the application of the adhesive 11c. Then, the rotation of the winding roller 31 is stopped again. This time, as shown in FIG. 22(c), the applicator 20 is displaced away from the winding roller 31 and breaks the contact between the coating roller 23 and the strap 11a wound on the winding roller 31. After the coating roller 23 is detached therefrom, the winding roller 31 resumes to wind the strap 11a helically and continuously (FIG. 22(d)).

During the third winding stage, air is sprayed onto the cylindrical surface of the winding roller 31, as ejected from the nozzles 32a of the air nozzle assembly 32 inside the winding roller 31. To be specific, the air ejected from the nozzles 32a passes through a number of pores 31b in the cylinder frames 31a and reaches the strap 11a wound on the winding roller 31. The air spray promotes volatilisation of a solvent in the solvent-type adhesive 11c which has been coated on the strap 11a.

Figure 22B:
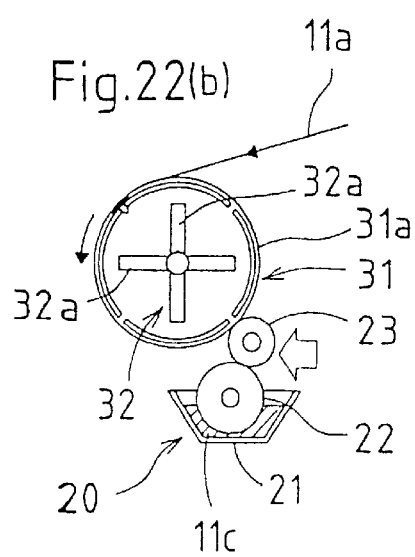
Figure 22C:
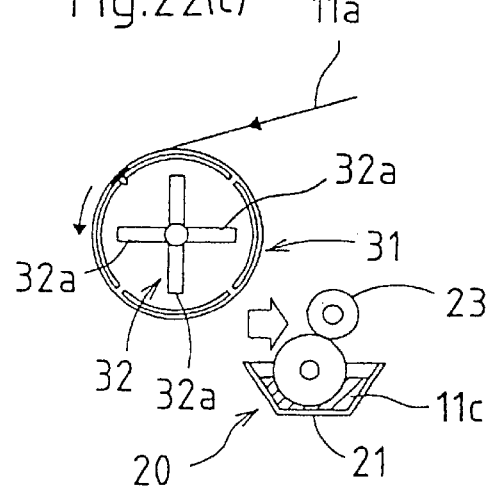
Figure 22D:
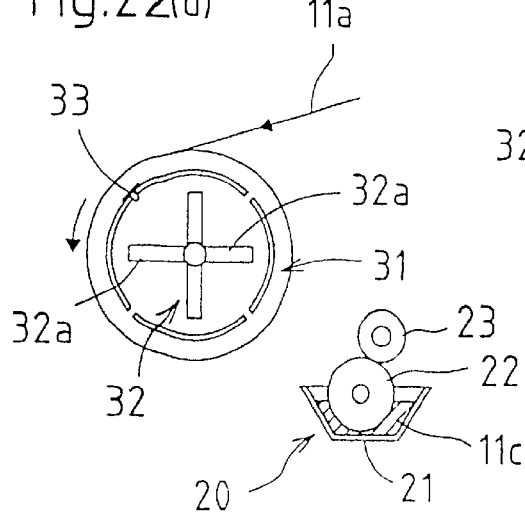
Figure 22E:
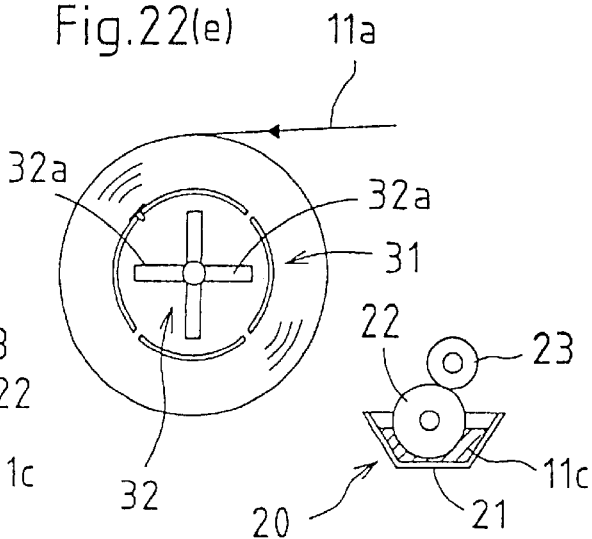

Meanwhile, as shown in FIG. 22(d), a predetermined length of the strap 11a is wound on the winding roller 31 under the air spray from the nozzles 32a. The continuous air spray allows the adhesive 11c to establish an appropriate adhesive strength, prior to the completion of the winding of the strap 11a.

When the strap 11a is wound in a predetermined length, the winding roller 31 is diametrically contracted by sliding the cylinder frames 31a toward its axis. The contracted winding roller 31 is removed from the strap 11a which has been wound into a coil, thereby giving the strap coil 11 of the present invention as shown in FIG. 19.

As for the hot-melt-type adhesives 11c, coating may be effected by the applicator 20 in the same manner shown in FIG. 22(b), while the strap 11a is being wound up on the winding roller 31. Since the hot-melt-type adhesive 11c does not require air spray for volatilisation, the winding roller 31 dispenses with the air nozzle assembly 32.

Figure 23A:
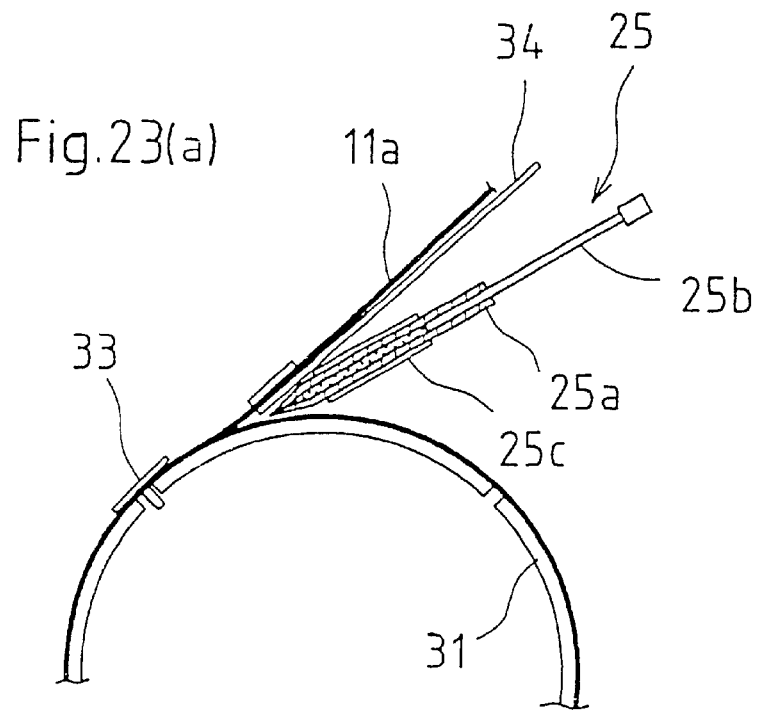
FIG. 23(*a*) is a section of another apparatus for producing the strap coil of the present invention.

Additionally, the hot-melt-type adhesive 11c may be applied with the use of a cylinder applicator 25 shown in FIG. 23(a). The cylinder applicator 25 comprises a cylindrical barrel 25a filled with the hot-melt-type adhesive 11c and a plunger 25b slidably accommodated in the barrel 25a for squeezing out the adhesive 11c. One end of the barrel 25a accepts the plunger 25b along its axis, and the other end is gradually tapered into a conical form. In order to heat and melt the hot-melt-type adhesive 11c, the barrel 25a is covered by a heater 25c.

This cylinder applicator 25 is disposed in the vicinity of the strap guide 34 for guiding the strap 11a to the winding roller 31. After the strap 11a is wound on the entire surface of the winding roller 31 to make the innermost layer of the strap coil 11, the cylinder applicator 25 interposes the tapered tip of the barrel 25a between the top side of the strap 11a wound on the winding roller 31 and the bottom side of the strap 11a guided by the strap guide 34. At this position, the plunger 25b is squeezed into the barrel 25a which contains the hot-melt-type adhesive 11c melted by the heater 25c. The melted adhesive 11c is squeezed out of the tip of the barrel 25a onto the strap 11a wound on the winding roller 31.

Figure 23B:
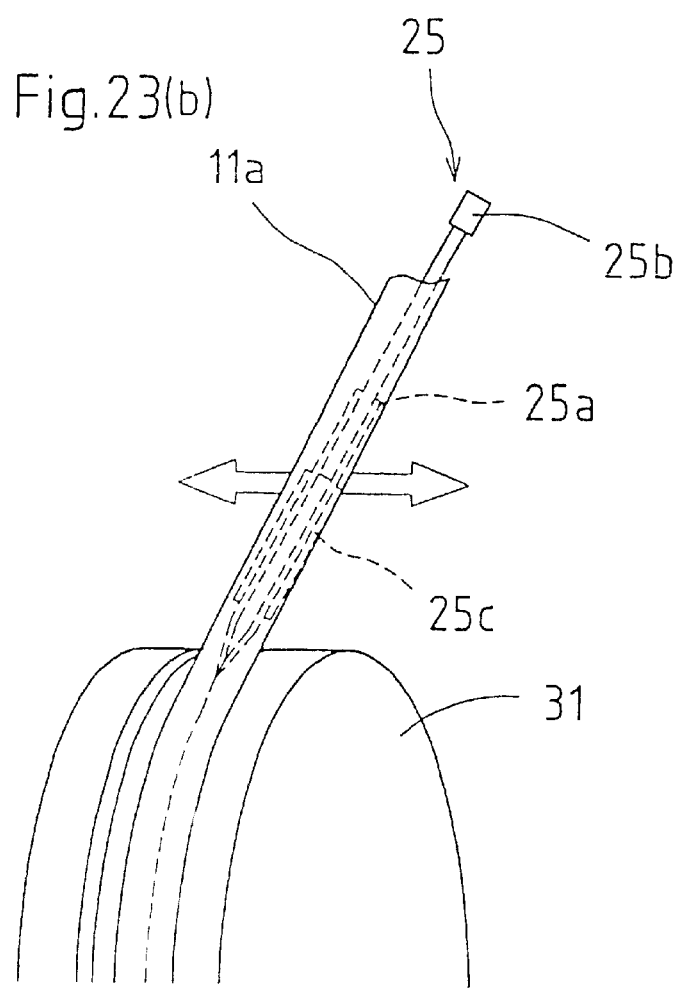

As shown in FIG. 23(b), the barrel 25a can reciprocate in the axial directions of the winding roller 31 so as to follow the strap 11a which is helically and continuously wound on the winding roller 31. Hence, the cylinder applicator 25 continues to apply the hot-melt-type adhesive 11c not only on the top side of the innermost strap layer wound on the winding roller 31 but also on the top side of a few more layers laminated thereon.

The adhesive 11c, be it the solvent-type or the hot-melt-type, may be coated only on a portion of the innermost strap layer constituting the inner cylindrical surface of the strap coil 11.

Figure 24:
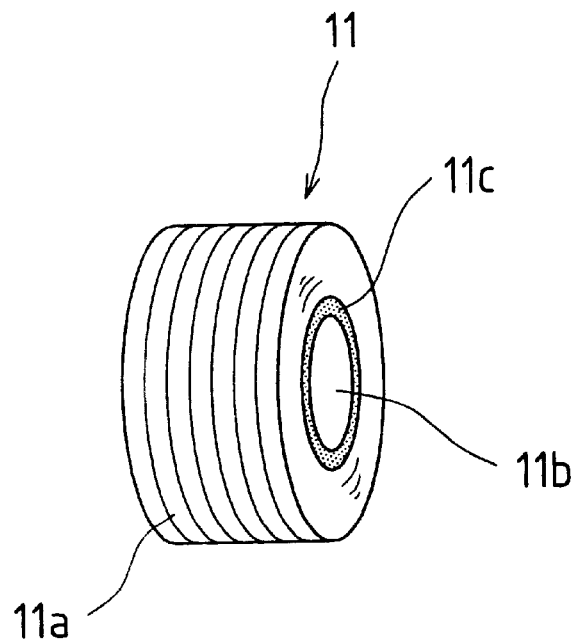
FIG. 24 is a perspective view of the appearance of still another packaging strap coil of the present invention.
Figure 25:
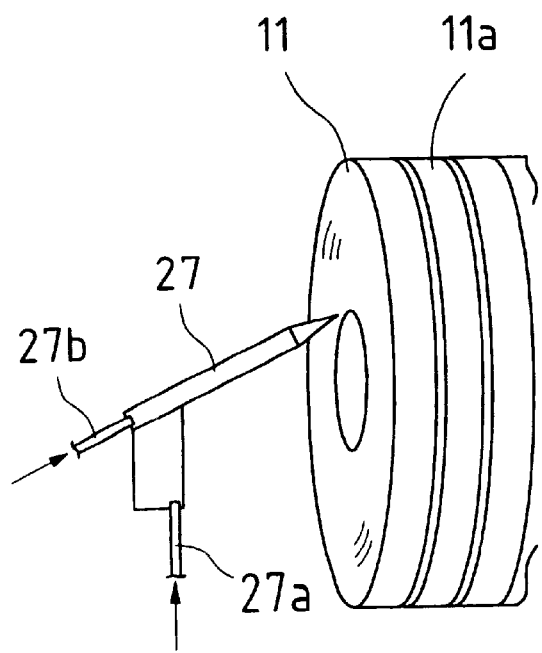
FIG. 25 is a schematic conceptual view of an apparatus for producing the strap coil.

In another arrangement shown in FIG. 24, the solvent-type or hot-melt-type adhesive 11c is applied on several layers of the strap 11a laminated along the axial ends the winding roller 31 (not shown). For example, the adhesive 11c is applied by means of a spray gun 27 shown in FIG. 25, while the strap 11a is being wound on the winding roller 31 (not shown). In the spray gun 27, the adhesive 11c in the solution state is supplied through an adhesive feed hose 27a, and compressed air is supplied through an air feed hose 27b. The adhesive 11c in the solution state is sprayed from the tapered tip of the spray gun 27 onto the side surface of the several innermost layers in the strap coil 11.

Figure 26:
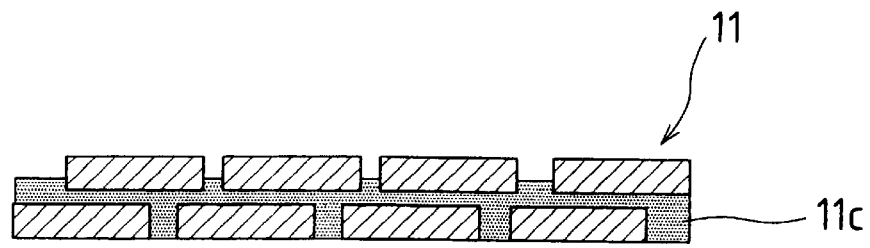
FIG. 26 is a section of the main part of the strap coil.

In still another arrangement, the adhesive 11c may be applied on the top side of the innermost layer of the strap coil 11 as well as on several innermost layers laminated along each axial end of the winding roller 31. As shown in FIG. 26, when the adhesive 11c penetrates sufficiently into the gaps between the strap layers laminated along the axial ends of the winding roller 31, the adhesive 11c also penetrates into the gaps between the adjacent rows of the innermost strap layer helically wound on the winding roller 31.

Figure 27:
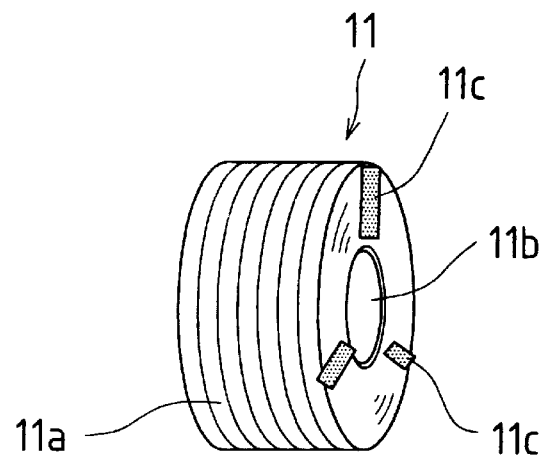
FIG. 27 is a perspective view of the appearance of yet another packaging strap coil of the present invention.
Figure 28:
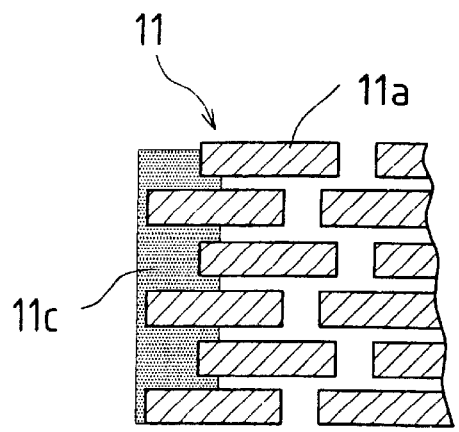
FIG. 28 is a section of the main part of the strap coil.

In the case where the adhesive 11c is applied on the layers of the strap 11a laminated along the axial ends of the winding roller 31, the adhesive 11c may not necessarily cover the entire circumference of the laminated strap 11a, but instead cover a part thereof. For example, as shown in FIG. 27, the adhesive 11c may be applied on each side surface of the strap coil 11 in the form of stripes which stem from three circumferentially spaced positions and extend along the whole radial length of the strap coil 11. In this arrangement, all layers of the strap 11a laminated along the axial ends of the winding roller 31 are bonded together by the adhesive 11c (FIG. 28).

Figure 29:
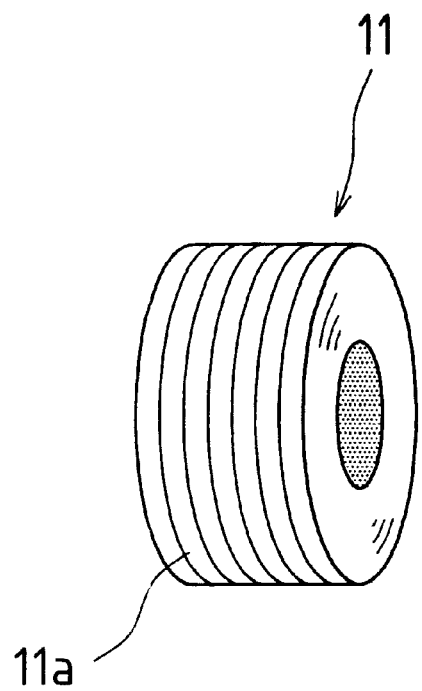
FIG. 29 is a perspective view of the appearance of a further packaging strap coil of the present invention.
Figure 30:
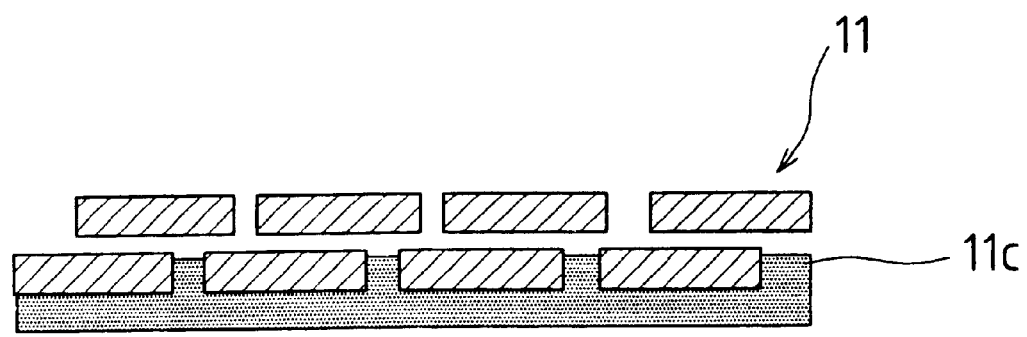
FIG. 30 is a section of the main part of the strap coil.

In further another arrangement shown in FIG. 29, the hot-melt-type adhesive 11c is coated in the melted state on the entirety of the inner cylindrical surface of the strap coil 11. As illustrated in FIG. 30, the adhesive 11c solidifies to bond together the adjacent rows of the helically wound strap 11a which constitute the innermost cylindrical surface.

As a method of such adhesive coating, the melted hot-melt-type adhesive 11c is coated on the outer cylindrical surface of the winding roller 31. The strap 11a is wound on the adhesive-coated winding roller 31 to form the strap coil 11. After the adhesive 11c cools and solidifies, the winding roller 31 is diametrically contracted and removed out of the strap coil 11. This arrangement facilitates the coating of the adhesive 11c, but it does not adversely affect the removal of the winding roller 31 from the strap coil 11.

In all embodiments of the adhesive-bonded strap coil 11 as mentioned above, it should be noted that the strap 11a is peelably bonded by the above-exemplified adhesives.

Figure 31:
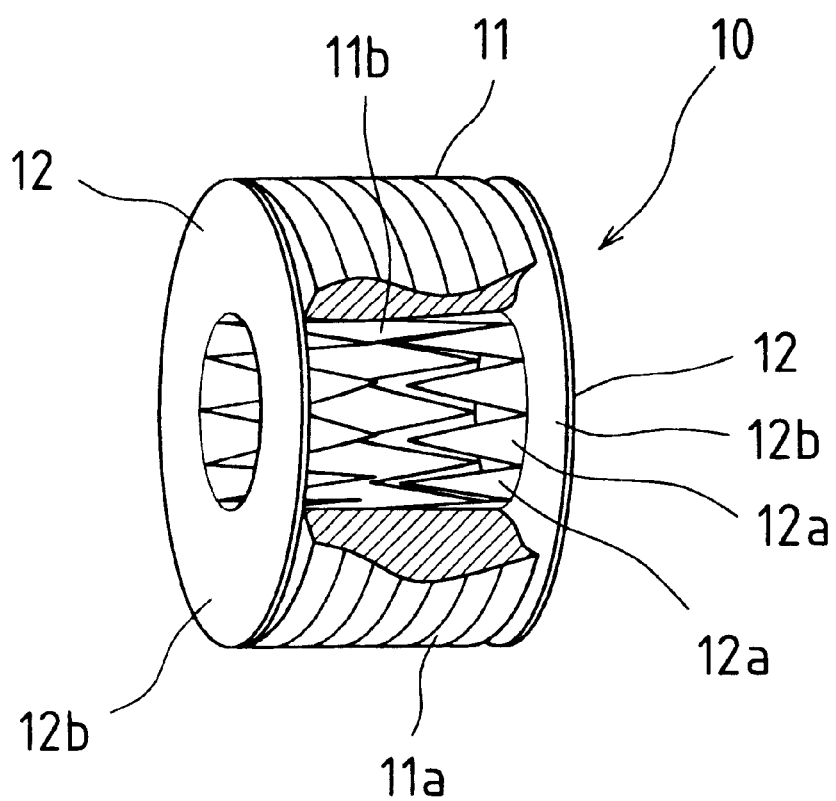
FIG. 31 is a partly broken-away perspective view of the appearance of a packaging strap coil unit of the present invention.
Figure 32:
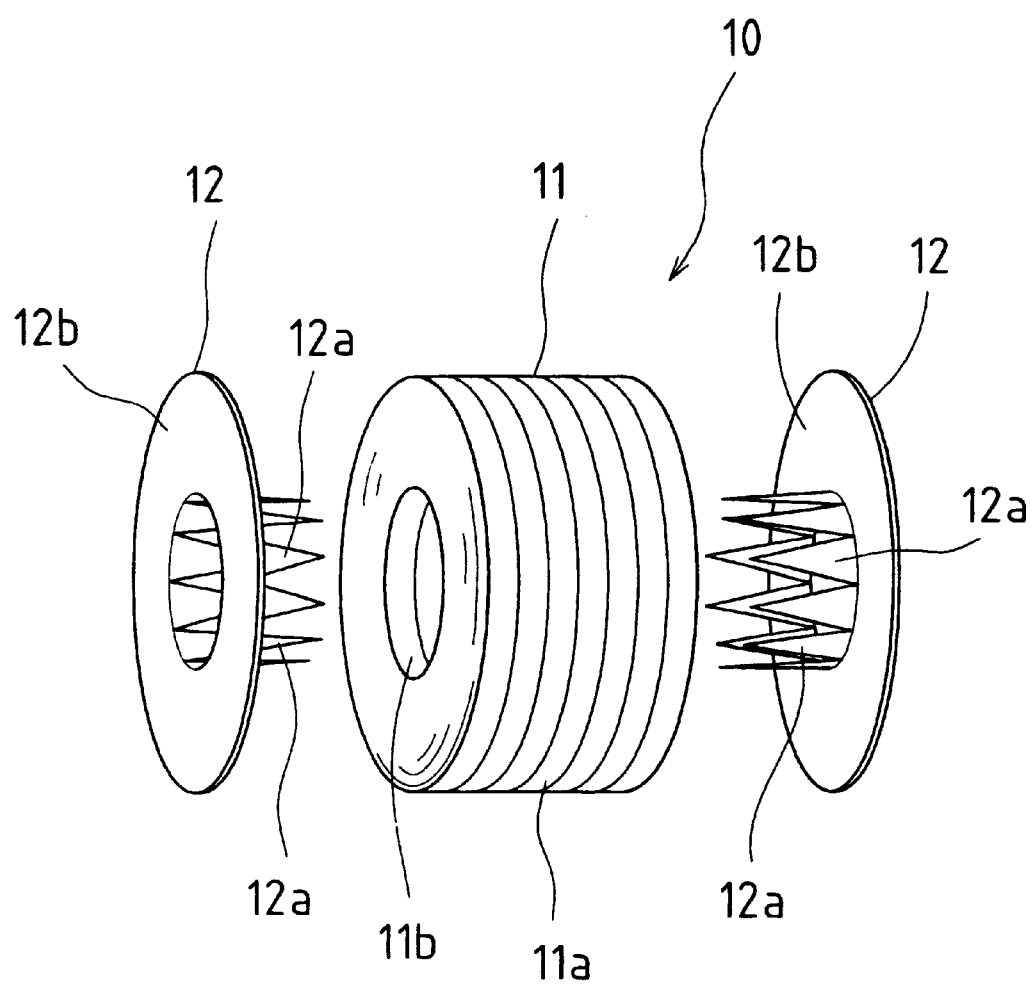
FIG. 32 is a perspective exploded view of the strap coil unit.

As shown in FIGS. 31 and 32, the strap coil 11 obtained in any of the above-described manners may have both side surfaces covered by a pair of pads 12. The resulting strap coil unit 10 is suitable for transportation and storage.

2. Packaging Strap Coil Unit

With reference to FIGS. 31 and 32, a packaging strap coil 10 is prepared by placing a pair of pads 12 on both side surfaces of the strap coil 11. Each of the pads 12, which is made of corrugated cardboard, etc. is shaped in a disc whose outer diameter is substantially the same as that of the strap coil 11.

In the centre of the pad 12, there are formed twelve central flaps 12a which can be folded into the cylindrical hollow 11b of the strap coil 11. The annular area surrounding the central flaps 12a constitutes a ring 12b which is held against the side surface of the strap coil 11.

Figure 33:
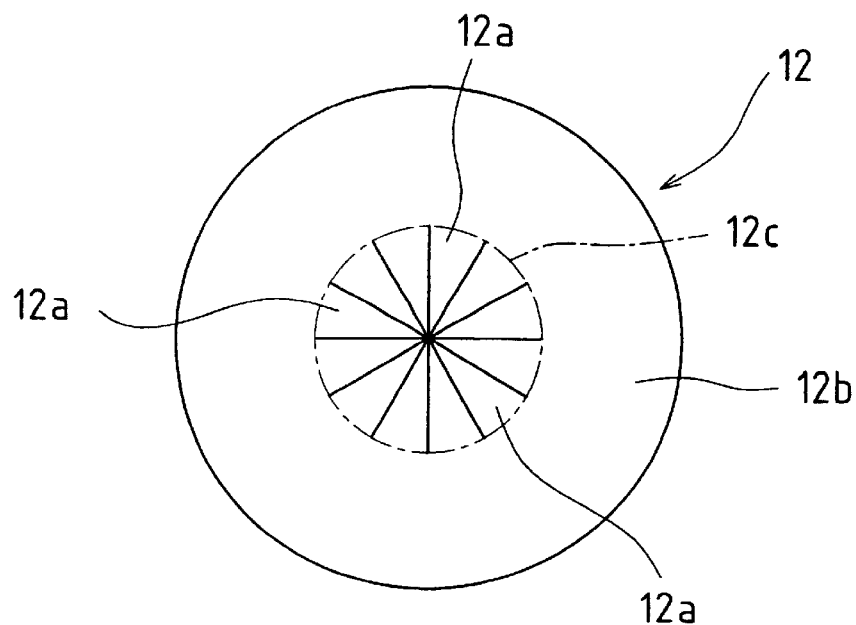
FIG. 33 is a plan view of a pad employed in the strap coil unit.

FIG. 33 is a plan view of the pad 12, with the central flaps 12a unfolded. The central flaps 12a are folded along a circular dashed line 12c given along a concentric circle of the pad 12 and which has a diameter substantially equal to that of the hollow 11b defining the axis of the strap coil 11. The area encircled by the dashed line 12c is cut along twelve dividing lines which radially extend from the centre of the encircled area, so that the encircled area is circumferentially divided into twelve fan-shaped equal sectors (i.e. central flaps 12a). The central flaps 12a are folded along the dashed line 12c into the hollow 11b defining the axis of the strap coil 11, at a right angle to the ring 12b which surrounds the encircled central flaps 12a. As a result, the pad 12 provides a hole in the centre thereof which opens through to the hollow 11b.

In order to secure the pad 12 on the strap coil 11, an adhesive is applied on the entirety of one surface of the pad 12 which is to face the side surface of the strap coil 11. The adhesive peelably bonds the pads 12 and the strap coil 11 together, wherein the rings 12b of the pads 12 are bonded to the side surfaces of the strap coil 11, and the central flaps 12a are bonded to the inner cylindrical surface of the strap coil 11 surrounding the hollow 11b.

Figure 34:
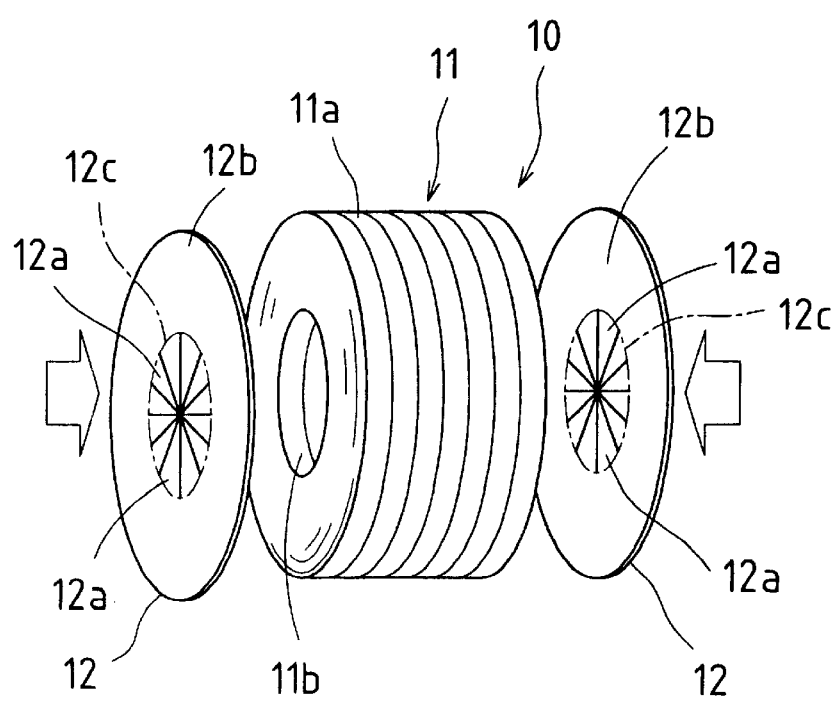
FIG. 34 is a perspective view showing a production step of the strap coil unit with the use of the pad.

A method for producing the strap coil unit 10 is hereinafter described in detail. First of all, a strap 11a is wound into a strap coil 11. In the meantime, a pair of pads 12 shown in FIG. 33 are prepared and coated with an adhesive, with the central flaps 12a unfolded with respect to the rings 12b. The pads 12 are then positioned, as shown in FIG. 34, such that the adhesive-coated surfaces of the rings 12b correspond to the side surfaces of the strap coil 11. The rings 12b are pressed against the side surfaces of the strap coil 11 to effect adhesive bonding between each other.

Lastly, the central flaps 12a in the pads 12 are folded along the dashed lines 12c, at a right angle to the rings 12b, into the hollow 11b formed along the axis of the strap coil 11. Thus obtained is the strap coil unit 10 of FIG. 31.

In the strap coil unit 10 described above, the pads 12 are adhesive-bonded on the side surfaces of the strap coil 11 and prevent deformation or bent of the edges of the strap 11a locating at the side surfaces of the strap coil 11. Hence, during transportation or storage, a plurality of strap coil unit 10 can be safely piled up on one another, with their axes aligned in the vertical direction. Further in this strap coil unit 10, the central flaps 12a are turned into the hollow 11b formed along the axis of the strap coil 11, and they are bonded by an adhesive to the innermost layer of the strap 11a which constitutes the inner cylindrical surface of the strap coil 11 surrounding the hollow 11b. Due to the adhesive-bonded central flaps 12a, the innermost end of the strap 11a does not unwind by itself and so the strap coil 11 remains firm and solid, even when the innermost strap end is not fixed by melt-bonding or the like.

When used in an automatic packaging machine for automatically strapping a corrugated cardboard box or other items with the strap 11a, the strap coil unit 10 is loaded on a strap coil reel mounted on the packaging machine. As the edge of the strap 11a is free from deformation or bent, the strap 11a can be smoothly drawn out from the strap coil unit 10. The smooth drawing-out action of the strap 11a is not deterred by the presence of the pads 12 which are adhesive-bonded on the side surfaces of the strap coil 11. This is because the bonding between the pads 12 and the side surfaces of the strap coil 11 is efficiently established in such a small area, which is the edge of the strap 11a constituting the side surfaces of the strap coil 11, that the strap 11a is not subjected to an excessive adhesive strength. Besides, the innermost end of the strap 11a peels off readily from the central flaps 12a.

When the strap 11a runs out in the strap coil unit 10, there remain a pair of pads 12. Each pad 12 can restore the original flat form by returning the central flaps 12a level to the ring 12b. As the pads 12 in flat form are suitable for transportation and storage, it is easier to reuse them repeatedly.

As the adhesives coated on one surface of the pad 12, use can be made of common rubber-based adhesives and acrylic adhesives. The species of such adhesives are not strictly specified, provided they exhibit a required adhesive strength with respect to the edge of the strap 11a. The adhesive may be substituted by a both-sided adhesive tape. In this case, a both-sided adhesive tape may be stuck on the entirety of one surface of the pad 12, prior to the formation of the dividing lines for central flaps 12a. Thereafter, the central flaps 12a are cut out of the taped pad 12 along the dividing lines given inside the dashed line 12c.

Incidentally, the material of the pad 12 is not limited to corrugated cardboard paper. For example, the pad 12 can be made of relatively recyclable materials such as cardboard, polypropylene (PP), polyethylene terephthalate (PET), polyethylene (PE) and other thermoplastic resins. The pad 12 is shaped in a disc with a thickness of about 0.5 to 5 mm, whose outer diameter is about ±10 mm with respect to that of the strap coil 11.

In the above description, the pads 12 are mounted on the strap coil 11 by first positioning a pair of flat pads 12 with unfolded central flaps 12a on the side surfaces of the strap coil 11 and then inwardly folding the central flaps 12a. As an alternative process, one of the pads 12 with folded central flaps 12a may be set on one end of the winding core of a winding machine, prior to the winding of the strap 11a. After the strap 11a is wound into a strap coil 11 and the winding core is removed from the strap coil 11, the other pad 12 is mounted on the other side surface thereof to complete the strap coil unit 10. Since the preset pad 12 prevents the strap coil 11 from unwinding during the production, the finished strap coil 11 already includes a preventive structure against its unwinding or disintegration during transportation and storage. Further, the second pad 12 can be set on the thus stabilised strap coil 11. Therefore, this arrangement ensures efficient productivity.

In case an adhesive is coated on the entirety of one surface of the pad 12, it is advantageous to put release paper on the adhesive-coated surface. The release paper prevents bonding between the pads 12 piled up on top of each other and thereby enables safe transportation of a large number of the pads 12.

Figure 35:
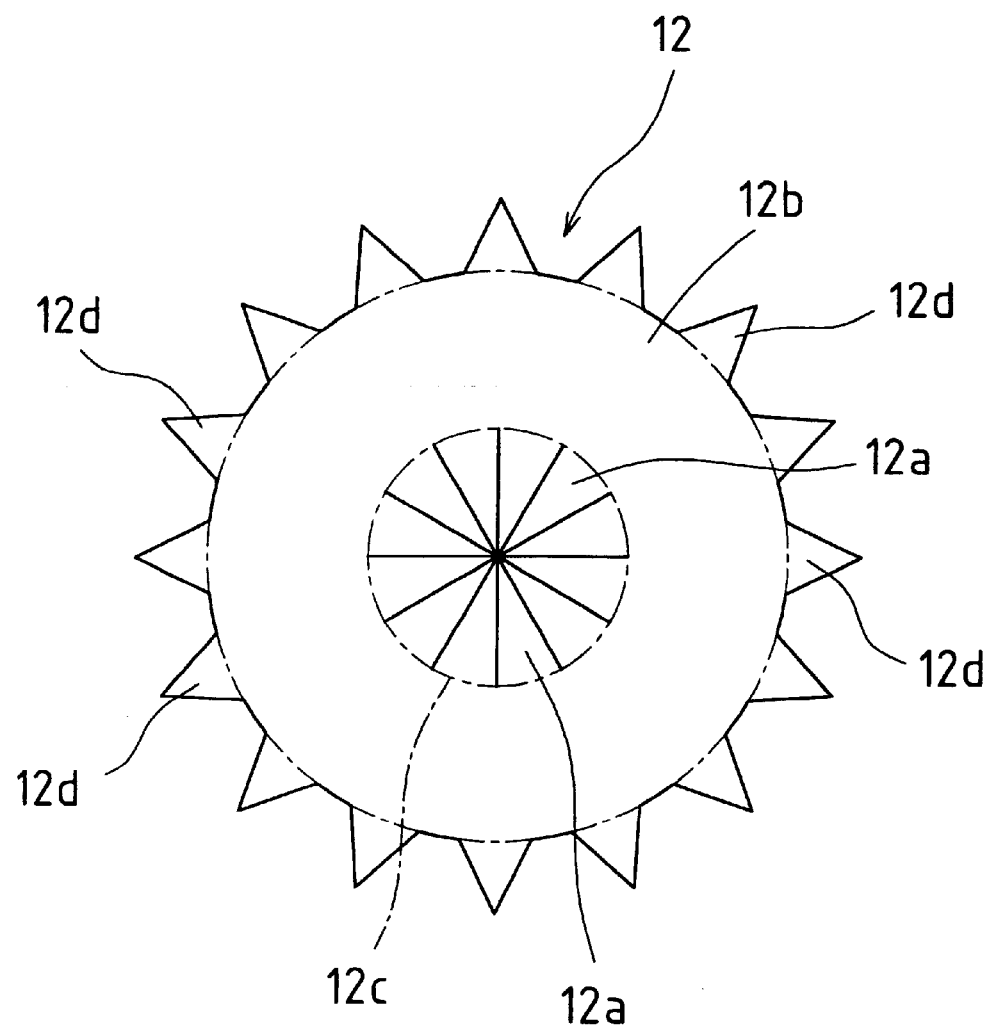
FIG. 35 is a plan view of another pad employed in the strap coil unit.

As shown in FIG. 35, the pad 12 may further comprise a plurality of triangular external flaps 12d which project outwardly from the outer circumference of the pad 12 and which are circumferentially equally spaced from each other. To provide a strap coil unit 10, a pair of pads 12 are firstly positioned face to face with one side surface of the strap coil 11. Secondly, the central flaps 12a are folded inwardly. Lastly, the external flaps 12d are folded onto the outer cylindrical surface of the strap coil 11. The external flaps 12d are thereby adhesive-bonded to the outermost strap end as well as the outer cylindrical surface of the strap coil 11. As a result, the outermost end of the strap 11a is not drawn out from the strap coil 11.

Further, the pad 12 may include a centre hole in lieu of the central flaps 12a, provided the innermost end of the strap 11a is fixed by melt-bonding, etc. in the strap coil 11 whose axis is defined by a hollow 11b. A pair of pads 12 which includes a hole in place of the central flaps 12 are likewise positioned and bonded with an adhesive to the side surfaces of the strap coil 11. When the strap coil units 10 are piled up on one another, the pads 12 of this kind also prevent deformation or bent of the edge of the strap 11a constituting the side surfaces of the strap coil unit 10.

Another embodiment of the strap coil unit 10 is described with reference to FIGS. 36 to 38. FIG. 36(a) is a front view showing another strap coil unit of the present invention, provided with a shape retention plate which is longer than the inner circumference of the strap coil; and FIG. 36(b) is a front view of the same, provided with a shape retention plate which is shorter than the inner circumference of the strap coil. FIG. 37 is a front view of a shape retention plate applied to the strap coil unit. FIG. 38(a) is a perspective view of another shape retention plate; and FIG. 38(b) is a section thereof as applied in a strap coil.

As mentioned above, the strap coil 11 has the innermost end of the strap 11a fixed by melt-bonding, etc. so as not unwind or disintegrate. The strap coil unit of this embodiment is characterized in comprising a flat shape retention plate 92 which is rolled and inserted into the hollow 11b of the strap coil 11. The shape retention plate 92 is a plate made of a synthetic resin such as polypropylenes and polyesters, a metal such as a thin steel plate, a cardboard sheet or other sheets comprising a mixture of used paper and recovered plastics in a ground state The length of the shape retention plate 92 is substantially the same as the circumference of the hollow 11b of the strap coil 11, and its width is substantially the same as that of the strap coil 11. When rolled into a cylinder, the shape retention plate 92 is constantly subjected to the resilient force to recover the original flat shape. Therefore, on its insertion into the hollow 11b, the resilient force stresses the shape retention plate 92, against the inner cylindrical surface of the strap coil 11, whereby the shape retention plate 92 supports the inner cylindrical surface of the strap coil 11. The shape retention plate 92 may be longer than the inner circumference of the strap coil 11 and overlap each other at the end portions (FIG. 36(a)). On the other hand, it may be shorter than the inner circumference of the strap coil 11 and leave a gap between the end portions (FIG. 36(b)).

FIG. 37 illustrates a modification of the shape retention plate 92 mentioned above. In the shape retention plate 96, one end portion thereof includes a pair of slits 93 oriented parallel to the widthwise sides, whereas the other end portion comprises a pair of extensions 94 having a width corresponding to the slits 93. The shape retention plate 96 is rolled and inserted into the hollow 11b, with the extensions 94 fitted in the slits 93. When the shape retention plate 96 is stressed by the resilient force against the inner cylindrical surface of the strap coil 11, the extensions 94 are released from the slits 93. The shape retention plate 96 advantageously prevents slide or slippage of the end portions.

For the same purpose, the end portions of the shape retention plate may comprise a pair of inverted L-shaped extensions, which are hooked with each other in the rolled state. Any other arrangement is possible, as far as the end portions of the plate are detachably connected with each other. While the end portions of the plate are detachably connected, the shape retention plate may overlap at the end portions or at the connectable portions only.

FIG. 38 shows a further modified shape retention plate 97 which comprises edge pieces 95 which stick out from both lengthwise sides of the shape retention plate 92. In this embodiment, a strap coil can fit on shape retention plate 97 between the edge pieces 95. Therefore, the shape retention plate 97 does not slip out from the strap coil, even when the strap coil is repeatedly loaded and unloaded with respect to the reel of the automatic packaging machine. In addition, the edge pieces 95 reinforce the edge of several innermost layers wound along the axial ends of the strap coil, and prevent the disintegration thereof.

Any of the above-mentioned shape retention plates 92, 96 and 97 is reusable and therefore economically advantageous.

As specific examples, three shape retention plates were made of a resin sheet comprising recovered polyester and used paper in a ratio of 2:3. Sample 1 has a width of 190 mm, a length of 700 mm and a thickness of 1 mm. Sample 2 has a length of 600 mm, in which two slits (length×width: 35×30 mm each, parallel to the widthwise direction of the plate) are provided at 50 mm inside of one end thereof, and two extensions (length×width: 100×30 mm each) are integrally provided on the other end. Sample 3 has the same dimensions as the Sample 1 and further includes three 3-mm-high edge pieces equally spaced on each lengthwise side of the plate. Each Sample was rolled and inserted into the hollow of a polypropylene strap coil, where the Sample was pressed by its resilient force against the inner cylindrical surface of the strap coil. For the loadability test (drum-set test), each polypropylene strap coil unit was loaded on and unloaded from the reel of an automatic packaging machine. After 10 times of loading/unloading, none of the strap coil backed by Samples 1–3 showed unwinding or disintegration on its inner cylindrical surface. In a comparative example performed with respect to a polypropylene strap coil which was not backed by a shape retention plate, the inner cylindrical surface of the strap coil was unwound after five times of loading/unloading.

3. Automatic Packaging Machine

Figure 39:
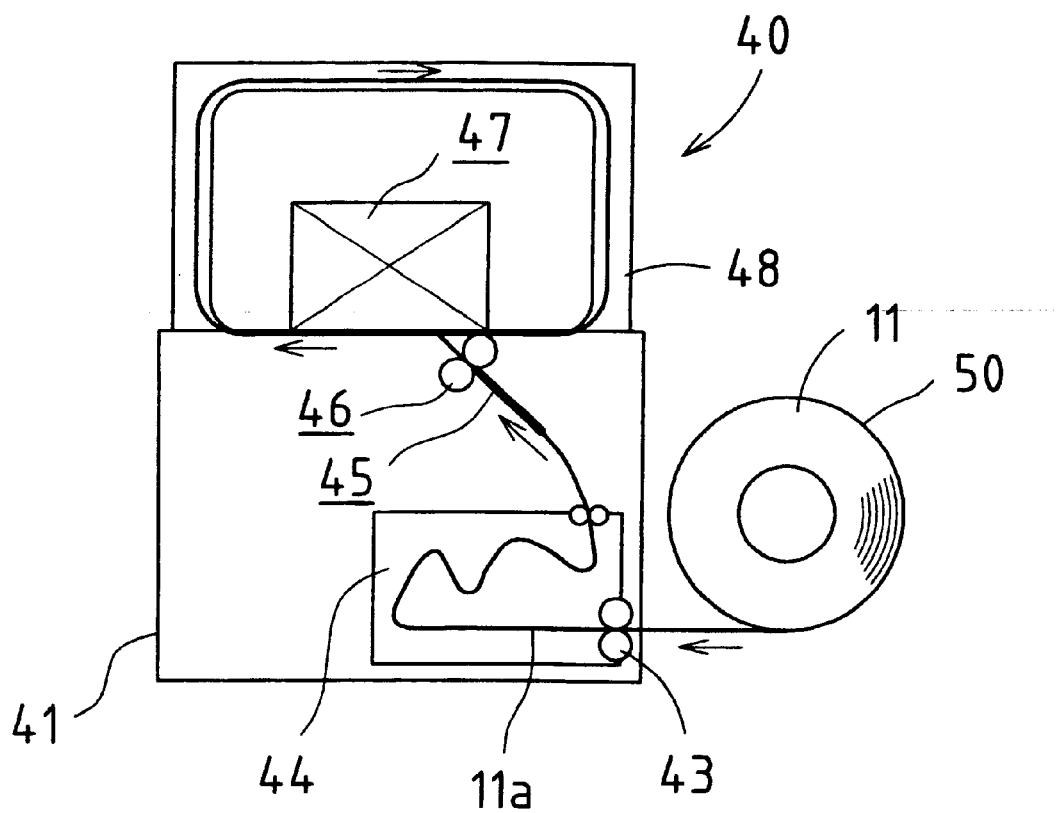
FIG. 39 is a schematic conceptual view for showing the operation of an automatic packaging machine of the present invention.

The following description is directed to an automatic packaging machine for strapping a corrugated cardboard box or other items with the use of the coreless strap coil 11 of the present invention. The operation of this automatic packaging machine is schematically illustrated in FIG. 39.

An automatic packaging machine 40 includes a stand 41 for resting an item 47 such as a corrugated cardboard box and an arch 48 which stands over the item 47 placed on the stand 41. A cassette-type strap coil reel 50 loaded with the coreless strap coil 11 is installed on the external side of the stand 41.

With the strap coil 11 loaded on the reel 50, the strap 11a is drawn out by a pair of feed rollers 43 inside a keep box 44 of the stand 41 and temporarily stored therein. The strap 11a held in the keep box 44 is conveyed by a shooter 45 and a pair of draw-out rollers 46 to the arch 48. The strap 11a proceeds along the arch 48 and straps the item 47 placed on the stand 41.

Figure 40A:
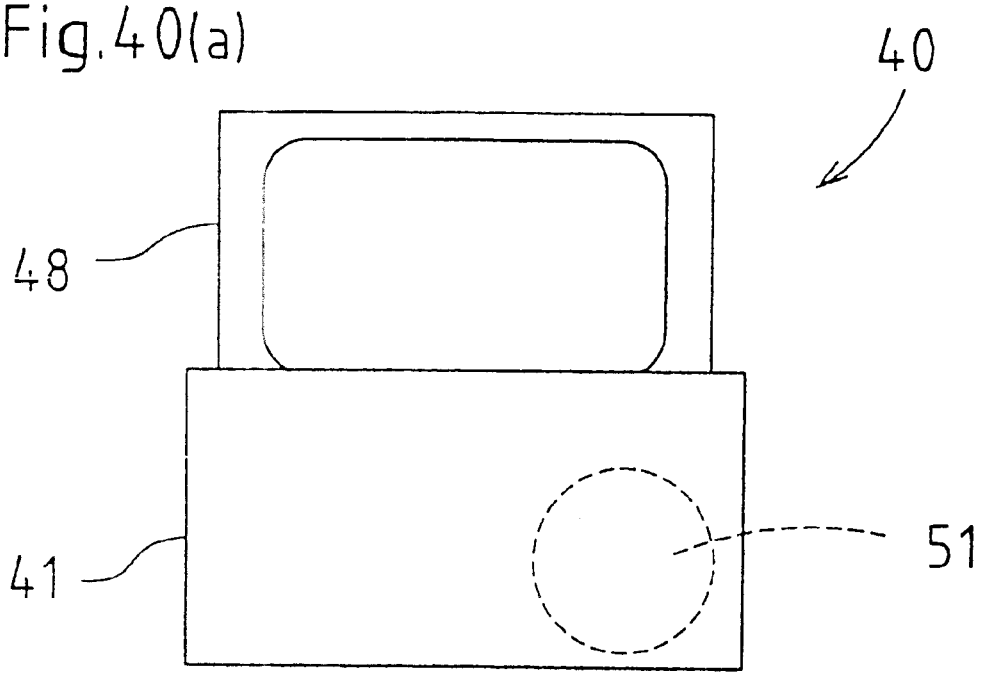
FIGS. 40(*a*) and (*b*) are schematic views showing two modes of installing a strap coil reel on the packaging machine of the present invention.
Figure 40B:
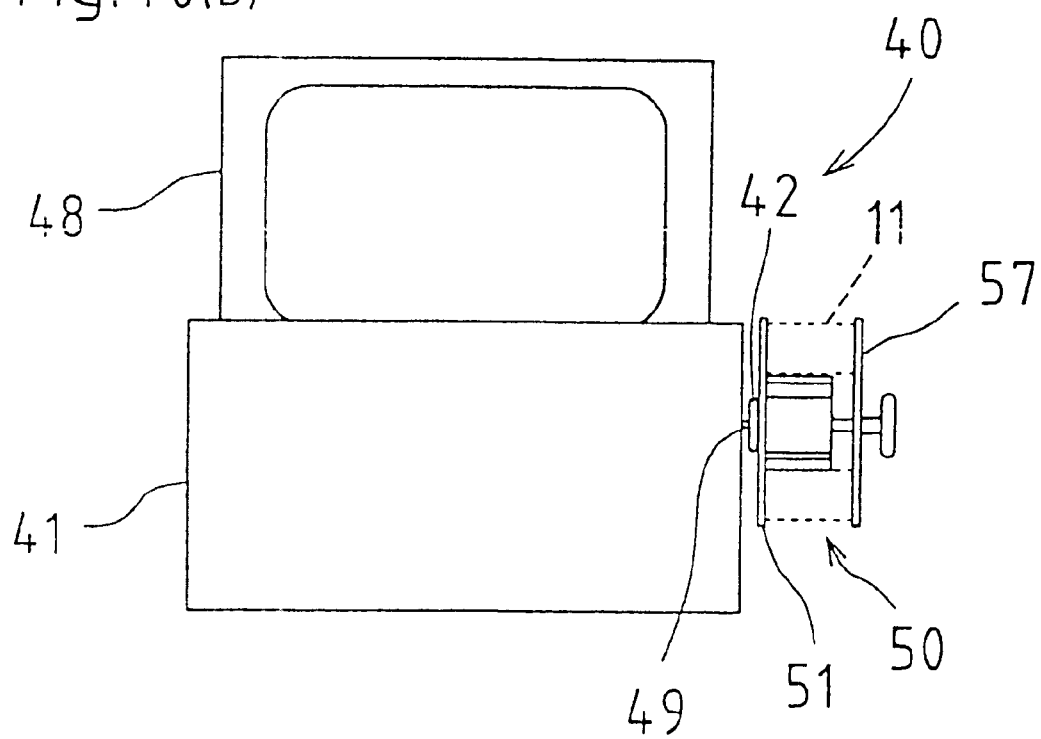

FIGS. 40(a) and (b) illustrate two types of packaging machines 40 which differ in the installation position of the strap coil reel 50. In FIG. 40(a), the spindle for the reel 50 is housed inside the stand 41. In FIG. 40(b), the spindle 49 for the reel 50 projects from the external side of the automatic packaging machine 40.

The packaging machine of the present invention is equipped with a strap coil reel which is applicable to both types of packaging machines.

Figure 41:
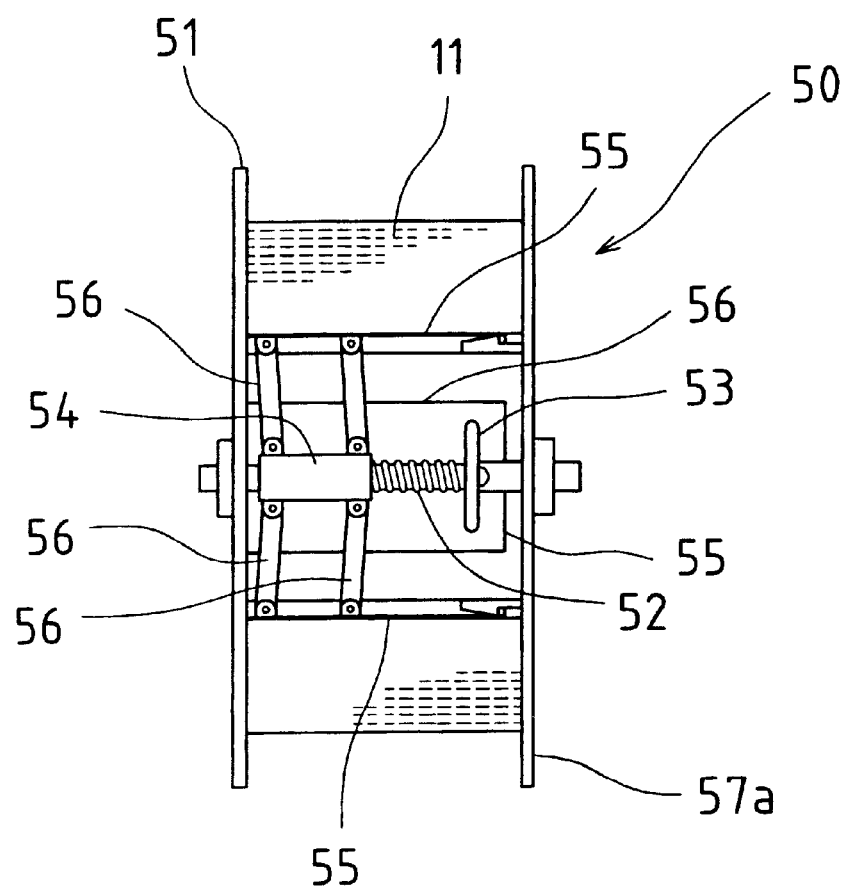
FIG. 41 is a section of a strap coil reel for accommodating the strap coil unit of the present invention.

FIG. 41 is a section of the cassette-type strap coil reel 50, with the coreless strap coil 11 loaded. The reel 50 is equipped with a cover 57 for covering the side surface of the strap coil 11.

Figure 42A:
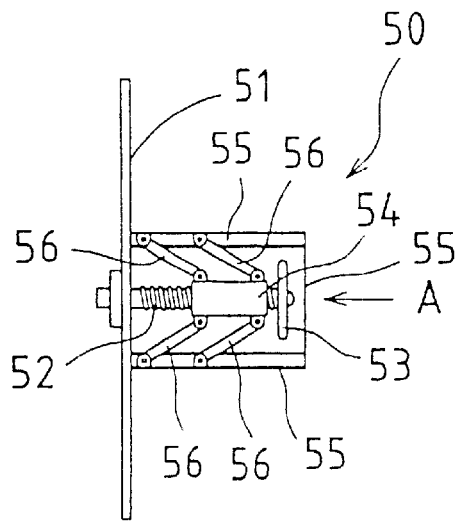
FIG. 42(*a*) is a section of the strap coil reel, with the strap coil and the cover removed.
Figure 42B:
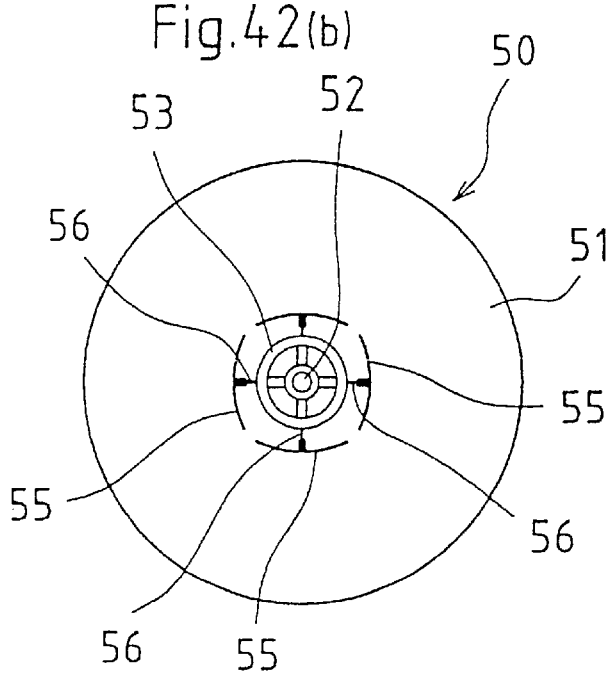

FIG. 42(a) is a section of the reel 50, with the cover 57 and the strap coil 11 removed, and FIG. 42(b) is a side view thereof taken in the direction of the arrow A in FIG. 42(a). The strap coil reel 50 comprises a side plate 51 placed on the external side of the stand 41 and a screw rod 52 which is rotatably mounted on and perpendicularly projects from the side plate 51. As illustrated in FIG. 40(b), the screw rod 52 is integrally fitted on the spindle 49 which perpendicularly projects from the external side of the stand 41. The rotation of the spindle 49 is stopped by a spindle brake 42. The screw rod 52 is externally threaded and integrated at the extreme end with a handle 53 for turning the screw rod 52. A cylindrical sliding member 54 is screwed on the screw rod 52, whereby the sliding member 54 slides in the axial directions of the screw rod 52 in cooperation with the turn thereof.

The screw rod 52 is surrounded by four core plates 55 which perpendicularly stand on the side plate 51. The core plates 55 constitute a core element which is inserted into the hollow 11b defining the axis of the coreless strap coil 11. The core plates 55 are curved such that they can locate along the inner cylindrical surface of the strap coil 11, after inserted in the hollow 11b thereof. Each core plate 55 is linked with the sliding member 54 screwed on the screw rod 52 by a pair of parallel link rods 56. The four core plates 55, corresponding pairs of link rods 56 and sliding member 54 constitute a parallel link mechanism.

Figure 43A:
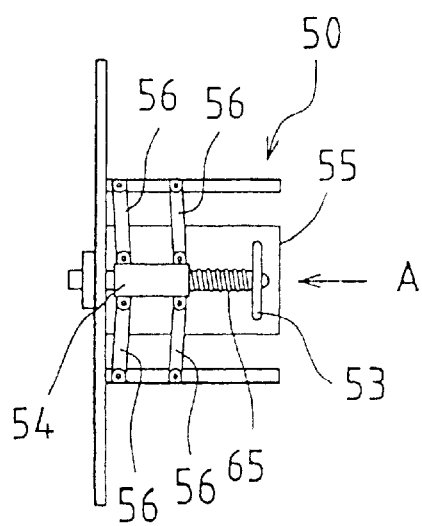
FIG. 43(*a*) is a section showing the operation of the strap coil reel.
Figure 43B:
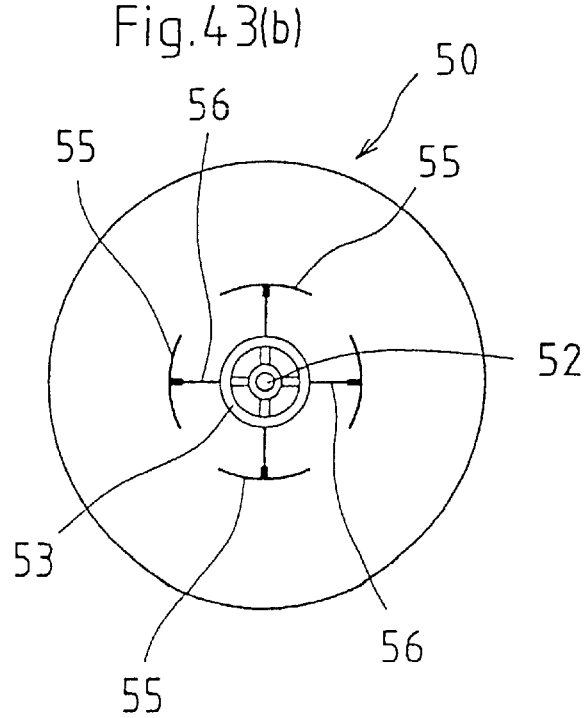

Accordingly, when the screw rod 52 is turned to displace the sliding member 54 away from the side plate 51, the parallel link mechanism uniformly brings the core plates 55 closer to the screw rod 52. On the other hand, when the screw rod 52 is turned reversely to displace the sliding member 54 toward the side cover 51, the parallel link mechanism uniformly brings the core plates 55 farther away from the screw rod 52. Where the sliding member 54 locates closest to the side plate 51, as illustrated in FIGS. 43(a) and (b), the core plates 55 situate remotest from the screw rod 52. Under this condition, the core plates 55 are circumferentially spaced from each other along a concentric circle of the screw rod 52.

Figure 44A:
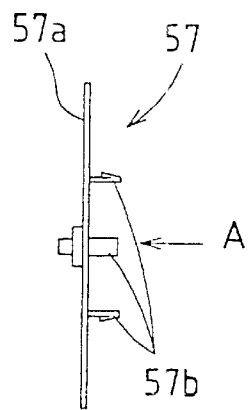
FIG. 44(*a*) is a side view of the cover of the strap coil reel.
Figure 44B:
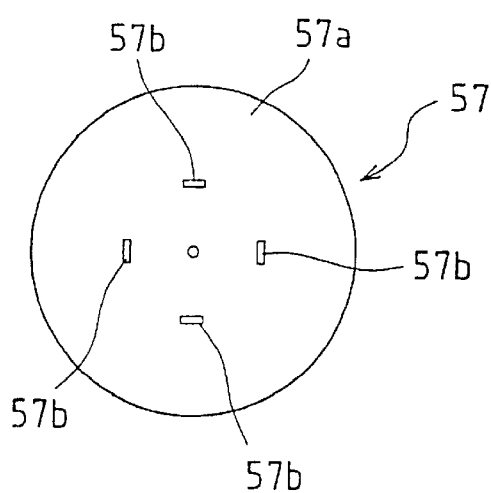

When the core element is inserted in the hollow 11b of the strap coil 11, the core plates 55 are displaced away from the screw rod 52 thereby to be pressed against the inner cylindrical surface of the strap coil 11. In this state, the cover 57 of FIGS. 44(a) and (b) is put on the side surface of the strap coil 11. The cover 57 comprises a cover disc 57a which corresponds to the side surface of the strap coil 11. The cover disc 57a also includes, in the middle of the radius thereof, four projections 57b which perpendicularly extend from the cover disc 57a and which are circumferentially equally spaced from each other. The tip of each projection 57b forms a hook. While the core plates 55 are displaced remotest from the screw rod 52, the projections 57b enter the space defined by the core plates 55 and have their tips hooked at the internal surfaces of the core plates 55.

Figure 45A:
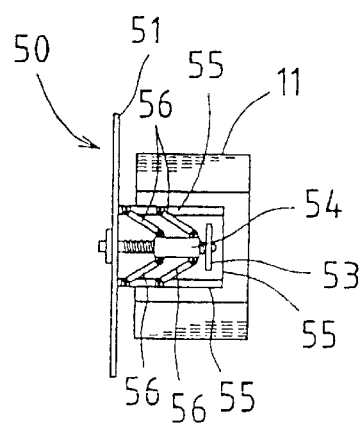
FIGS. 45(*a*) and (*b*) are sections showing the process of loading the strap coil on the strap coil reel.

On this cassette-type strap coil reel 50, the strap coil 11 is loaded according to the following steps. In the reel 50, with the cover 57 is removed, the handle 53 integrated on the extreme end of the screw rod 52 is operated to turn the screw rod 52 in a given direction in this connection, the sliding member 54 moves away from the side plate 51, and the core plates 55 uniformly slide closer to the screw rod 52. Consequently, the core plates 55 form a core element of reduced diameter. With reference to FIG. 45(a), in which the core plates 55 locate in the vicinity of the screw rod 52 to form a contracted core element, the strap coil 11 is fitted on the core element, with allowing the core plates 55 to enter the hollow 11b formed along the axis of the strap coil 11.

The strap coil 11 is allowed to slide along the core element until its side surface contacts with the side cover 51. Next, referring to FIG. 45(b), the handle 53 is operated to turn the screw rod 52 in the reverse direction. This time, the sliding member 54 moves toward the side plate 51, and the core plates 55 uniformly slide away from the screw rod 52. Consequently, the core plates 55 expand the diameter of the core element. At this moment, the external surfaces of the core plates 55 uniformly come in contact with the inner cylindrical surface of the strap coil 11 surrounding the hollow 11b. By displacing the core plates 55 still further away from the screw rod 52, the is core plates 55 are pressed harder against the inner cylindrical surface of the strap coil 11. The screw rod 52 can be turned until the sliding member 54 comes closest to the side cover 51. In the end, the core plates 55 which are slidable in a uniform and synchronised manner constitute a cylindrical core element of circular section, whereby the core element presses on the inner cylindrical surface of the strap coil 11 to shape the hollow 11b into a circular section.

Figure 46A:
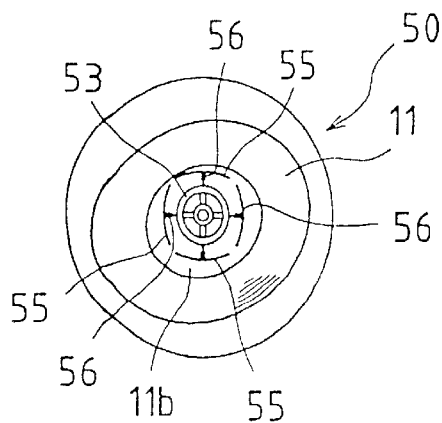
FIGS. 46(*a*) and (*b*) are front views showing a strap coil re-formed through the loading process.
Figure 46B:
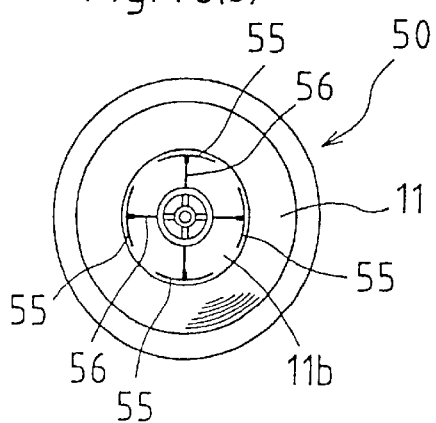

Thus, the core element composed of the core plates 55 can rectify the deformation of the hollow 11b of the strap 11. As shown in FIG. 46(a), when the hollow 11b, which should be circular in section, is deformed into an oval section, the strap coil 11 has a similarly deformed oval section. Nonetheless, the core element is inserted into the hollow 11b by reducing its diameter. Once inserted in the hollow 11b, the core element is diametrically expanded by displacing the core plates 55 away from the screw rod 52 in a uniform and synchronised manner. Eventually, the core element re-forms the hollow 11b and the strap coil 11 into a circular section (FIG. 46(b)).

Figure 45B:
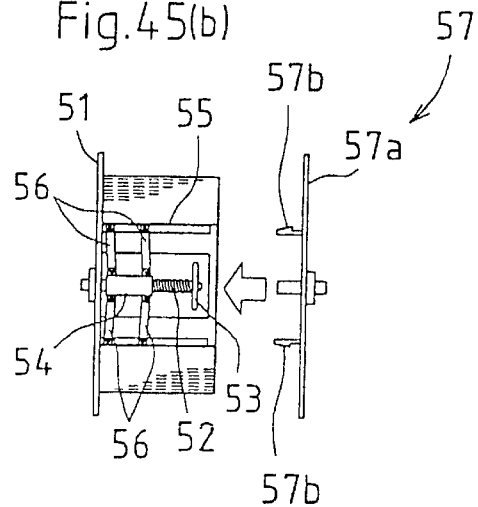

After the strap coil 11 is fixed into a circular section, the cover 57 is put on the strap coil 11. As shown in FIG. 45(b), the surface of the cover disc 57a which mounts the projections 57b is positioned face to face with the side surface of the strap coil 11. Inside the core element provided by displacing the core plates 55 farthest away from the screw rod 52, the projections 57b are allowed to advance into the space therein, with maintaining contact with the internal surfaces of the core plates 55. In due course, the cover disc 57a comes in contact with the side surface of the strap coil 11, in which state the hooks at the tips of the projections 57b check the internal surfaces of the core plates 55 as shown in FIG. 41. The cover 57 is thus held on the core element, with the cover disc 57a covering one side surface of the strap coil 11.

Following the loading of the strap coil 11, the reel 50 is mounted on the spindle 49 of the packaging machine 40. While the strap 11a is drawn out from the strap coil 11, the reel 50 rotates along with the strap coil 11.

As specifically described above, the inner cylindrical surface of the strap coil 11 is supported on the entire external surface of the core element composed of the core plates 55, and thereby stressed into a circular sectional shape. Accordingly, even when the strap 11a is consumed to the innermost layer or neighbouring layers thereon, the strap coil 11 remains firm and solid and enables the strap 11a to be stably drawn out to the innermost end.

The reel 50 is preferably made of a light material such as aluminium, except the screw rod 52 and some other members that require rigidity, whereby the reel 50 rotates efficiently in drawing out the strap 11a a from the strap coil 11 but it stops readily when rotating by inertia.

The reel 50 of this embodiment is designed to accommodate a strap coil 11 of the following specification. The strap coil 11 is prepared by helically winding the strap 11a.

Strap 11a
 Material: polypropylene
 Length: 2, 000 m
 Width: 15.5 mm
 Thickness: 0.65 mm Strap coil 11
 Inner diameter: 250 mm (diameter of the hollow 11b)
 Outer diameter: 455 mm
 Weight: 9.6 kg In the reel 50, the core plates 55 are designed to give a core element having an outer diameter of 250 mm, as measured when the core plates 55 locate remotest from the screw rod 52.

In order to test the packageability of the specially designed reel 50, the packaging machine 40 was practically operated to strap various items, as equipped with the reel 50 which was loaded with the above polypropylene strap coil 11. In each polypropylene strap coil 11, the innermost and outermost ends of the strap 11a were bonded as shown in FIG. 1 by the melt-bonded areas 11e formed along the periphery of the perorations 11d. The strap coils 11 were then deformed into an oval section, respectively, with an eccentricity ratio of 1.00, 1.05 and 1.10 (calculated as the ratio of longest inner diameter/shortest inner diameter in the hollow 11b). The test proved that, while the deformed strap coils 11 were loaded on the reel 50, one of them showed unwinding or disintegration of the strap 11a on the innermost cylindrical surface of the strap coil 11. Besides, every strap coil 11 in the reel 50 allowed the packaging machine 40 to draw out the strap 11a smoothly to the innermost end.

Figure 47:
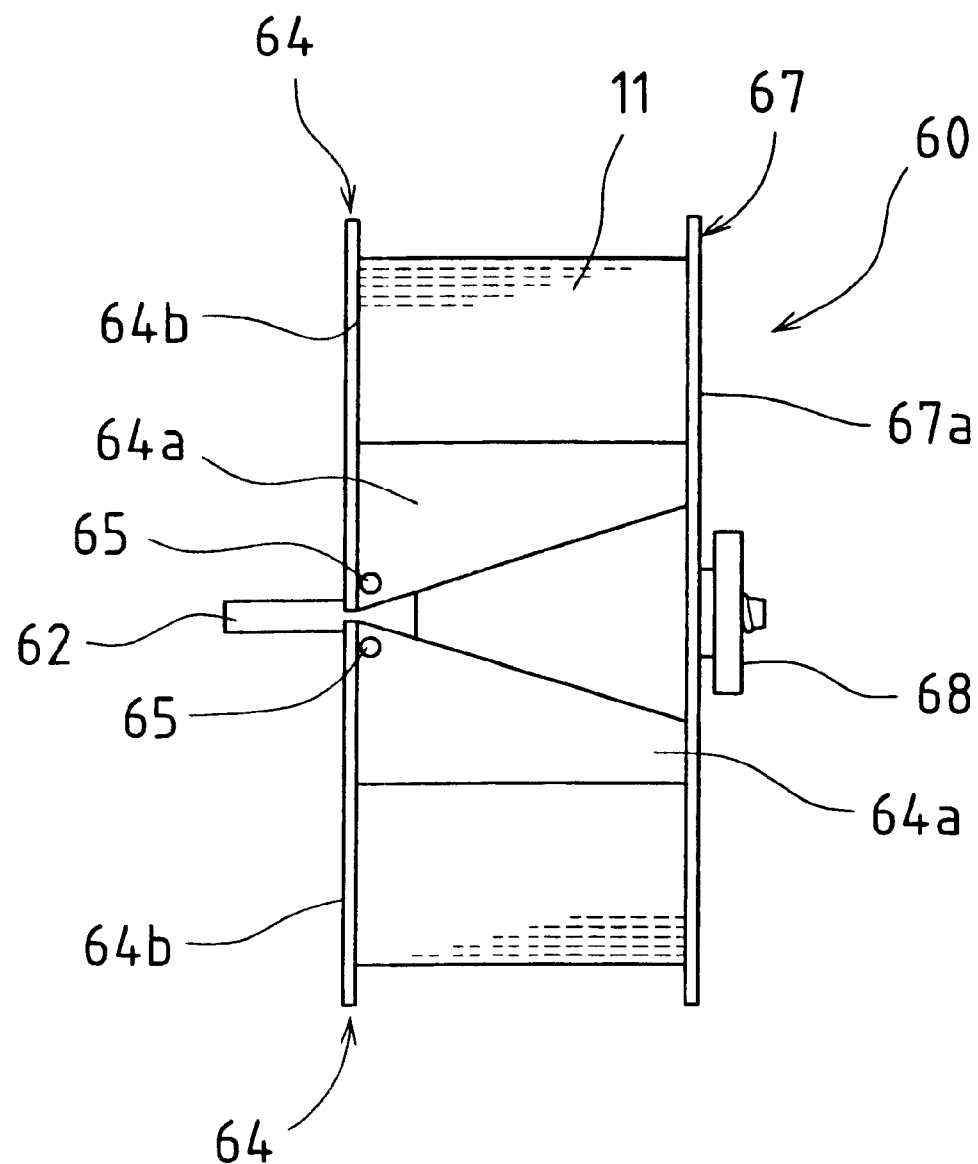
FIG. 47 is a side view of another strap coil reel for accommodating the strap coil unit of the present invention.

FIG. 47 is a side view of another strap coil reel 60, with the strap coil 11 loaded thereon. The reel 60 also has a cover 67 for covering the side surface of the strap coil 11.

FIG. 48(a) is a side view of the reel 60, with the strap coil 11 and the cover 67 removed; and FIG. 48(b) is a front view of FIG. 48(a) taken in the direction of The arrow A. FIG. 49(a) is a side view of the reel 60, partially broken away for description of its operation, with the strap coil and the cover removed; and FIG. 49(b) is a front view of FIG. 49(a) taken in the direction of the arrow A. The reel 60 include s a screw rod 62 which is externally threaded at the extreme end and adjacent portion thereof, and a disc-shaped fixed plate 63 which is secured at the basal end of the screw rod 62. The screw rod 62 and the fixed plate 63 are positioned perpendicularly with respect to each other, wherein the screw rod 62 extends through the centre of the fixed plate 63. The whole circumference of the fixed plate 63 is defined by a guide portion 63a which projects toward the extreme end of the screw rod 62. The projecting edge of the guide portion 63a is slightly inclined with respect to the axis of the screw rod 62.

The disc-shaped fixed plate 63 is equipped with a pair of core halves 64 which surround the screw rod 62 and which constitute a core element to be inserted into the hollow 11*b* of the strap coil 11. Each of the core halves 64 comprises a nearly half-cylindrical core plate 64*a* and a half-annular flange 64*b*, wherein the flange 64*b* projects outwardly and perpendicularly from the basal side of the core plate 64*a* fitted in the fixed plate 63. When confronted to each other, a pair of core halves 64 constitute a hollow core element in the form of a truncated cone.

The basal side of each core plate 64*a* surrounds a half-circumference of the guide portion 63*a* of the fixed plate 63. At both ends of the basal side, the core plate 64*a* is pivoted on the guide portion 63*a* by pins 65, such that the extreme side of one core plate 64*a* can approach and recede with respect to the counterpart of the other core plate 64*a*. The lateral sides of each core plate 64*a* are inclined relative to the flange 64*b*, so that the core plates 64*a* can form a truncated cone when the extreme sides thereof are allowed to approach mutually.

As shown in FIG. 47, the threaded extreme end of the screw rod 62 is screwed with a nut 68, after the core element is completely fitted with the strap coil 11 and then with the cover 67.

Figure 50A:
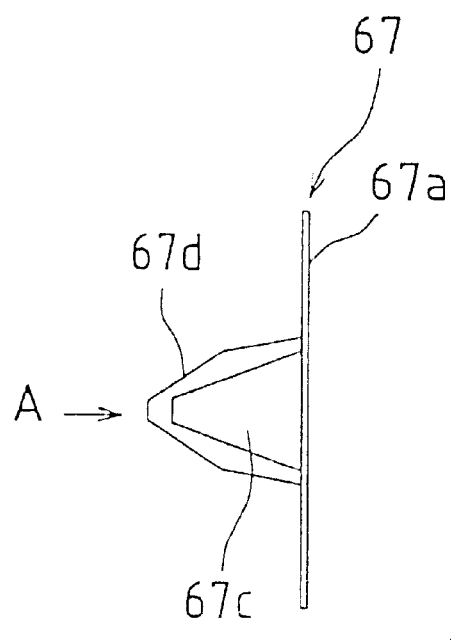
FIG. 50(*a*) is a side view of the cover of the strap coil reel.
Figure 50B:
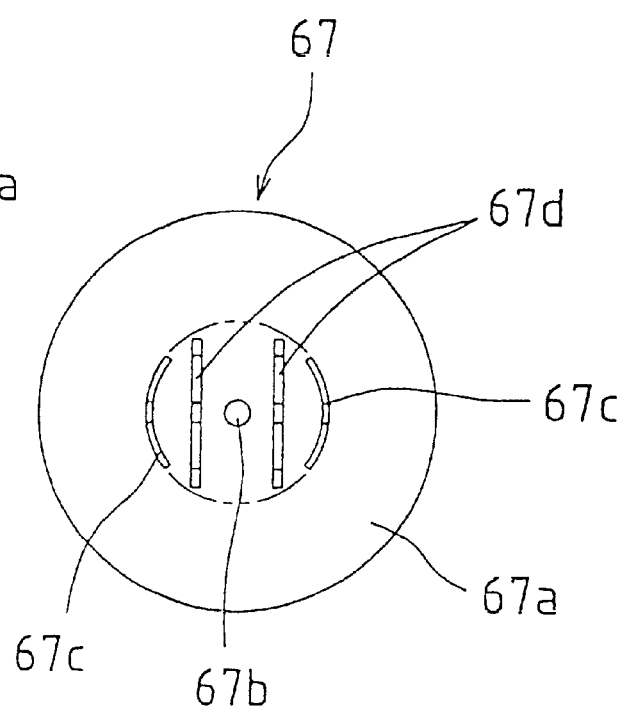

FIG. 50(*a*) is a side view of the cover 67, and FIG. 50(*b*) is a front view of FIG. 50(*a*) taken in the direction of the arrow A. The cover 67 comprises a cover disc 67*a* which includes a hole 67*b* in the centre for passing the screw rod 62. From one surface of the cover disc 67*a*, a pair of guide plates 67*c* project perpendicularly at two opposite positions on a concentric circle of the hole 67*b*. Each guide plate 67*c* is curved along the circumference of the concentric circle of the hole 67*b*, and its width decreases gradually toward the head thereof.

Between the guide plates 67*c*, a pair of parallel push plates 67*d* extend perpendicularly from the cover disc 67*a* at two opposite positions with respect to the hole 67*b*. The push plates 67*d* are tapered towards their heads and project slightly longer than the guide plates 67*c*.

On this strap coil reel 60, the strap coil 11 is loaded through the following process. Firstly, with reference to FIG. 51(*a*), the extreme sides of a pair of core halves 64 are pivotally confronted to each other, so that the core plates 64*a* together constitute a core element in truncated cone form, with one end being diametrically contracted. The core element composed of the confronted core plates 64*a* is inserted, from its contracted end, into the hollow 11*b* of the strap coil 11.

Figure 51A:
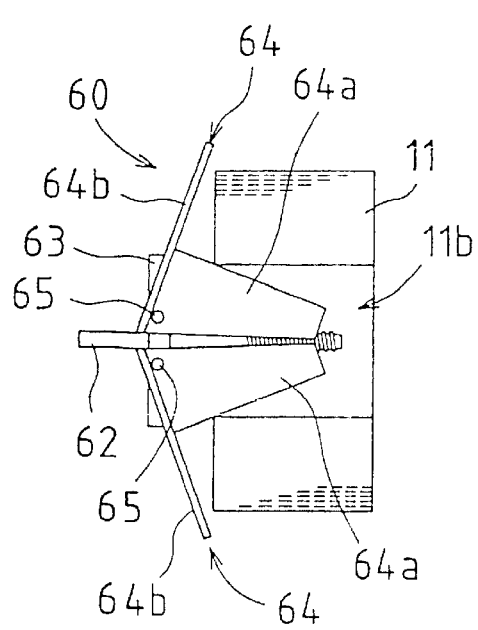
FIGS. 51(*a*) and (*b*) are side views showing the process of loading the strap coil on the strap coil reel.
Figure 51B:
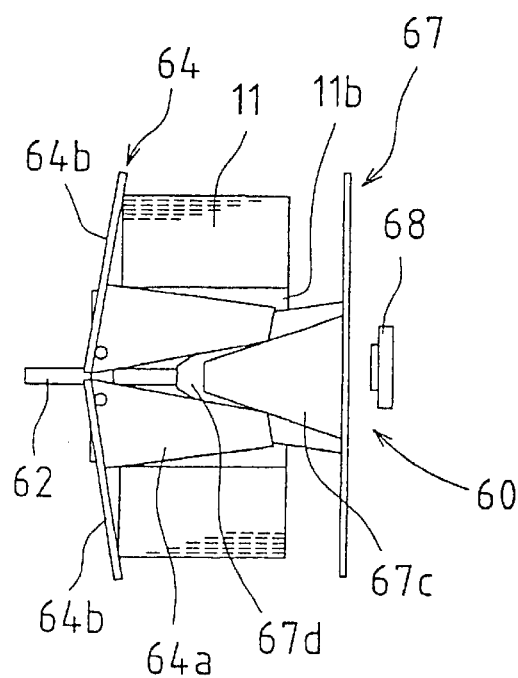

When the core element advances in the hollow 11*b* to a certain degree, the side surface of the strap coil 11 comes in contact with the flanges 64*b* of the core halves 64, as shown in FIG. 51(*b*). At this stage, the cover 67 is positioned to the core halves 64 such that each guide plates 67*c* can advance between the opposing lateral sides of the core plates 64*a*. By sliding the cover 67 toward the strap coil 11, the heads of the push plates 67*d* enter the space enclosed by the core plates 64*a*, with pivotally displacing the core plates 64*a* in the direction of separating the extreme sides thereof from each other. After a while, the heads of the guide plates 67*c* advance along the opposing lateral sides of the core plates 64*a*, with pivotally displacing the core plates 64*a* in the direction of separating the extreme sides thereof further from each other. By sliding the cover 67 to the limit, the push plates 67*d* and guide plates 67*c* open the contracted end of the core element composed by the core plates 64*a*. Hence, the core element is forced into a cylindrical form which has a circular section and an axially uniform diameter. In consequence, the external surfaces of the core plates 64*a* are pressed against the inner cylindrical surface of the strap coil 11 to retain the circular section thereof.

When the core plates 64*a* are oriented to form a core element in a cylindrical form, the flanges 64*b* of the core halves 64 stand perpendicularly to the screw rod 62 and contact with one side surface of the strap coil 11. In this state, the extreme end of the screw 62 projects from the cover disc 67*a* through the hole 67*b* provided in the centre thereof, while the cover disc 67*a* contacts with the other side surface of the strap coil 11.

To complete the loading of the strap coil 11, the cover disc 67*a* is secured to the screw rod 62, as shown in FIG. 47, by screwing the nut 68 on the extreme end of the screw rod 62 projecting from the cover disc 67*a*.

In packaging use, the strap coil reel 60 loaded with the strap coil 11 is mounted on the spindle 49 of the packaging machine 40.

The reel 60 of this embodiment is designed to accommodate a strap coil 11 of the following specification. The strap coil 11 is prepared by helically winding the strap 11*a*.

Strap 11*a*
  Material: polypropylene
  Length: 2,500 m
  Width: 15.5 mm
  Thickness: 0.65 mm
Strap coil 11
  Inner diameter: 200 mm (diameter of the hollow 11*b*)
  Outer diameter: 450 mm
  Weight: 12 kg In the reel 60, the core plates 64*a* are designed to give a core element having an outer diameter of 200 mm, as measured when the core plates 64*a* are expanded diametrically.

In order to test the packageability of the specially designed reel 60, the packaging machine 40 was practically operated to strap various items, as equipped with the reel 60 which was loaded with the above polypropylene strap coil 11. In each polypropylene strap coil 11, the innermost and outermost ends of the strap 11*a* were bonded as shown in FIG. 1 by the melt-bonded areas 11e formed along the periphery of the perforations 11*d*. The strap coils 11 were then deformed into an oval section, respectively, with an eccentricity ratio of 1.00, 1.05 and 1.10 (calculated as the ratio of longest inner diameter/shortest inner diameter in the hollow 11*b*). The test proved that, while the deformed strap coils 11 were loaded on the reel 60, none of them showed unwinding or disintegration of the strap 11*a* on the innermost cylindrical surface of the strap coil 11. Besides, every strap coil 11 in the reel 60 allowed the packaging machine 40 to draw out the strap 11*a* smoothly to the innermost end.

The reel 60 is preferably made of a light material such as aluminium, except the core halves 64, the fixed plates 63 and some other members that require rigidity, whereby the reel 60 rotates efficiently in drawing out the strap 11*a* from the strap coil 11 but it stops readily when rotating by inertia.

In the above embodiment, the screw rod 62 is designed to be fitted on the spindle 49 of the packaging machine 40. Alternatively, the screw rod 62 may be integrated with the spindle 49, or it may play a dual role of the spindle 49 and the screw rod 62.

It should be understood that the components of the core element in the reel 60 are not limited to a pair of core halves. The core element may be composed of a plurality of core pieces (e.g. quarter core pieces).

Still another strap coil reel 70 is illustrated in FIGS. 52(*a*) and (*b*), wherein FIG. 52(*a*) is a section and FIG. 52(*b*) is a schematic section taken along the line B—B in FIG. 52(*a*). The reel 70 includes a hollow shaft 71 which fits on the spindle 49 of the packaging machine 40. The spindle 49 extends through the inside of the shaft 71 and terminates on the outside thereof. The shaft 71 and the shaft 49 inserted therethrough are rotatable in synchronism. The distal end of the spindle 49, which projects out of the shaft 71, is formed with a groove 49a. One end of the shaft 71 corresponding to the basal end of the spindle 49 concentrically holds a disc-shaped side plate 72.

The shaft 71 is surrounded by four core plates 74 which constitute a core element to be inserted in the hollow 11b of the strap coil 11. Each of the core plates 74 has substantially the same length as the axial length of the shaft 71, and each is curved in the circumferential direction of the shaft 71. The internal surface of each core plate 74 holds a pair of sliding shafts 73, each being appropriately spaced from the other in the axial direction of the shaft 71 and extending in the radial direction of the shaft 71. A pair of sliding shafts 73 are slidably accommodated in a pair of cylindrical holders 75 mounted on the shaft In all, four pairs of holders 75 extend radially from the shaft 71, as circumferentially equally spaced from each other. In each pair, the two holders 75 are separately disposed in the vicinity of the ends of the shaft 71. Each sliding shaft 73 is slidably and hermetically fitted in the holder 75. A pair of sliding shafts 73 mounted on the core plate 74 are equipped with a pair of tension springs 76. The tension springs 76 stress the core plate 74 toward the shaft 71.

The shaft 71 includes an air passage 71a which communicates with every holder 75. Both ends of the air passage 71a open at the distal end surface of the shaft 71 corresponding to the distal end of the spindle 49. One end of the air passage 71a is an air inlet 71b equipped with a check valve, and the other end is an air outlet 71c which is opened and closed by an air outlet cock 77.

When compressed air is injected in the air inlet 71b from an air nozzle, the air is then supplied into the air passage 71a via the check valve. As the air outlet 71c is closed by the cock 77, the compressed air in the air passage 71a is supplied to all of the holders 75. The air pressure allows the sliding shafts 73 fitted in the holders 75 to slide outwardly against the stress of the tension springs 76.

The distal end of the spindle 49 extending through the shafts 71 is concentrically fitted with a disc-shaped cover 78. The cover 78 is secured on the spindle 49 by a nut 79 screwed down along the groove 49a formed at the distal end of the spindle 49, with keeping in contact with the edges of the core plates 74.

In the reel 70 of this structure, the strap coil 11 is loaded in the following manner. To begin with, the nut 79 and the cover 78 are detached from the spindle 49. At this stage, each core plate 74 is stressed toward the shaft 71 by the tension springs 76 fitted on a pair of sliding shafts 73. Therefore, the core element composed or the core plates 74 is diametrically contracted and approaches the shaft 71.

While the core plates 74 constitute the core element of reduced diameter, the strap coil 11 is fitted on the core plates 74. Even if the strap coil 11 has a deformed oval section, the contracted core element allows easy fitting of the strap coil 11.

After the strap coil 11 is fitted on the core plates 74, compressed air is supplied into the air passage 71a through the air inlet 71b which opens at the distal end surface of the shaft 71. Since the air outlet 71c remains closed by the cock 77 throughout the air introduction, the air fed into the air passage 71a is supplied to all holders 75. The air pressure allows the sliding shafts 73 fitted in the holders 75 to slide outwardly against the stress of the tension springs 76, whereby the sliding shafts 73 mounted in pairs on the core plates 74 outwardly displace the same in a uniform and synchronised manner. As a result, the core element composed of the core plates 74 expands diametrically, until the external surface of each core plate 74 is pressed against the inner cylindrical surface of the strap coil 11. In association with the expansion of the core element, the section of the strap coil 11 is re-formed into a circular section, even if deformed into an oval section.

Once the strap coil 11 obtains a circular section, air injection is terminated at the air inlet 71b. Owing to the check valve at the air inlet 71b, the air charged in the air passage 71a will not leak out.

Finally, the cover 78 is fitted on the spindle 49 to be in contact with the side surface of the strap coil 11. The cover 78 is secured by screwing the nut 79 along the groove 49a formed in the spindle 49.

Now that the strap coil 11 is loaded on the strap coil reel 70, the packaging machine 40 can strap an item 47, with drawing out the outermost end of the strap 11a which locates on the outer cylindrical surface of the strap coil 11. When the reel 70 runs out of the strap 11a in the strap coil 11, the air charged in the air passage 71a is discharged by operating the cock 77 to open the air outlet 71c. While the air flows out, each core plate 74 constituting the core element yields to the stress of a pair of tension springs 76, whereby the core element contracts diametrically.

Figure 53:
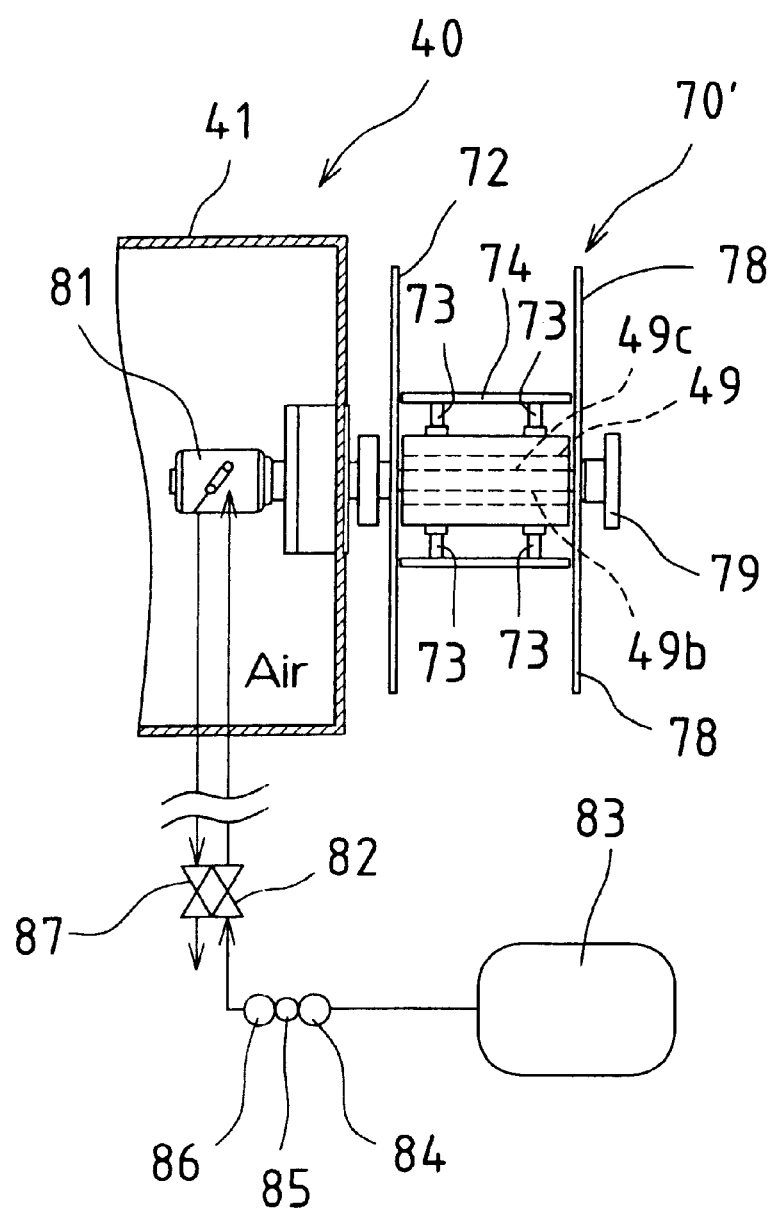
FIG. 53 is a schematic conceptual view of yet another strap coil reel for accommodating the strap coil unit of the present invention, as mounted on an automatic packaging machine.

FIG. 53 schematically illustrates further another embodiment of the strap coil reel. The strap coil reel 70' is basically similar to the reel 70 shown in FIG. 52. The difference lies in that the shaft 71 is combined with the spindle 49 of the packaging machine 40 and that the spindle 49 includes an air feed line 49b and an air discharge line 49c each communicating with the air passage 71a in the shaft 71. Although not shown in the figure, tension springs are fitted on a pair of sliding shafts 73 mounted on each core plate 74.

The air feed line 49b and air discharge line 49c in the spindle 49 are connected to a rotary joint 81. A compressor 83 supplies compressed air to the rotary joint 81, via an air filter 84, a regulator 85, an oiler 86 and an electromagnetic feed valve 82. Passing through the rotary joint 81, the compressed air flows into the air feed line 49b. On the other hand, the air coming from the air discharge line 49c flows out through the rotary joint 81 and an electromagnetic discharge valve 87.

Figure 54A:
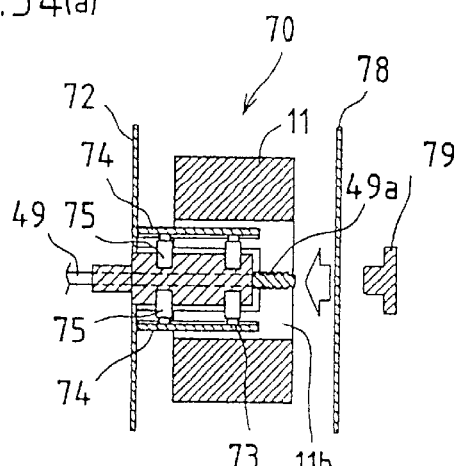
FIGS. 54(*a*)–(*g*) illustrate a process of loading and unloading the strap coil with respect to the strap coil reel for the strap coil unit, wherein FIGS. 54(*a*) and (*b*) are a section and a front view, respectively, showing an introductory step.

In order to load the strap coil 11 in the reel 70', the nut 79 and the cover 78 are detached from the spindle 49, as shown in FIG. 54(a). By releasing the electromagnetic discharge valve 87, the air charged in the holders 75 is discharged through the air discharge line 49c in the spindle 49. As a result, the core plates 74 constituting the core element are stressed toward the shaft 71 by the tension springs, and reduce the diameter of the core element. The electromagnetic discharge 87 is closed thereafter.

Figure 54B:
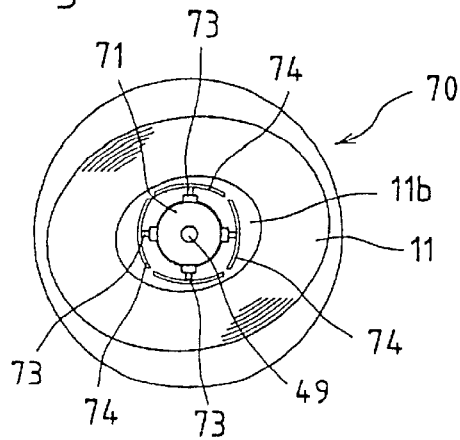

At the next stage, the strap coil 11 is fitted on the diametrically contracted core element composed of the core plates 74. Even when the strap coil 11 has a deformed oval section as shown in FIG. 54(b), the contracted core element allows easy fitting of the strap coil 11. Then, the cover 78 is put on the spindle 49 and secured by screwing the nut 79 along the groove 49a formed in the spindle 49, thereby keeping in contact with the side surface of the strap coil 11.

Figure 54C:
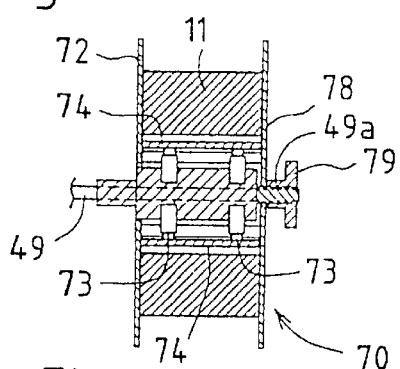
Figure 54D:
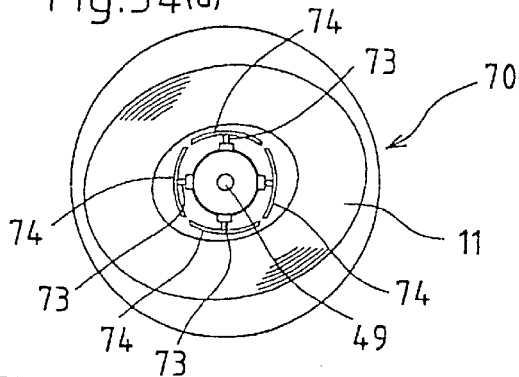
Figure 54E:
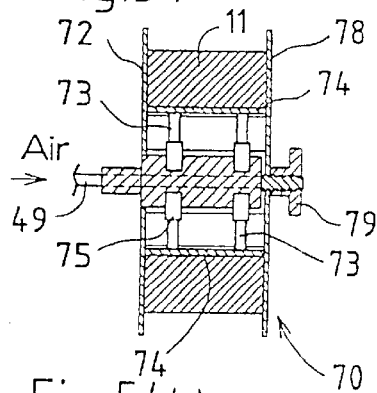
Figure 54F:
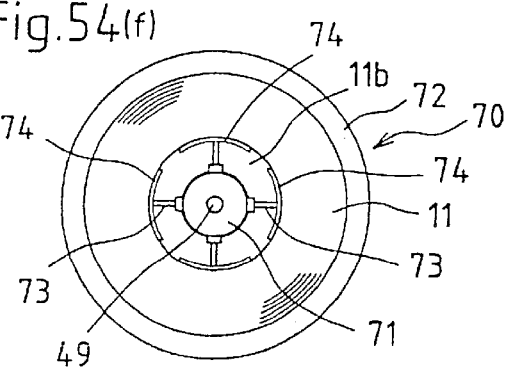

After the strap coil 11 is fitted on the core element composed of the core plates 74 (FIGS. 54(c), (d)), the electromagnetic feed valve 82 is released to supply compressed air into the holders 75, through the air feed line 49b in the spindle 49. As the air pressure allows the sliding shafts 73 fitted in the holders 75 to slide outwardly, the core plates 74 are outwardly displaced in a combined and synchronised manner and eventually pressed against the inner cylindrical surface of the strap coil 11 (FIG. 54(e)). While the core element composed of the core plates 74 diametrically expands into a cylinder of circular section, the oval section of the strap coil 11 is re-formed into a circular section (FIG. 54(f)). Once the strap coil 11 obtains the circular section, the electromagnetic feed valve 82 is closed.

Figure 54G:
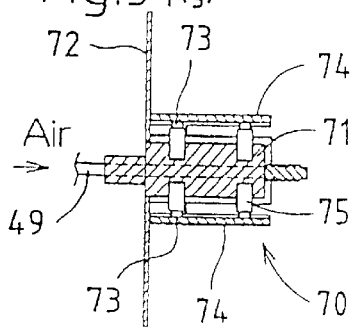
Figure 54H:
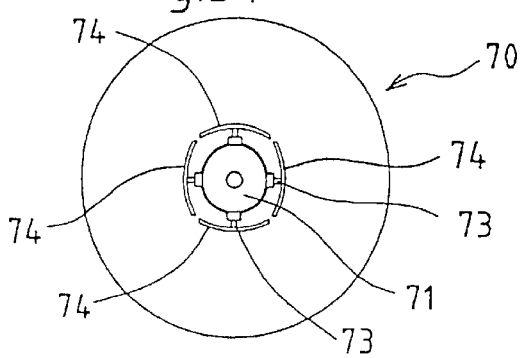
Figure 55:
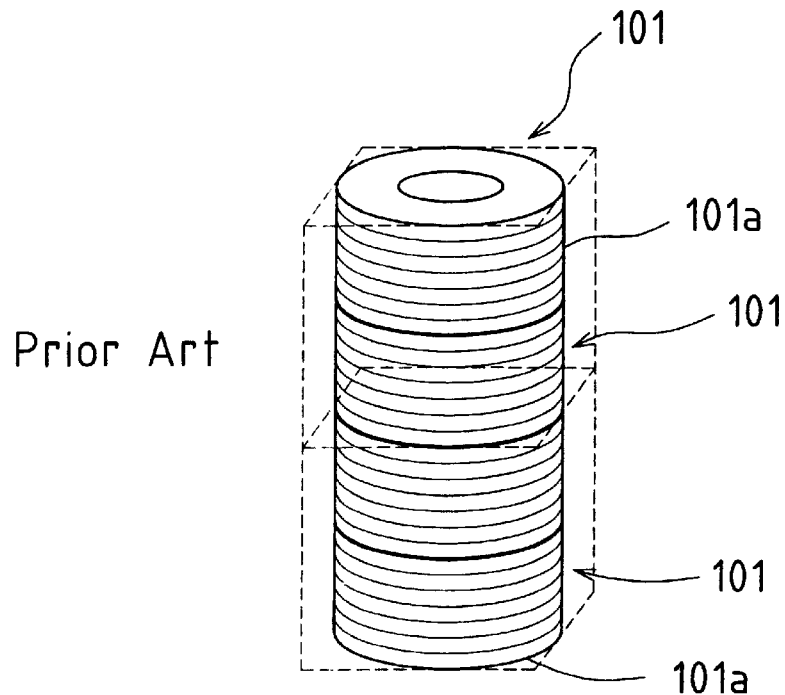
FIG. 55 is a perspective view of conventional strap coils in storage.
Figure 56:
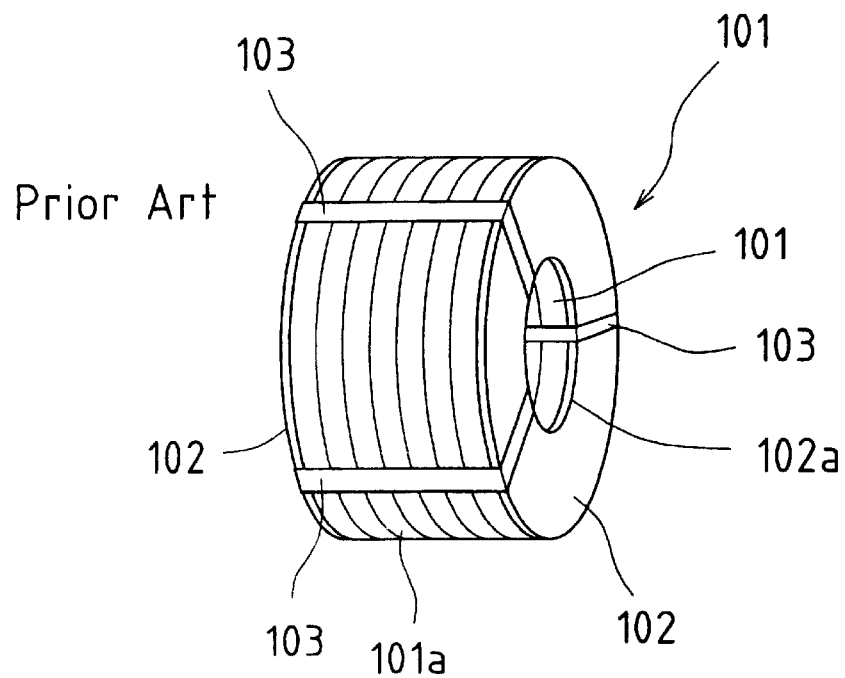
FIG. 56 is a perspective view of a conventional strap coil unit.
Figure 57:
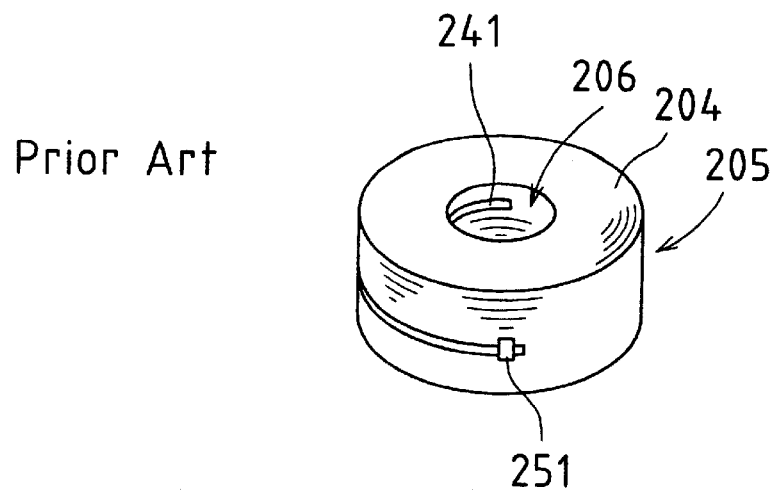
FIG. 57 is a perspective view of a conventional strap coil.
Figure 58:
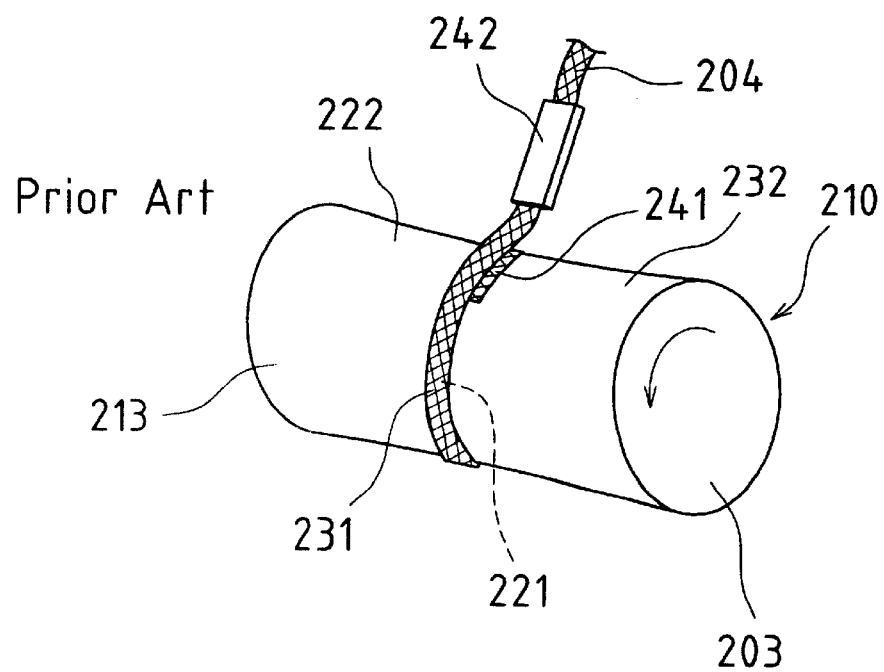
FIG. 58 is a perspective view showing a step of winding the strap end according to a method of producing the strap coil of FIG. 57.

Following the loading of the strap coil 11, the packaging machine 40 can strap an item 47. When the reel 70' runs out of the strap 11a, the electromagnetic discharge valve 87 is released to discharge the air charged in the holders 75 through the air discharge line 49c (FIG. 54(g), (h)). In consequence, the core plates 74 yield to the stress of the tension springs and thereby contract the core element diametrically.

It should be understood that the mode of the present invention should not strictly limited to the embodiments hereinbefore described. For example, the strap 11a of the strap coil 11, which is made of an olefinic resin or other thermoplastic resins in the above embodiments, may be prepared by coating a thermoplastic resin on the external surface of a base strap made of paper or fibres.

What is claimed is:

1. A packaging strap coil comprising a plurality of layers of a packaging strap spaced apart from and wound helically around an axis of the strap coil forming a hollow strap coil including a plurality of coiled strap layers, the strap being made of a thermoplastic resin at least on an external surface thereof and having an innermost strap end disposed within the hollow strap coil, wherein a plurality of perforations are formed in and through the innermost strap end into a plurality of strap layers, and wherein the innermost strap end and subsequent strap layers are melt-bonded to each other through each perforation to form laminated strap layers.

2. A packaging strap coil according to claim 1, wherein a plurality of exterior perforations are formed in an outermost strap end and into the plurality of strap layers positioned thereunder.

3. A packaging strap coil according to claim 1, wherein each perforation has parameters including a circumferential length, a configuration, a position thereof and a number of the laminated strap layers through which the perforation extends, said parameters being based on a material type, a thickness and a width of the packaging strap to satisfy a balance between a bonding strength and a peeling strength of the laminated strap layers.

4. A method for producing a packaging strap coil comprising the steps of:

providing an elongated length of packaging strap having an innermost strap end;

winding the innermost strap end on a winding roller and layering a plurality of a remaining portion of the packaging strap on the innermost strap end;

piercing the strap layers with a perforator heated to a predetermined temperature, thereby to form a perforation defined by an inner periphery and melt its inner periphery to laminate the pierced strap layers;

withdrawing the perforator from the strap layers;

winding a required length of the strap helically on the winding roller to form a strap coil; and removing the winding roller from the strap coil to form a coreless packaging strap coil.

5. A method for producing a packaging strap coil according to claim 4, wherein the winding roller is operative to expand or contract diametrically, the winding roller being diametrically expanded while the packaging strap is wound thereon to form the strap coil, and thereafter, being diametrically contracted and removed from the strap coil.

6. A method for producing a packaging strap coil comprising the steps of:

providing a winding roller and an elongated length of packaging strap having an innermost strap end;

winding the innermost strap end on the winding roller and layering a plurality of continuous packaging strap segments on the innermost strap end;

irradiating a laser beam on the strap layers to form a perforation defined by a periphery and melt-bond the strap layers together within the periphery;

winding a required length of the packaging strap helically on the winding roller to form a strap coil; and removing the winding roller from the strap coil.

7. A method for producing a packaging strap coil according to claim 6, wherein the winding roller is operative to expand or contract diametrically, the winding roller being diametrically expanded while the strap is wound thereon to form the strap coil, and thereafter, being diametrically contracted and removed from the strap coil.

8. A packaging strap coil, comprising:

an elongated packaging strap having at least an external surface fabricated from a thermoplastic material, the packaging strap spaced apart from and wound about a central axis in a manner to form a coreless coil assembly of packaging strap having an innermost strap coil with an innermost free end strap portion and consecutive ones of subsequent strap coils surrounding the innermost strap coil thereby forming a series of layers of strap coils extending radially relative to the central axis, wherein the innermost free end strap portion and at least a next subsequent one of the strap coils establish tight contact with each other at an interface of the innermost free end strap portion and the at least next subsequent one of the strap coils.

* * * * *